(12) United States Patent
Nose et al.

(10) Patent No.: US 7,596,286 B2
(45) Date of Patent: Sep. 29, 2009

(54) IMAGE PROCESSING APPARATUS, IMAGE PROCESSING SYSTEM, IMAGING APPARATUS AND IMAGE PROCESSING METHOD

(75) Inventors: Atsushi Nose, Kanagawa (JP); Koji Aoyama, Saitama (JP); Tohru Kurata, Saitama (JP); Kimitaka Wada, Kanagawa (JP)

(73) Assignee: Sony Corporation, Tokyo (JP)

( * ) Notice: Subject to any disclaimer, the term of this patent is extended or adjusted under 35 U.S.C. 154(b) by 822 days.

(21) Appl. No.: 10/902,140

(22) Filed: Jul. 30, 2004

(65) Prior Publication Data

US 2005/0053307 A1   Mar. 10, 2005

(30) Foreign Application Priority Data

Aug. 6, 2003 (JP) .............................. 2003-288109
Aug. 13, 2003 (JP) .............................. 2003-292725

(51) Int. Cl.
*G06K 9/32* (2006.01)

(52) U.S. Cl. ..................................... 382/300
(58) Field of Classification Search ....................... None
See application file for complete search history.

(56) References Cited

U.S. PATENT DOCUMENTS

| | | | | |
|---|---|---|---|---|
| 5,276,519 A | * | 1/1994 | Richards et al. | 348/241 |
| 5,339,105 A | * | 8/1994 | Iura et al. | 348/240.2 |
| 5,420,632 A | * | 5/1995 | Yamagiwa | 348/240.3 |
| 5,467,135 A | * | 11/1995 | Yamane et al. | 375/240.16 |
| 5,650,819 A | * | 7/1997 | Sato et al. | 348/240.99 |
| 5,675,380 A | * | 10/1997 | Florent et al. | 348/251 |
| 5,739,867 A | * | 4/1998 | Eglit | 348/581 |
| 6,348,948 B1 | * | 2/2002 | Kyuma | 348/360 |
| 6,546,157 B1 | * | 4/2003 | Okuno et al. | 382/300 |
| 6,618,081 B1 | * | 9/2003 | Harada et al. | 348/231.6 |

(Continued)

FOREIGN PATENT DOCUMENTS

JP    06-202715    7/1994

(Continued)

OTHER PUBLICATIONS

A Novel approach to—Bilinear Interpolation, Gribbon et al, IEEE, 2004, 0-7695-2081-2, 1-6.*

(Continued)

*Primary Examiner*—Brian P Werner
*Assistant Examiner*—Jayesh A Patel
(74) *Attorney, Agent, or Firm*—Oblon, Spivak, McClelland, Maier & Neustadt, L.L.P.

(57) ABSTRACT

An image processing apparatus includes an zoom position acquiring section for acquiring a zoom position representing a lens position condition of the optical zoom mechanism on taking the inputted image, a zooming-direction decoding section for decompressing correction parameter associated with the zoom position, which is acquired by the zoom position acquiring section, according to a zoom compression parameter, into which a correction parameter for distortion correction corresponding to each lens position condition is compressed by utilizing zoom partitioning points at which lens position conditions of the optical zoom mechanism are sequentially partitioned into plural levels that are set between a wide-end and a tele-end and that include both ends, and an image correction section for correcting distortion of the inputted image according to the correction parameter decompressed by the zooming-direction decoding section.

8 Claims, 28 Drawing Sheets

U.S. PATENT DOCUMENTS

| | | | |
|---|---|---|---|
| 6,707,998 B2 * | 3/2004 | Gallagher | 396/311 |
| 6,738,057 B1 * | 5/2004 | Campbell | 345/611 |
| 6,853,400 B1 * | 2/2005 | Matama | 348/96 |
| 6,937,282 B1 * | 8/2005 | Some et al. | 348/335 |
| 2002/0041383 A1 * | 4/2002 | Lewis et al. | 358/1.9 |
| 2002/0164083 A1 * | 11/2002 | Song et al. | 382/275 |
| 2002/0196472 A1 * | 12/2002 | Enomoto | 358/3.26 |

FOREIGN PATENT DOCUMENTS

| | | |
|---|---|---|
| JP | 10-214349 | 8/1998 |
| JP | 11-341345 | 12/1999 |
| JP | 2001-148026 | 5/2001 |
| JP | 2002-207242 | 7/2002 |
| JP | 2003-219357 | 7/2003 |

OTHER PUBLICATIONS

Interpolation algorithms, Cliff et al, IEEE, 0-7803-3844, 1997, 252-254.*

* cited by examiner

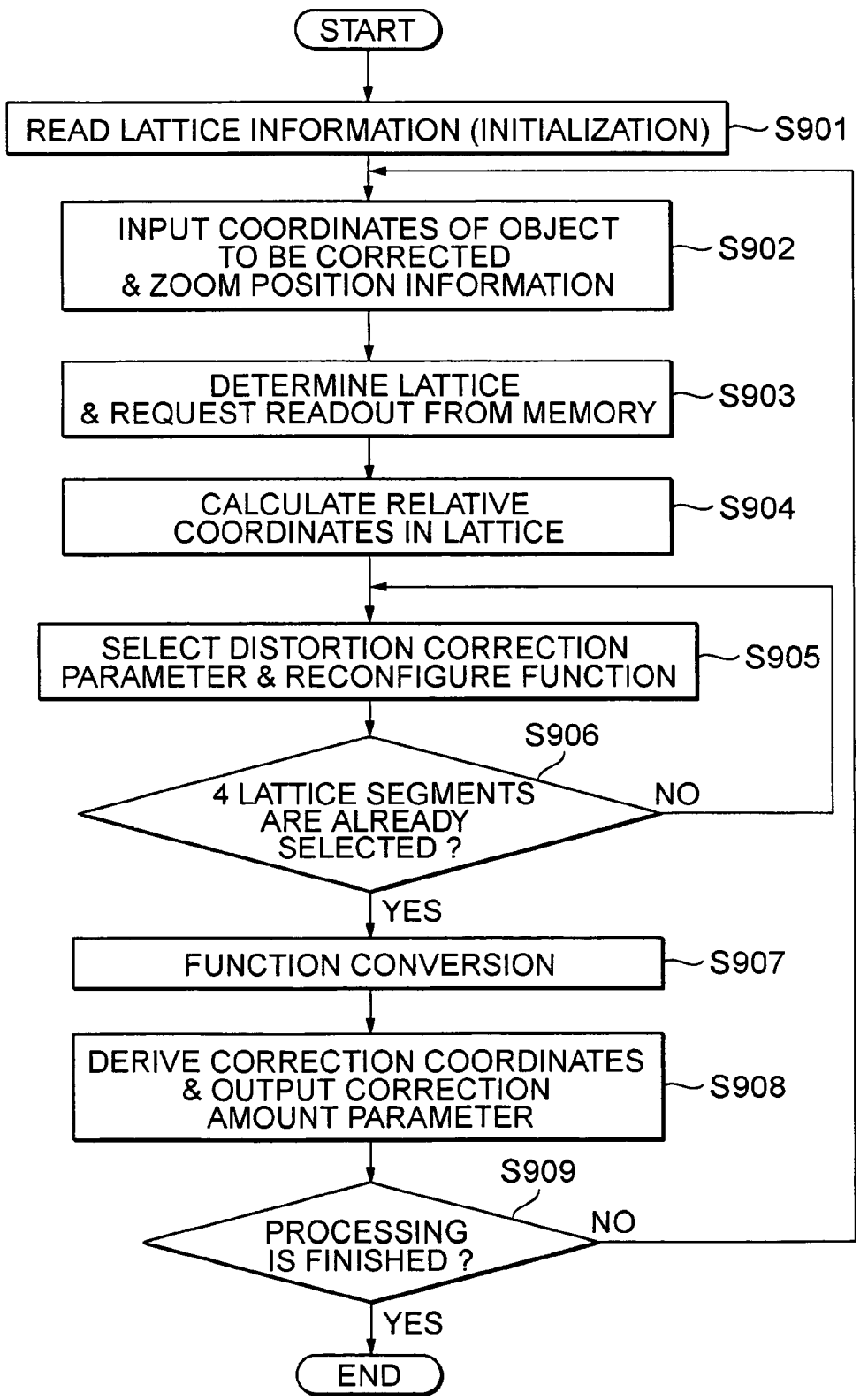

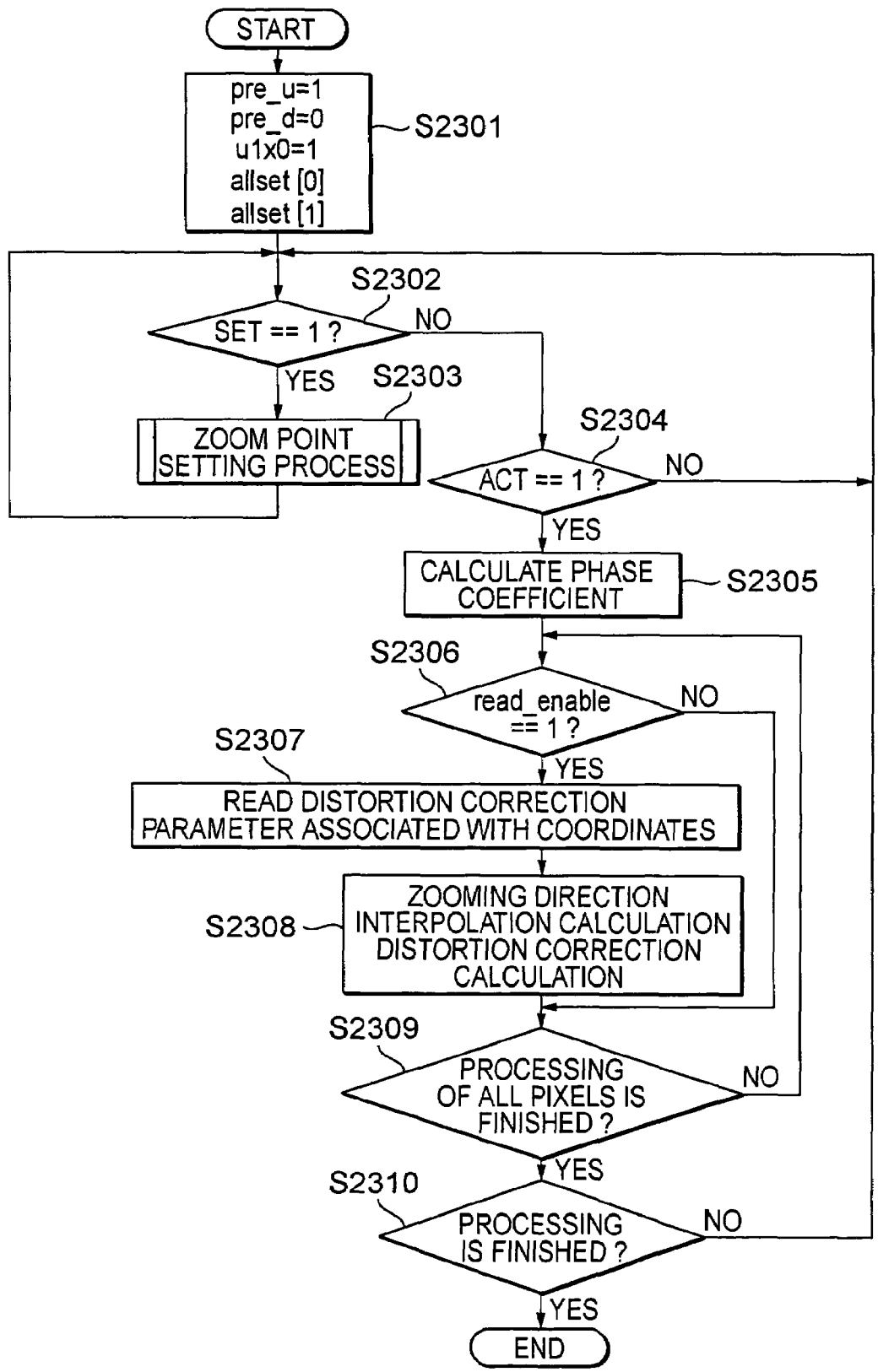

IMAGE PROCESSING APPARATUS, IMAGE PROCESSING SYSTEM, IMAGING APPARATUS AND IMAGE PROCESSING METHOD

CROSS REFERENCES TO RELATED APPLICATIONS

The present invention claims priority to its priority documents No. 2003-288109 filed in the Japanese Patent Office on Aug. 6, 2003 and No. 2003-292725 filed in the Japanese Patent Office on Aug. 13, 2003, the entire contents of which being incorporated by reference herein.

BACKGROUND OF THE INVENTION

1. Field of the Invention

The present invention relates to an image processing apparatus, an image processing system, an imaging apparatus, and an image processing method, which are used for correcting distortion of a captured image. More particularly, the present invention relates to an image processing apparatus, an image processing system, an imaging apparatus, and an image processing method, which are capable of performing distortion correction on an image, which is taken by using a converging lens group having an optical zoom mechanism, according to a zoom position.

2. Description of the Related Art

Hitherto, it has been known that in imaging apparatuses, such as a video camera and a still camera, distortion occurs in a captured image under the influence of distortion and aberration characteristics of an imaging lens. In a case where a high-precision and high-performance lens, such distortion is inconspicuous. However, in a case where a low-cost lens is used, or where an optical zoom lens is used, it is difficult to circumvent the influence of distortion on image quality. Accordingly, in recent years, there has been proposed an image processing system adapted to correct such optical distortion by signal processing.

FIG. 27 is a block diagram showing an example of the configuration of an image processing system of related, art having such a signal processing function.

The image processing system shown in FIG. 27 has an imaging apparatus 3 and a preprocessor 4. Incidentally, it is assumed herein that a digital video camera is provided as the imaging apparatus 3. Further, the preprocessor 4 is configured to be, for example, a personal computer provided on the exterior of this imaging apparatus 3.

The imaging apparatus 3 has an optical block 101, an imaging element 102, an image preprocessor 103, an image signal processor 104, an image memory 105, a display processor 106, a monitor 107, a compression/decompression processor 108, a recording/reproducing section 109, recording media 110, a control microcomputer (hereunder sometimes referred to simply as a microcomputer) 111, a correction parameter decoder 312, and a distortion correction memory 313. Further, the preprocessor 4 has a correction parameter deriving section 401 and a correction parameter encoder 402.

In the imaging apparatus 3, reflection light from an object to be imaged is incident upon the optical block 101. The optical block 101 has plural lenses, a drive mechanism therefor, and so on. The incident light is converged to the imaging element 102. The imaging element 102 includes CCDs (Charge Coupled Devices) and so forth. The incident light is converted into electrical signals that are supplied to the image preprocessor 103. In the image preprocessor 103, CDS (Correlated Double Sampling), AGC (Auto Gain Control), A/D conversion and the like are performed on image signals outputted from the imaging element 102. The digitalized image signals are supplied to the image signal processor 104.

In the image signal processor 104, the inputted digital image signal is stored in the image memory 105. Further, an image quality correction process, such as a distortion correction process, according to correction amount parameters received from the correction parameter decoder 312 is performed on this digital image signal. The processed image signal is supplied to the display processor 106. Then, an image signal to be displayed on the monitor 107 is generated therein. Consequently, the captured image is displayed in the monitor 107. Incidentally, the monitor 107 may be constituted by, for example, a LCD (Liquid Crystal Display).

Further, the image signal having undergone the image quality correction process in the image signal processor 104 is subjected to a compression/decompression process in a predetermined image format in the compression/decompression processor 108. Then, a resultant signal is written to the recording media 110 by the recording/reproducing section 109. Accordingly, the recording of the captured image is performed. Incidentally, for instance, magnetic tape, a semiconductor memory, an optical disk, and a hard disk may be used as the recording media 110.

On the other hand, in a case where image data recorded in the recording media 110 is reproduced, this image data is read by the recording/reproducing section 109 and then undergoes a decompressing-decoding process in the compression/decompression processor 108. The processed image data signal is supplied to the display processor 106, whereby a reproduced image is displayed in the monitor 107.

Such a recording/reproducing operation of an image is controlled by the control microcomputer 111. The control microcomputer 111 outputs a command or the like for instructing the image signal processor 104 to perform a predetermined operation, to the image signal processor 104 in response to a control signal received from a user interface (I/F) (not shown). Moreover, the control microcomputer 111 supplies information on the position of a lens in the optical block 101 to the correction parameter decoder 312.

The correction parameter decoder 312 performs decompression (decoding) on compressed data, which is read from the distortion correction memory 313, according to the information and the like, which is supplied from the control microcomputer 111, to thereby obtain a correction amount parameter corresponding to each of pixels. Then, the correction parameter decoder 312 supplies the correction amount parameters to the image signal processor 104. The distortion correction memory 313 supplies a distortion correction parameter held therein to the correction parameter decoder 312 in response to a request therefrom.

Hereinafter, an example of the distortion correction process to be performed in the image signal processor 104 is described. In the image signal processor 104, for example, a distortion-corrected image is divided into regions in a lattice form. Then, an interpolation calculation corresponding to each direction is performed by using coordinates of plural lattice points in the x-direction and the y-direction of the region including a pixel undergoing correction. Accordingly, distortion is corrected.

The correction parameter decoder 312 outputs correction amount parameters providing, for example, correction coordinates and interpolation phases in the X-direction and the y-direction. Further, the image signal processor 104 calculates correction vectors and interpolation coefficients in the respective directions. Then, the image signal processor 104 serially performs one-dimensional interpolation calculations respectively corresponding to the directions. Distortion in each of the directions can be corrected by performing such a relatively low load process.

Meanwhile, in the preprocessor 4, the correction parameter deriving section 401 generates the distortion correction coordinates of all pixels of the captured image according to lens data of lenses mounted in the optical block 101, and outputs the generated coordinates to the correction parameter encoder 402.

The correction parameter encoder 402 partitions the distortion-corrected image in a lattice form, and compresses the distortion correction coordinates of all pixels, which are outputted from the correction parameter deriving section 401, in the x-direction and the y-direction, respectively, by utilizing the lattice positions thereof. Consequently, the generated distortion correction parameters are stored in the distortion correction memory 313.

Incidentally, the distortion correction parameters may be generated in the correction parameter encoder 402 in real time every time when the distortion correction process is performed, and also may be supplied to the distortion correction memory 313. Alternatively, the distortion correction parameters may collectively be loaded into the distortion correction memory 313 in an initial operation, such as a power-on operation.

The correction parameter decoder 312 receives the designation of coordinates, which are caused to undergo the correction, from the image signal processor 104, and reads the distortion correction parameters, which correspond to the region of the lattice, from the distortion correction memory 313, and performs the interpolation calculation in the x-direction and the y-direction thereby to decompress the distortion correction coordinates and to generate distortion correction parameters.

Accordingly, preliminarily, the entire image is divided into the regions of the lattice, and the distortion correction coordinates of each of the pixels are compressed. The distortion correction coordinates are decompressed in the correction parameter decoder 312. With this configuration, an amount of necessary data and a load to the calculation process are reduced, so that the process can be performed in real time.

Meanwhile, it is known that distortion characteristics largely change when the position of the lens changes in the imaging apparatus, which has an optical zoom function, by performing a zoom operation. Therefore, it is preferable to utilize optimal distortion correction ordinates according to the change in the position of the lens.

In the imaging system described above, for example, the correction parameter encoder 402 generates the distortion correction parameter associated with each of lens positions and stores the generated distortion correction parameters in the distortion correction memory 313. Additionally, the control microcomputer 111 informs the correction parameter decoder 312 of the lens position. The correction parameter decoder 312 selectively decodes the distortion correction parameter associated with this lens position. Accordingly, appropriate distortion correction according to the lens position can be performed.

Further, FIG. 28 is an example of a graph showing the relation between the lens position and a distortion amount during a zoom operation.

As shown in FIG. 28, a distortion amount-lens position characteristic is nonlinear. Moreover, change amounts at points in the image differ from one another. Accordingly, it is necessary for correcting distortion to prepare distortion correction data for all the pixels, which corresponds to each of all the lens positions. A huge calculation amount is needed for calculating these data. Further, mass memory capacity is needed for holding these data.

Incidentally, a solid-state imaging camera configured to correct distortion of an image by reading image data from a solid-state image sensing device according to geometrical deformation in a case where the imaging position of an imaging zoom lens is within a position, in which a large distortion aberration occurs, has been provided an example of a conventional apparatus enabled to perform distortion correction according to the lens position by using a low-cost circuit (for example, see Paragraph Nos. [0015] to [0020], and FIG. 1 in the specification of Japanese Patent No. 2925871, which will be referred to as Patent Document 1 hereinafter).

SUMMARY OF THE PRESENT INVENTION

As above-mentioned, to perform appropriate distortion correction according to the lens positions during a zoom operation by performing digital signal processing, the distortion correction data for all the pixels, which corresponds to each of the lens positions, should be prepared. Accordingly, the apparatus of related art has drawbacks such as necessary computing power, circuit scale, and power consumption increase, and manufacturing cost rises. Additionally, in a case where the distortion aberration characteristic of a lens system is changed by lens replacement, there is the necessity for preparing distortion correction data complying with the new characteristic. It is difficult for the apparatus of related art to deal with such a case.

In an image processing system of related art illustrated in FIG. 16, for example, the control microcomputer 109 informs the correction parameter decoder 312 of the zoom position. The correction parameter decoder 312 selectively decodes the distortion correction parameter corresponding to this zoom position. Consequently, appropriate distortion correction corresponding to the lens position can be performed. Further, to suppress an amount of distortion correction parameter data, there has been devised a method having the steps of partitioning the lens positions, and then preparing only data corresponding to each of partitioning points, and selecting, when a lens position coincides with none of the partitioning points, data associated with the partitioning point being close to this lens position thereby to correct the distortion by using approximate data. However, according to this method, the smaller a data amount is changed by decreasing the number of partitioning points, the lower the distortion-correction precision becomes. Accordingly, the image quality is degraded.

Accordingly, as an alternative, a method of compressing the distortion correction data in a zooming direction by utilizing the partitioning points thereby to further suppress the amount of necessary data has been devised. However, in this case, the procedure for decoding the read distortion correction parameter is as follows. First, interpolation in the zooming direction is performed. Subsequently, for example, interpolation in the y-direction on a screen is performed. Then, additionally, interpolation in the x-direction thereon is performed. Accordingly, such interpolation in each of the directions is performed. Therefore, this method has a problem in that the scale of the processing circuit is large.

Further, typically, in a distortion correction process performed on image data, pixels of one line in a horizontal direction (the x-direction) are sequentially processed. Then, the process is performed by shifting the line, whose pixels should be processed, to the next line. However, in a case where the decoding of the distortion correction data is performed by following such procedure, an operation probability of the process in the zooming direction and the x-direction is low. This has been one of causes of increase in the scale of a decoding circuit.

The solid-state imaging camera disclosed in the Patent Document 1 performs distortion correction only when the lens position is in a region in which distortion aberration is large. Accordingly, correction precision is low. It has been difficult to make distortion inconspicuous.

The present invention is accomplished in view of such respects. It is desirable to provide an image processing apparatus enable to correct distortion occurring in a captured image and enhance the image quality thereof by a small-scale processing circuit even if an optical zoom is utilized.

Further, it is desirable to provide an image processing system enabled to correct distortion occurring in a captured image and enhance the image quality thereof by a small-scale processing circuit even if an optical zoom is utilized.

Still further, it is desirable to provide an imaging apparatus enabled to correct distortion occurring in a captured image and enhance the image quality thereof by a small-scale processing circuit even if an optical zoom is utilized.

Further, it is desirable to provide an image processing method enabled to correct distortion occurring in a captured image and enhance the image quality thereof by a small-scale processing circuit even if an optical zoom is utilized.

According to an aspect of the present invention, there is provided an image processing apparatus for receiving an inputted image, which is taken by using a converging lens group having an optical zoom mechanism, and for correcting distortion of the image. The image processing apparatus includes zoom position acquiring means for acquiring a zoom position representing a lens position condition of the optical zoom mechanism on taking the inputted image, zooming-direction decoding means for decompressing correction parameter associated with the zoom position, which is acquired by the zoom position acquiring means, according to a zoom compression parameter, into which a correction parameter for distortion correction corresponding to each lens position condition is compressed by utilizing zoom partitioning points at which lens position conditions of the optical zoom mechanism are sequentially partitioned into plural levels that are set between a wide-end and a tele-end and that include both ends, and image correction means for correcting distortion of the inputted image according to the correction parameter decompressed by the zooming-direction decoding means.

The zoom position acquiring means acquires the zoom position representing the lens position condition of the optical zoom mechanism on taking the input image. Further, for correcting the inputted image, a zoom compression parameter is prepared, into which the correction parameter for distortion correction corresponding to each lens position condition is compressed by utilizing zoom partitioning points at which lens position conditions of the optical zoom mechanism are sequentially partitioned into plural levels that are set between the wide-end and the tele-end and include both the ends. The zooming-direction decoding means decompresses the correction parameter associated to the zoom position, which is acquired by the zoom position acquiring means, according to the zoom compression parameter. Then, the image correction means corrects distortion of the inputted image according to the correction parameter decompressed by the zooming-direction decoding means.

According to another aspect of the present invention, there is provided an imaging processing method for receiving an inputted image, which is taken by using a converging lens group having an optical zoom mechanism, and for correcting distortion of the image. The image processing method includes the step of acquiring a zoom position representing a lens position condition of the optical zoom mechanism on taking the inputted image, and the step of decompressing the correction parameter associated to the zoom position according to a zoom compression parameter, into which a correction parameter for distortion correction corresponding to each lens position condition is compressed by utilizing zoom partitioning points at which lens position conditions of the optical zoom mechanism are sequentially partitioned into plural-levels that are set between a wide-end and a tele-end and that include both the ends, and the step of correcting distortion of the inputted image according to the decompressed correction parameter.

According to such an image processing method, to correct distortion of an inputted image, the zoom compression parameter is prepared by setting and utilizing zoom partitioning points, at which lens position conditions of the optical zoom mechanism are sequentially partitioned into plural levels that are set between the wide-end and the tele-end and include both the ends, and by compressing the correction parameter for distortion correction corresponding to each lens position condition. Then, the zoom position is acquired, which represents the lens position condition of the optical zoom mechanism on taking the inputted image. Subsequently, the correction parameter associated with the acquired zoom position is decompressed according to the zoom compression parameter by interpolation calculation. The distortion of the inputted image is corrected according to the decompressed correction parameter.

Further, coordinate designating means designates the coordinates of a pixel, which is an object for the distortion correction. Furthermore, distortion correction parameters compressed in a zooming direction, in which lens position conditions are changed in the optical zooming mechanism, and in a horizontal direction and a vertical direction of an image, whose distortion is corrected, are inputted to the parameter decoding means. Then, according to the correction parameters compressed in this way, the parameter decoding means calculates correction parameters corresponding to the coordinates, which are designated by the coordinate designating means, and a zoom position, which is acquired by zoom position acquiring means, by interpolation calculation. Consequently, the correction parameters corresponding to the designated coordinates are decompressed in the zooming direction, the horizontal direction, and the vertical direction. An image correcting means corrects distortion of an inputted image according to the decompressed correction parameters.

If a correction process in the horizontal direction is performed on data of one line, the parameter decoding means performs interpolation calculation on the correction parameters, which are needed for performing the process on the data of one line and correspond to the zooming direction and the vertical direction, according to the zoom position and vertical coordinates corresponding to the one line in a horizontal retrace period. Then, in an image effective period after the termination of this horizontal retrace period, the parameter decoding means performs interpolation calculation on each of pixels arranged in a horizontal direction by using the correction parameters calculated and compressed in the horizontal direction. Therefore, the distortion correction process is performed on the data of one line in the image effective period by serially performing only a correction parameter decompression process corresponding to the horizontal direction on designated pixels.

Furthermore, such an image processing apparatus is configured such that, for example, the parameter decoding means includes interpolation means for performing interpolation according to a phase coefficient by using inputted and compressed correction parameters, a Y-X compressed data holding means for temporarily holding correction parameters, which are interpolated in a zooming direction by the interpolation calculation means and needed for distortion correction of data of one line, input selection means for selectively inputting to the interpolation calculation means the correction parameters that are compressed in the horizontal direction, the vertical direction and the zooming direction and correspond to the zoom position, the correction parameters read from the Y-X compressed data holding means, and the correction parameters read from the X-compressed data holding means, and control means for controlling a selecting operation in the input selection means according to the coordinates designated by the coordinate designating means, and to the zoom position acquired by the zoom position acquiring means, for calculating a phase coefficient, and for supplying the calculated phase coefficient to the interpolation calculation means.

With such a configuration, the zooming-direction decompression processing of the correction parameters, the vertical-direction decompression processing thereof, and the horizontal-direction decompression processing thereof, are sequentially performed in a time sharing manner by a common computing means. The decompressed correction parameters are supplied to the image correcting means.

According to the image processing apparatus according to an aspect of the present invention, the distortion correction corresponding to the zoom position is performed by preparing the zoom compression parameter, into which the correction parameter for distortion correction corresponding to each lens position condition is compressed by setting and utilizing zoom partitioning points at which lens position conditions of the optical zoom mechanism are sequentially partitioned into plural levels that are set between the wide-end and the tele-end and include both the ends. Accordingly, an amount of necessary correction data is reduced. For example, the computing power needed for calculating these correction data, or the capacity of a memory for storing these correction data is suppressed. Further, the correction parameter associated with the zoom position on taking the inputted image is decompressed according to such a zoom compression parameter. Accordingly, high-precision distortion correction corresponding to the zoom position can be performed by reducing the amount of the necessary correction data.

According to the image processing method according to another aspect of the present invention, the distortion correction corresponding to the zoom position is performed by preparing the zoom compression parameter, into which the correction parameter for distortion correction corresponding to each lens position condition is compressed by setting and utilizing zoom partitioning points at which lens position conditions of the optical zoom mechanism are sequentially partitioned into plural levels that are set between the wide-end and the tele-end and include both the ends. Consequently, an amount of necessary correction data is reduced. For instance, the computing power needed for calculating these correction data, or the capacity of a memory for storing these correction data is suppressed. Moreover, the correction parameter associated with the zoom position on taking the inputted image is decompressed according to such a zoom compression parameter. Consequently, high-precision distortion correction corresponding to the zoom position can be performed by reducing the amount of the necessary correction data.

Further, the distortion correction parameters for distortion correction, which are compressed in a zooming direction, and a horizontal direction and a vertical direction of an image, are decompressed in each of the directions according to the designated coordinate and the zoom positions, and utilized for correcting distortion of the image. Accordingly, the amount of necessary distortion correction data is reduced, while high precision distortion correction according to the zoom position can be achieved. Further, if the distortion correction processing of one line is performed, interpolation calculations of the correction parameters corresponding to the zooming direction and the vertical direction are performed in a horizontal retrace period. Then, interpolation calculation of the correction parameters corresponding to the horizontal direction is performed in an image effective period by using the obtained correction parameters. Accordingly, when the distortion correction processing is performed, processing load on the decompression processing of the correction parameters can be reduced. Consequently, the size of the decompression circuit and the manufacturing cost thereof can be suppressed. Additionally, the decompression processes respectively corresponding to the directions can be achieved by sharing a single decompression circuit.

BRIEF DESCRIPTION OF THE DRAWINGS

The above and other objects, features and advantages of the present invention will become more apparent from the following description of the presently preferred exemplary embodiment of the present invention taken in conjunction with the accompanying drawing, in which:

FIG. 9 is a flowchart showing the flow of a process performed in a correction parameter decoder in a first embodiment of the present invention;

FIG. 23 is a flowchart showing the flow of a distortion correction process performed in a third embodiment of the present invention;

DETAILED DESCRIPTION OF THE EMBODIMENTS

Hereinafter, embodiments of the present invention are described in detail with reference to the accompanying drawings. In the following description of each of the embodiments, an imaging system including an imaging apparatus for imaging and recording an image, to which the present invention is applied, is described by way of example. Additionally, a digital video camera is assumed as the imaging apparatus.

First Embodiment

Figure 1:
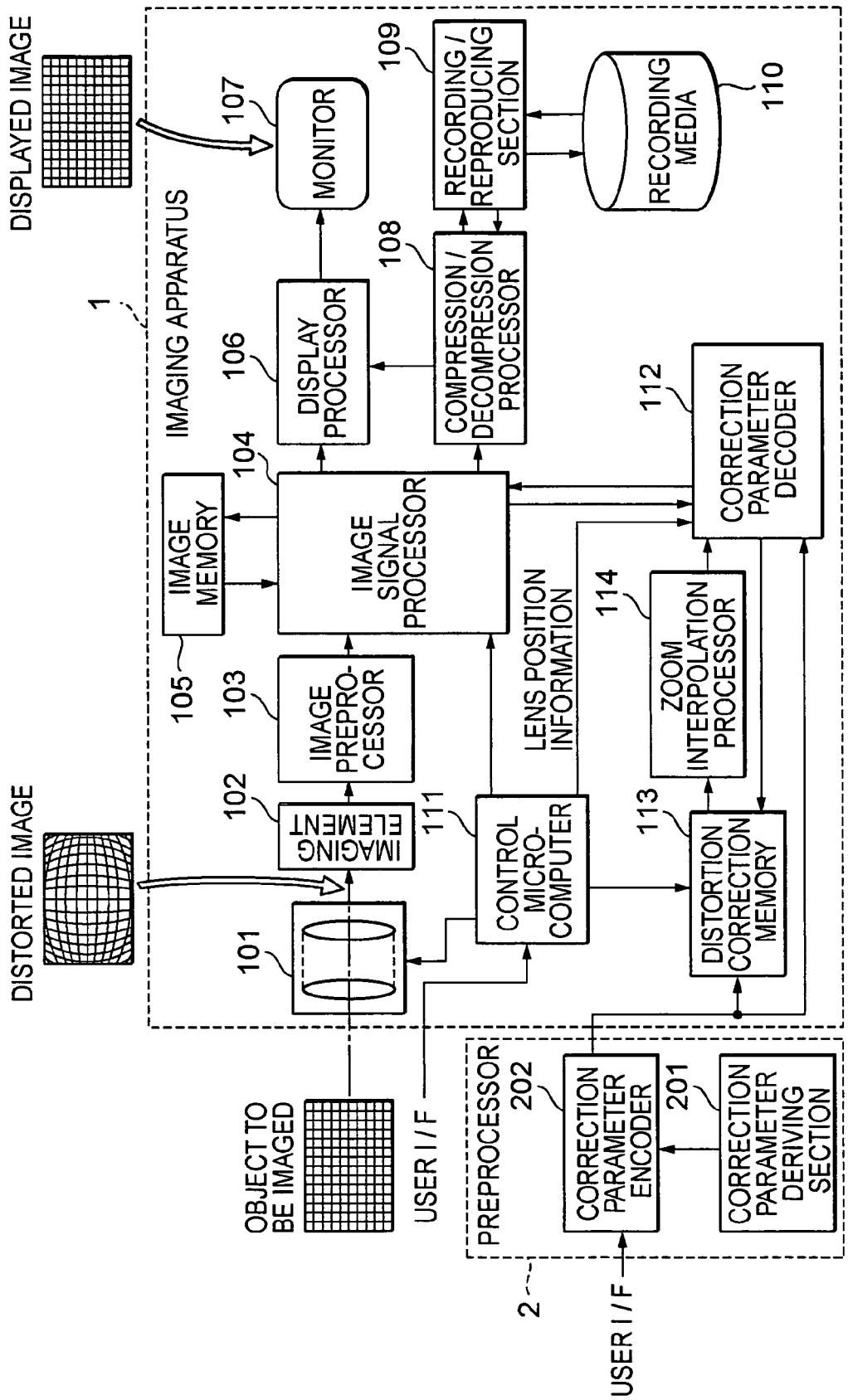
FIG. 1 is a block diagram showing an example of the configuration of an imaging system according to a first embodiment of the present invention.

FIG. 1 is a block diagram showing an example of the configuration of an imaging system according to a first embodiment of the present invention.

The imaging system shown in FIG. 1 is used for capturing an image and recording the image on a recording medium as digital data, and has an imaging apparatus 1 and a preprocessor 2.

The imaging apparatus 1 has an optical block 101, an imaging element 102, an image preprocessor 103, an image signal processor 104, an image memory 105, a display processor 106, a monitor 107, a compression/decompression processor 108, a recording/reproducing section 109, recording media 110, a control microcomputer (hereunder sometimes referred to simply as a microcomputer) 111, a correction parameter decoder 112, a distortion correction memory 113, and a zoom interpolation processor 114. Further, the preprocessor 2 has a correction parameter deriving section 201 and a correction parameter encoder 202.

In the imaging apparatus 1, the optical block 101 includes a converging lens group for converging reflection light reflected from an object to be imaged, and also includes a drive mechanism and the like. The imaging apparatus 1 converges incident light to the imaging element 102. Furthermore, in the present embodiment, the optical block 101 has an optical zoom function. During an optical zoom operation, the driving of the lenses is controlled according to a control signal sent from the control microcomputer 111.

The imaging element 102 may include a CCD or CMOS (Complementary Metal-Oxide Semiconductor) image sensor or the like, and converts the incident light, which is converged by the optical block 101, into electrical signals. The imaging element 102 provides the electrical signals to the image preprocessor 103.

The image preprocessor 103 performs a CDS process, an AGC process, and an A/D conversion process on image signals outputted from the imaging element 102. Then, the image preprocessor 103 supplies the digital image signals to the image signal processor 104.

The image signal processor 104 stores the digital image signals, which are supplied from the image preprocessor 103, in the image memory 105. Further, the processor 104 performs an image quality correction process, such as a distortion correction process, according to the correction amount parameters received from the correction parameter decoder 112. The image memory 105 may be constituted by a semiconductor memory, for instance, a DRAM (Dynamic Random Access Memory).

The display processor 106 generates an image signal, which is used for displaying an image on the monitor 107, according to image signals received from the image signal processor 104 or the compression/decompression processor 108. Then, the display processor 106 outputs the generated image signal to the monitor 107. The monitor 107 may be constituted by, for example, an LCD.

The compression/decompression processor 108 performs compression/decompression processing on the image signals, which are sent from the image signal processor 104, in a predetermined image format, and supplies the processed image signals to the recording/reproducing section 109. Further, the processor 108 performs a decompressing-decoding process on image signals sent from the recording/reproducing section 109 and supplies the decompressed signal to the display processor 106.

The recording/reproducing section 109 writes the image signal, which is compressed-encoded by the compression/decompression processor 108, to the recording media 110. Further, the recording/reproducing section 109 supplies image data, which is read from the recording media 110, to the compression/decompression processor 108. The recording media 110 may be constituted by, for example, a portable semiconductor memory, an optical disk, or a hard disk or the like.

The control microcomputer 109 outputs a command or the like for instructing the image signal processor 104 to perform a predetermined operation, to the image signal processor 104 in response to a control signal received from a user interface (I/F) (not shown). Furthermore, the control microcomputer 109 supplies information on the position of a lens in the optical block 101 to the correction parameter decoder 112. Further, the control microcomputer 109 provides clock signals, which are used for reading data from and writing data to the memory, to the distortion correction memory 113.

The correction parameter decoder 112 decodes the distortion correction parameters, which have been read from the distortion memory 113 and have undergone the decompressing (decoding) in the zooming direction in the zoom interpolation processor 114 by interpolation calculations, in the x-direction and the y-direction as correction amount parameters, which are associated with each pixel, according to the information supplied from the control microcomputer 111. Then, the correction parameter decoder 112 supplies these correction amount parameters to the image signal processor 104.

The distortion correction memory 113 receives the distortion correction parameters, which are inputted from and generated in the correction parameter encoder 202 of the preprocessor 2 by compressing the distortion correction coordinates, and holds these distortion correction parameters. Further, the distortion correction memory 113 outputs the distortion correction parameter held therein to the zoom interpolation processor 114 in response to the correction parameter decoder 112.

The zoom interpolation processor 114 performs an interpolation calculation in the zooming direction by using the distortion correction parameter read from the distortion correction memory 113. Then, the processor 114 supplies the processed distortion correction parameter to the correction parameter decoder 112.

Further, in the preprocessor 2, the correction parameter deriving section 201 creates distortion correction coordinates associated with all pixels of the captured image according to lens data of the lenses mounted in the optical block 101. Then, the preprocessor 2 outputs the created distortion correction coordinates to the correction parameter encoder 202.

The correction parameter encoder 202 generates a distortion correction parameter by performing compression (encoding) in the x-direction, the y-direction, and the z-direction on the distortion correction coordinates, which are outputted from the correction parameter deriving section 201, and stores the generated distortion correction parameter in the distortion correction memory 113. Further, the correction parameter encoder 202 supplies lattice information, which is used during the encoding, to the correction parameter decoder 112.

The preprocessor 2 may as well be constituted by an external information processing device, such as a personal computer provided in the exterior of the imaging apparatus 1. For instance, calculations in the correction parameter deriving section 201 and the correction parameter encoder 202 are operations of large-load. The influence of these calculations on a real time distortion correction to the imaging operation of the imaging apparatus 1 is eliminated by performing these calculations in the external information processing device. Further, it is sufficient to provide information, which is to be provided to the distortion correction memory 113 and the correction parameter decoder 12 from the correction parameter decoder 202, at an initial operation, such as a power-on operation.

Hereinafter, first, a basic operation of the imaging apparatus 1 is described.

Reflection light from an object to be imaged is converged to the imaging element 102. Then, an analog image signal is outputted from the imaging element 102 to the image preprocessor 103. In the image preprocessor 103, a CDS process, and an AGC process, and the like are performed on the analog image signal provided from the imaging element 102. Then, image signals digitalized by an A/D conversion are provided to the image signal processor 104.

In the image signal processor 104, the inputted digital image signal is stored in the image memory 105. Further, an image quality correction process, such as a distortion correction process, is performed on this digital image signal according t the correction amount parameter received from the correction parameter decoder 112. The processed image signal is supplied to the display processor 106. Consequently, the captured image, whose distortion is corrected, is displayed in the monitor 107.

Further, the image signal having undergone the image quality correction process in the image signal processor 104 is compressed-encoded in the predetermined image format in the compression/decompression processor 108. The compressed-encoded image signal is written to the recording media 110 by the recording/reproducing section 109. Consequently, the recording of the captured image is performed. Incidentally, in addition to this, compressed-encoded image data may be sent to an external device through, for example, a communication I/F.

On the other hand, in a case where the image data recorded in the recording media 110 is reproduced, this image data is read by the recording/reproducing section 109, and subsequently decompressed-decoded in the compression/decompression processor 108. The processed image signals are supplied to the display processor 106. Accordingly, a reproduced image is displayed in the monitor 107.

Meanwhile, when the signal representing the captured image is displayed and recorded, a digital correction process is performed on optical distortion caused in an original image in the image signal processor 104. This optical distortion results from the optical characteristics of the lenses in the optical block 101. To correct such optical distortion, a digital process is performed on the captured image by using distortion correction coordinates set at each of pixels of the image according to the characteristics of the lenses. Accordingly, the captured image is corrected by performing the digital process.

It is necessary to set the distortion correction coordinates for each of all the pixels of the image. This results in a huge amount of data. Accordingly, these distortion coordinates are utilized by being compressed in the x-direction and the y-direction of the image. This data compression is performed by partitioning the distortion-corrected image into regions in a lattice form, and by utilizing lattice positions thereof.

Furthermore, an optical distortion characteristic varies with a lens position condition in an optical zoom operation. Accordingly, it is necessary to utilize correction data set according to the lens position condition. However, the correction data set according to the lens position condition is nonlinear. In addition, a change amount thereof varies with the points in the image. Therefore, it is necessary for performing high-accuracy distortion correction to prepare distortion correction parameters respectively corresponding to all the lens positions. However, the data amount becomes huge.

Accordingly, the distortion correction coordinates are compressed in the zooming direction (the z-direction) in addition to the x-direction and the y-direction. For this purpose, the lens position conditions are partitioned into plural levels within a range between a wide-end and a tele-end. Then, the distortion correction coordinates are compressed in the z-direction by utilizing this partitioning. In the following description, the lens position conditions in the optical zoom mechanism are referred to as zoom positions. Further, partitioning points, at which the lens position conditions are partitioned, between the wide-end and the tele-end are referred to as zoom points.

In the present embodiment, the distortion correction coordinates of all the pixels are encoded in the z-direction, the y-direction, and the x-direction. The encoded distortion correction coordinates are stored in the distortion correction memory 11. Further, the correction parameter decoder 112 having received the coordinates in the captured image from the control microcomputer 111 acquires associated compressed data from the distortion correction memory 113 through the zoom interpolation processor 114 and decodes the acquired data to thereby restore the distortion correction coordinates and output the restored coordinates to the image signal processor 104. This enables the image signal processor 104 to perform the distortion correction process by using the received distortion correction coordinates.

Additionally, the optical distortion characteristic varies with the lens positions in the optical zoom operation. Therefore, strictly speaking, it is preferable to utilize the correction data set according to the lens positions.

Figure 2:
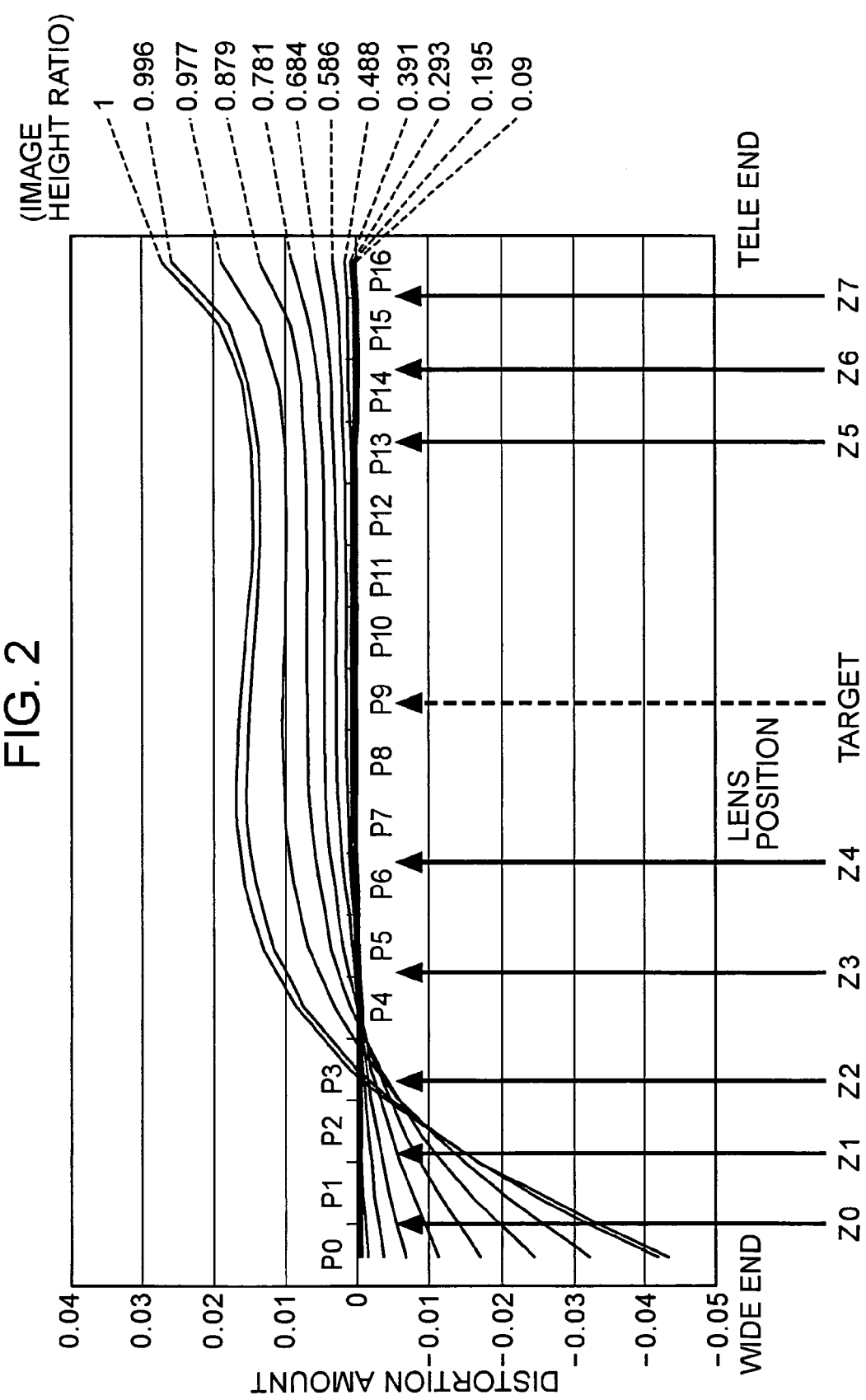
FIG. 2 is a graph showing an example of the relation between lens positions and distortion amounts during a zoom operation, and further showing partitioning-points for partitioning the lens positions.

FIG. 2 is a graph showing an example of the relation between the lens positions and distortion amounts during a zoom operation, and also showing partitioning-points for partitioning the lens positions.

As shown in a graph of FIG. 2, the characteristic of the distortion amount corresponding to each of the lens positions is nonlinear. Moreover, the change amount varies with the points in the image. Therefore, to perform high-precision distortion correction, the correction parameter decoder 112 needs to selectively decode the distortion correction parameter associated with the lens position and to supply the decoded parameter to the image signal processor 104. However, when distortion correction coordinates respectively corresponding to all the lens positions are prepared, the amount of the data is huge.

In order to address this issue, an embodiment of the present invention has features such that the zoom positions within a range between the wide-end and the tele-end are partitioned into plural regions, that then, the distortion correction parameters are encoded in the zooming direction by utilizing this partitioning. Further, the embodiment of the present invention has features such that, if the distortion correction is performed, an interpolation process is performed by using a necessary distortion correction parameter corresponding to an actual lens position, and that thus, the distortion correction parameter corresponding to this lens position is decoded. Consequently, the present embodiment manages to simultaneously reduce the amount of necessary data and enhance the distortion correction precision. In the case of the present embodiment, such an interpolation process in the zooming direction is performed in the zoom interpolation processor 114. The interpolated distortion correction parameters are further decoded in the correction parameter decoder 112 in the x-direction and they-direction. The decoded parameters are utilized in the image signal processor 104.

In the following description, the lens position conditions in the optical zoom mechanism controlled by the control microcomputer 111 are referred to as zoom positions. Further, partitioning points, at which the lens position conditions are partitioned, between the wide-end and the tele-end (including both the ends) are referred to as zoom points.

In the example shown in FIG. 2, the lens in the optical zoom mechanism is assumed to take zoom positions P0 to P16 between the wide-end and the tele-end. Further, zoom points Z0 to Z7 are provided as those for encoding the distortion correction parameter in the zooming direction. In a zone in which change in the distortion amount caused by shifting the zoom position is small, the intervals of the zoom points are set to be wider. In a zone in which change in the distortion amount caused by shifting the zoom position is large, the intervals of the zoom points are set to be narrower. Accordingly, the distortion correction precision can be enhanced.

In the description of the present embodiment, the case of using linear interpolation in the interpolation calculation in the zooming direction is described. Concretely, it is assumed that an interpolation calculation in the zooming direction is performed by using the distortion correction parameters respectively associated with two zoom points, which are located on both sides of a zoom position. For example, if the zoom position in the optical zoom mechanism in the imaging operation is P9, as shown in FIG. 2, the interpolation calculation is performed by using, for example, the distortion correction parameters respectively corresponding to the zoom points Z4 and Z5 located closely to this position P9. Accordingly, a distortion correction parameter corresponding to the position P9 is calculated, so that the distortion correction process can be performed. Further, in the interpolation calculation, a phase associated with the zoom position between the selected zoom points is used.

In addition to the linear interpolation, for instance, a method of approximating plural zoom positions between zoom points with a polynomial of the degree n (incidentally, n is a natural number) may be employed for the interpolation calculation in the zooming direction. In this case, a piecewise polynomial of the degree n for obtaining distortion correction data respectively corresponding to intervals of plural zoom points selected according to the zoom position.

The designation of a magnification of the optical zoom mechanism is inputted to the control microcomputer 111 through the user I/F. The control microcomputer 111 controls the zoom position of the optical block 101 and outputs the zoom position information to the parameter decoder 112. At that time, the control microcomputer 111 recognizes the two zoom points located on both sides of the zoom position. A value obtained by adding a numerical value, which identifies the zoom point at the wide-end side, to a phase coefficient at the zoom position between the two zoom points is set to be zoom position information. Incidentally, the phase coefficient represents the distance from a reference point between the zoom points to the zoom position in a case where the distance between the zoom points is assumed to be 1. In the present embodiment, the reference point is assumed to be the zoom point at the side of the wide-end. In this case, an integral part of zoom position information indicates the wide-end side one of the selected zoom points, while a decimal part of the zoom position information indicates the phase coefficient expressed by employing this zoom point as a reference.

Figure 3:
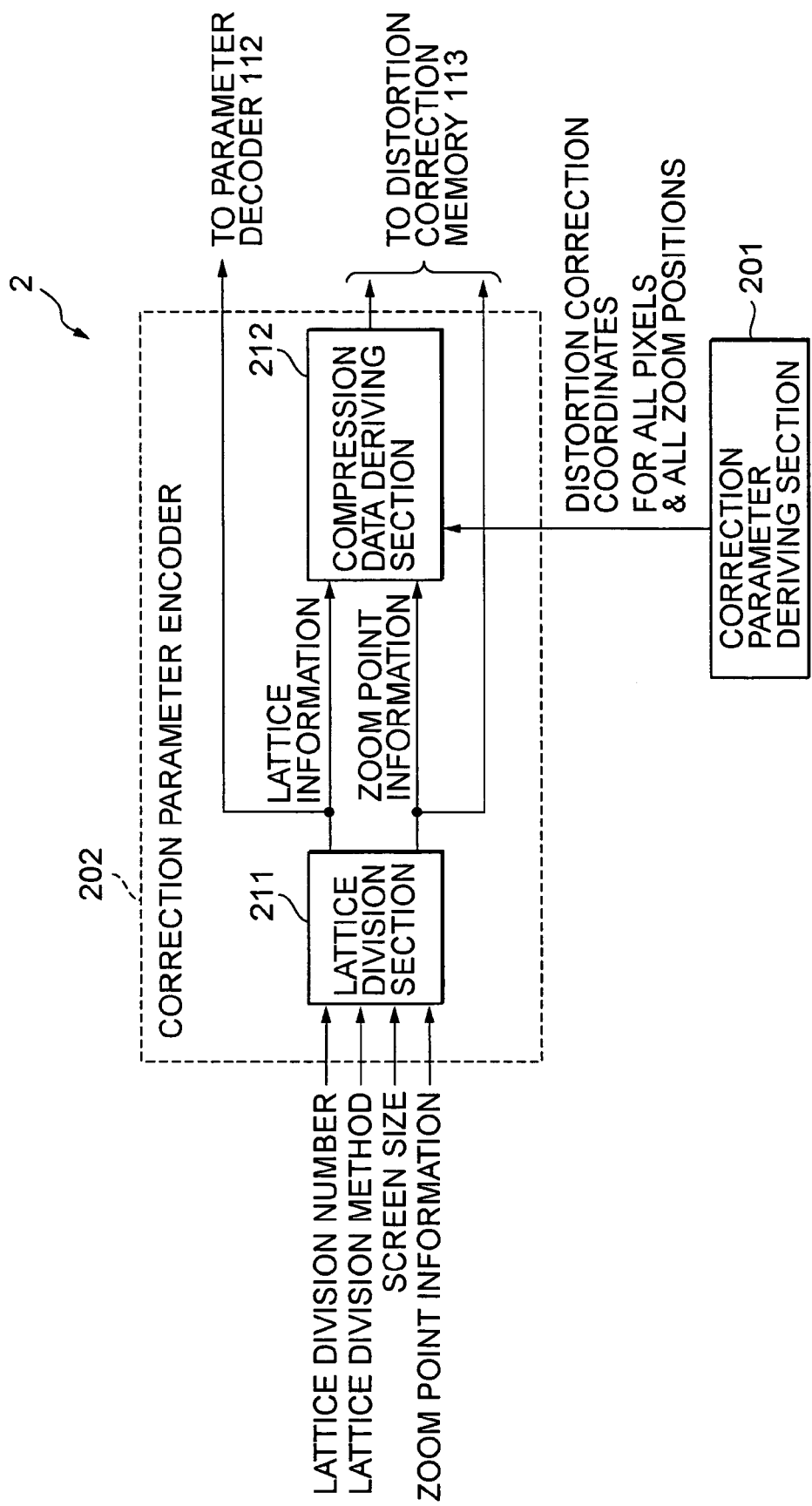
FIG. 3 is a block diagram showing an example of the internal configuration of a correction parameter encoder.

Next, an operation of calculating the parameter for calculating the distortion correction is described. FIG. 3 is a block diagram showing an example of the internal configuration of the correction parameter encoder 202 in the preprocessor 2.

As shown in FIG. 3, the correction parameter encoder 202 has a lattice division section 211 and a compressed data deriving section 212.

The lattice division section 211 determines a lattice division method, which is performed on the entire screen, according to lattice information representing the lattice division method, zoom point information representing the zoom point, information on a screen size and the like, which are inputted through the user I/F or from the imaging apparatus 1. Then, the lattice division section 211 outputs information representing the determined method as lattice information to the compressed data deriving section 212 and the correction parameter decoder 112. Further, the lattice division section 211 determines a zoom-point partitioning method of partitioning the zoom points and outputs information representing the determined zoom-point partitioning method as zoom point information to the compressed data deriving section 212 and the distortion correction memory 113.

The distortion data deriving section 212 receives the inputted distortion correction coordinates respectively corresponding to all the pixels and the zoom positions. Then, the distortion data deriving section 212 compresses the distortion correction coordinates in each of the x-direction, the y-direction, and the zooming direction (the z-direction) according to the lattice information and the zoom point information sent from the lattice division section 211, thereby to calculate the distortion correction parameter. Incidentally, the interpolation calculation methods respectively corresponding to the x-direction, the y-direction, and the zooming direction (the z-direction) are not necessarily the same method. In the present embodiment, the interpolation by approximation using the piecewise polynomial of the degree n is used as the interpolation method corresponding to the x-direction and the y-direction. The linear interpolation is used as the interpolation method corresponding to the zooming direction (the z-direction).

The compressed data deriving section 212 generates a discrete function according to the distortion correction coordinates of all lattice segments, into which the lattice is divided in the lattice division section 211, and the positions of the lattice segments. Then, the section 212 approximates the function with the piecewise polynomial of the degree n to be obtained. Further, the section 212 outputs information on the coefficients of this piecewise polynomial of the degree n to the distortion correction memory 113 as the distortion correction parameter to be decoded. Incidentally, the term "lattice segment" represents a segment sectioned by lattice lines at both ends thereof (a segment drawn between lattice points).

The polynomial of the degree n is given by the following expression:

$$F(x)=a(n)*xn+a(n-1)*x(n-1)+a(n-2)*x(n-2)+\ldots+a(0) \quad (1)$$

The piecewise polynomial of the degree n is a function expressed by the polynomial of the degree n, as given in the expression (1), only in an interval partitioned in a certain effective range, where "n" is a natural number.

Incidentally, in the case where the screen is divided in a lattice form, for example, a method employing the entire screen as an object to be divided, or a method of employing ¼ of the screen as an object to be divided is employed. These methods are selected according to the characteristic of the distortion. Furthermore, as the lattice division method, there have been proposed, for instance, a method of dividing the screen at uniform intervals, a method of dividing the distance from the center of the screen to the end by a power of 2, and a method of utilizing distortion correction coordinates at top and bottom ends and lateral ends of the screen, at each of which large distortion occurs, and creating a function of the distortion correction coordinates and the position, and searching for division positions, at which an error between the function and the piecewise polynomial of the degree n is minimized, by using the piecewise polynomial of the degree n.

Further, the calculation of the piecewise polynomial of the degree n is performed, for example, in the following manner. Hereunder, a second degree polynomial is described by way of example. First, one lattice segment is selected. Incidentally, for instance, let x1=X0+1. It is assumed that a piecewise polynomial of the degree n passing through three points (x0. h(x0)), (x1. h(x1)), (x2, h(x2)) is calculated. The calculation thereof is performed between both ends x0 and x2 in the x-direction of the selected lattice segment by incrementing the value of x1 by 1 from x0 to x2 until the value thereof reaches (x2−1). Accordingly, among all the partitioning second-degree piecewise polynomials, a piecewise polynomial of the degree n, which minimizes the error between the original function and the polynomial, is obtained. Upon completion of such a calculation process on all the second-degree piecewise polynomials, such a calculation is performed on all the zoom points.

Figure 4:
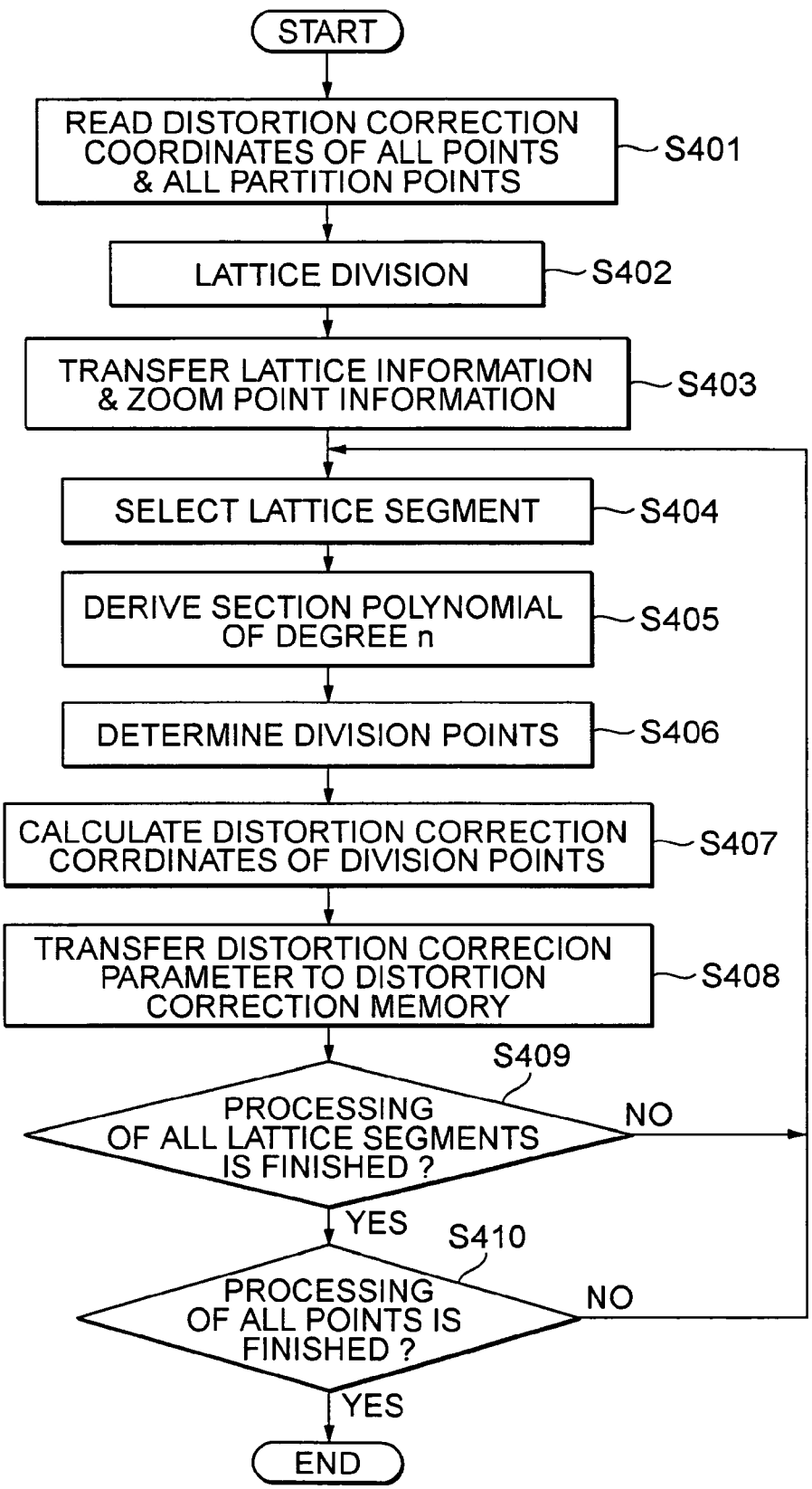
FIG. 4 is a flowchart showing the flow of a process performed in a correction parameter encoder.

FIG. 4 is a flowchart showing the flow of a process performed in the correction parameter encoder 202.

In step S401, the correction parameter encoder 202 reads distortion correction coordinates of all pixels on an object screen from the correction parameter deriving section 201. At that time, the encoder 202 reads all the distortion correction coordinates corresponding to each of the zoom points.

In step S402, the lattice division section 211 divides the screen in a lattice form according to information on the lattice division number, the division method, the screen size, and the like designated through the user I/F.

In step S 403, the lattice information representing the coordinates on the screen divided in a lattice form is transferred to the compressed data deriving section 212 and the correction parameter decoder 112. Further, zoom point information representing the method of partitioning the zoom points is transferred to the compressed data deriving section 212 and the distortion correction memory 113.

A process in steps S404 to S407 is performed by using the distortion correction coordinates corresponding to one zoom point. In step S404, the compressed data deriving section 212 selects one of the lattice segments surrounded by the lattice points.

In step S405, the compressed data deriving section 212 creates a discrete function by letting the y-axis denote the distortion correction coordinates of all points included in the selected lattice segment and also letting the x-axis denote the distances on the lattice line. This discrete function is approximated with the piecewise polynomial of the degree n. Consequently, the piecewise polynomial of the degree n serving as an approximate expression is derived.

In step S406, the coefficients of the derived piecewise polynomial of the degree n are transferred to the distortion correction memory 113 as the distortion correction parameters. Accordingly, the compressed data corresponding to one zoom point and one lattice segment are stored in predetermined regions in the distortion correction memory 113.

In step S407, it is judged whether or not the parameter deriving process to be performed on all the lattice segments on the screen is finished. If finished, the process advances to step S408. Conversely, if not, the process returns to step S404. Thereafter, the processing in steps S404 to S406 is repeatedly performed on all the lattice segments.

If the compressed data deriving process on all the zoom points is not finished in step S408, the process returns to step S404. The processing in steps S404 to S407 is repeatedly performed by using the distortion correction coordinates corresponding to all the zoom points.

The distortion correction coordinates of all the pixels corresponding to all the zoom points are compressed by performing the above process. Then, compressed data is stored in the distortion correction memory 113. Accordingly, an mount of data needed for the distortion correction is reduced. Consequently, the capacity of the distortion correction memory 113 can be decreased. Further, the cost of components and the circuit scale can be reduced.

Figure 5:
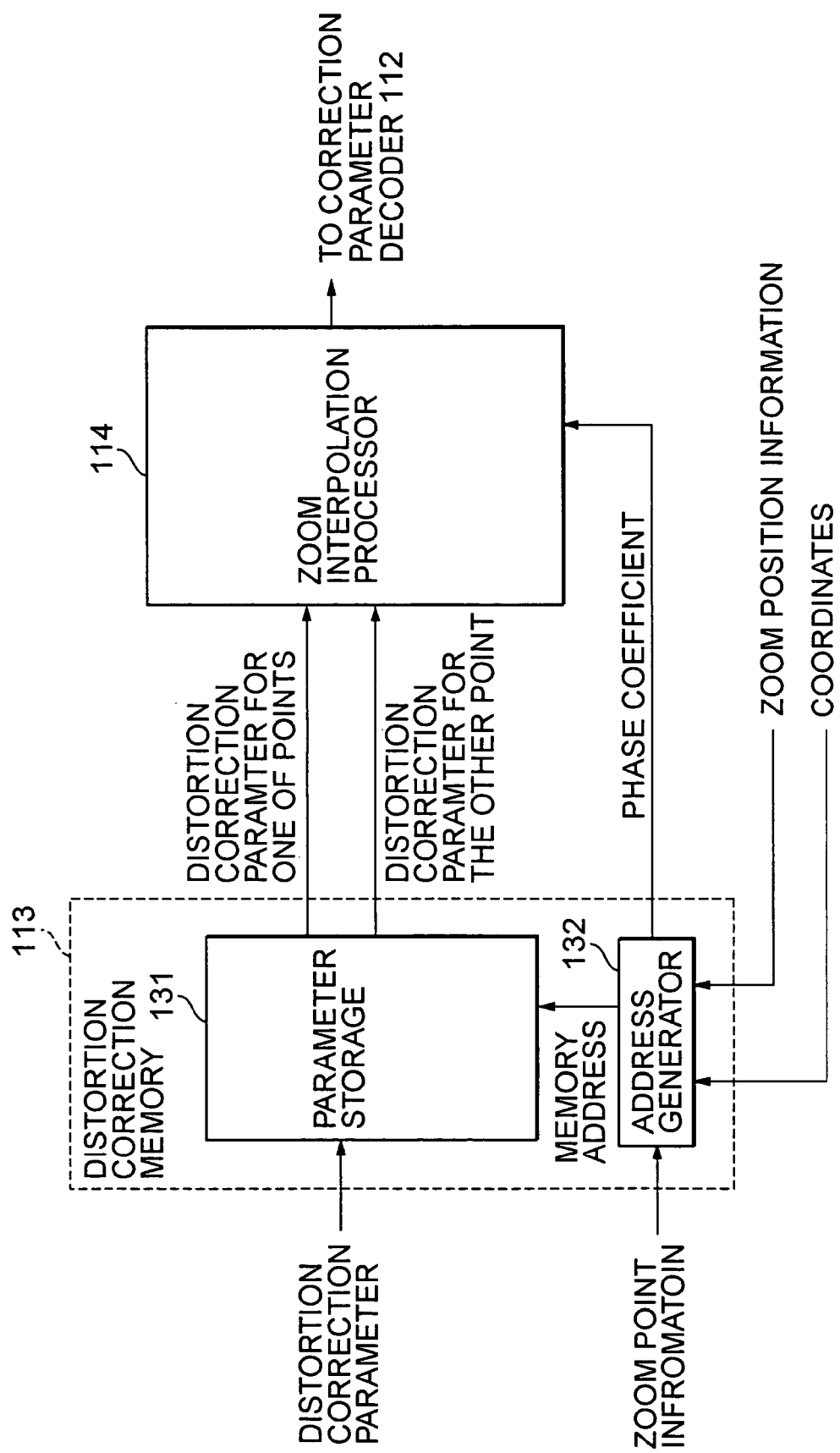
FIG. 5 is a block diagram showing an example of the internal configuration of a distortion correction memory.

Next, the interpolation process of interpolating the distortion correction parameter in the zooming direction is described. First, FIG. 5 is a block diagram showing an example of the internal configuration of the distortion correction memory 113.

The distortion correction memory 113 has a parameter storage 131 and an address generator 132.

The parameter storage 131 stores the storage correction parameter transferred from the correction parameter encoder 202. Further, the storage 131 transfers the distortion correction parameter, which is stored therein, to the zoom interpolation processor 114 according to address assignment by the address generator 132.

The address generator 132 receives the zoom position information and the designation of the coordinates of the pixel designated as an object of correction from the correction parameter decoder 112. Then, the address generator 132 converts the received information and designation into a memory address, at which the correction parameter needed for the calculation is stored, and informs the parameter storage 131 of the memory address designated as a readout address. Further, as will be described later, the address generator 132 also informs the zoom interpolation processor 114 of the phase coefficient of the interval between the zoom points corresponding to the zoom position, which is indicated by a decimal part of the zoom position information. Incidentally, the address generator 132 holds the zoom point information transferred from the correction parameter encoder 202.

According to the zoom position (that is, a current zoom position during an imaging operation) designated by the zoom position information received from the correction parameter decoder 12, the address generator 132 designates the distortion correction parameters corresponding to zoom points, which are located close to the zoom position, as values to be subjected to the interpolation. The address generator 132 designates, for instance, distortion correction parameters respectively corresponding to plural zoom points located on both sides of the current zoom position. Then, the address generator 132 informs the parameter storage 131 of a memory address, at which the distortion correction parameters designated in this manner is stored, and causes the parameter storage 131 to output the distortion correction parameters to the zoom interpolation processor 114. The number of the designated values to be used for the interpolation, and the method of designating thereof are determined according to the interpolation process to be performed in the zoom interpolation processor 114.

It is assumed that, in the present embodiment, the parameter interpolation process of performing the interpolation in the zooming direction is performed by utilizing the distortion correction parameters respectively corresponding to the two zoom points. The address generator 132 designates the distortion correction parameters corresponding to the zoom point specified by the integral part of the zoom position information and to a zoom point, which is a first one located therefrom toward the tele-end, as values to be used for the interpolation, and informs the parameter storage 131 of these parameters and the memory addresses corresponding to thereto. For example, in a case where the zoom points are set, a shown in FIG. 2, when the current zoom position is P9, the distortion correction parameters corresponding to each of the zoom points Z4 and Z5 are utilized as values to be used for the interpolation.

Furthermore, the address generator 132 transfers the phase coefficients of the current zoom position, which is located between the two zoom points (assumed to be Zoom0, Zoom1) specified by the decimal part of the zoom position information to the zoom interpolation processor 114. This information is utilized in the interpolation process in the zooming direction.

Figure 6:
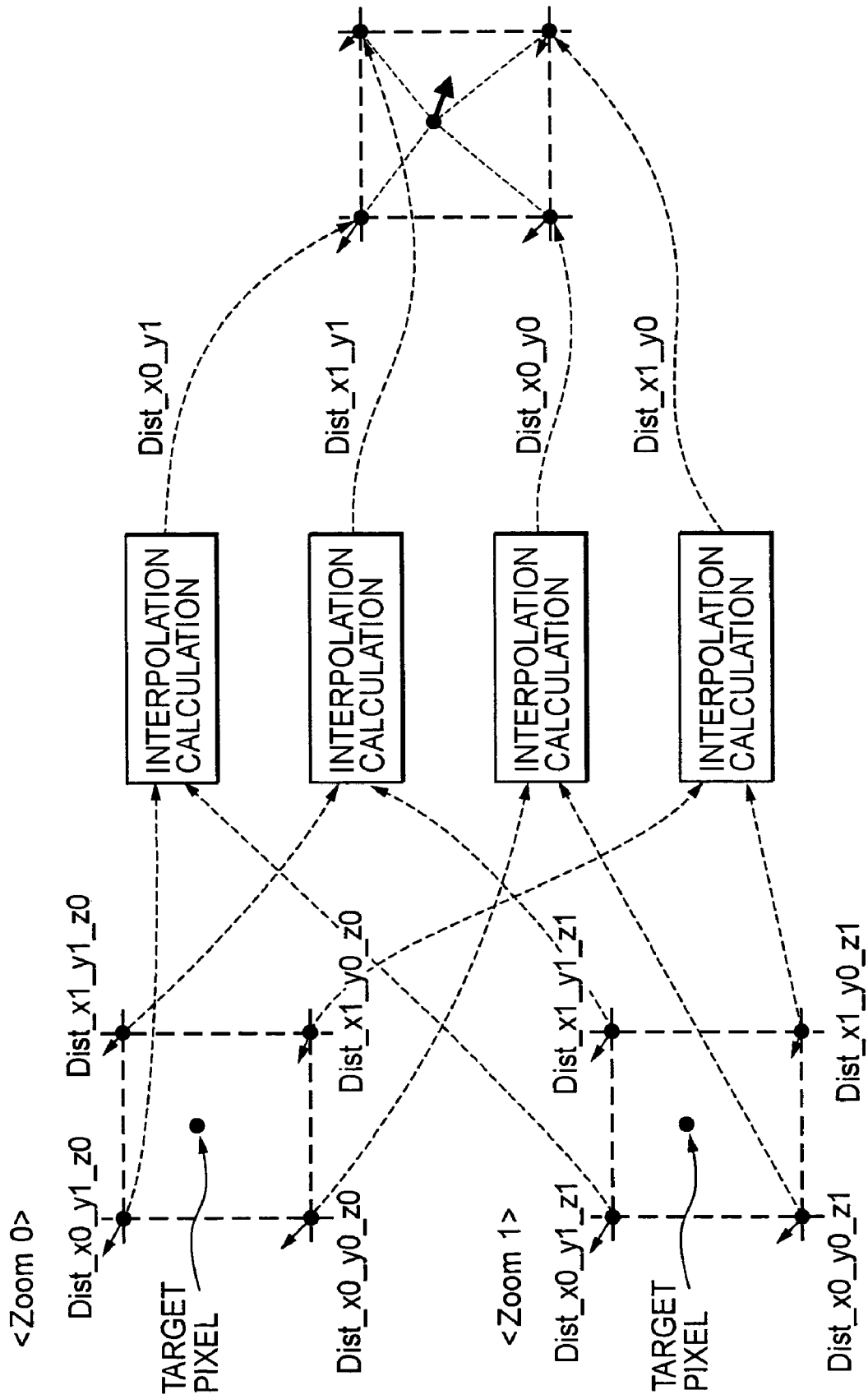
FIG. 6 is a diagram for explaining an interpolation process performed in a zoom interpolation processor.

FIG. 6 is a diagram for explaining an interpolation process performed in the zoom interpolation processor 114.

The parameter storage 131 inputs the distortion correction parameters respectively corresponding to the two zoom points Zoom0 and Zoom1 to the zoom interpolation processor 114. The zoom interpolation processor 114 performs an interpolation calculation on the distortion correction parameters of four lattice points, which are located in the neighborhood of a target pixel, by using the values respectively corresponding to the zoom points Zoom0 and Zoom1, to thereby reduce the dimension of the distortion correction parameters and change the distortion correction parameters to a two-dimensional value.

It is supposed that the distortion correction parameters of the four lattice points in the neighborhood of the target pixel corresponding to the zoom point Zoom0 are Dist_x0_y0_z0, Dist_x0_y1_z0, Dist_x1_y0_z0, and Dist_x1_y1_z0, as shown in FIG. 6, and that the distortion correction parameters of the four lattice points in the neighborhood of the target pixel corresponding to the zoom point Zoom1 are Dist_x0_y0_z1, Dist_x0_y1_z1, Dist_x1_y0_z1, and Dist_x1_y1_z1, as shown in FIG. 6. Further, it is supposed that the phase coefficient at the zoom position, which is supplied from the address generator 132, is represented by "coef" (0<coef<1). The distortion correction parameters of the lattice points Dist_x0_y0, Dist_x0_y1, Dist_x1_y0, and Dist_x1_y1, which are obtained after the interpolation process is performed in the zoom interpolation processor 114 by using the linear interpolation, are calculated according to the following equations (2) to (5):

$$\text{Dist}\_x0\_y0 = \text{Dist}\_x0\_y0\_z0 * (1-\text{coef}) + \text{Dist}\_x0\_y0\_z1 * \text{coef} \quad (2)$$

$$\text{Dist}\_x0\_y1 = \text{Dist}\_x0\_y1\_z1 * (1-\text{coef}) + \text{Dist}\_x0\_y1\_z1 * \text{coef} \quad (3)$$

$$\text{Dist}\_x1\_y0 = \text{Dist}\_x1\_y0\_z0 * (1-\text{coef}) + \text{Dist}\_x1\_y0\_z1 * \text{coef} \quad (4)$$

$$\text{Dist}\_x1\_y1 = \text{Dist}\_x1\_y1\_z0 * (1-\text{coef}) + \text{Dist}\_x1\_y1\_z1 * \text{coef} \quad (5)$$

Figure 7:
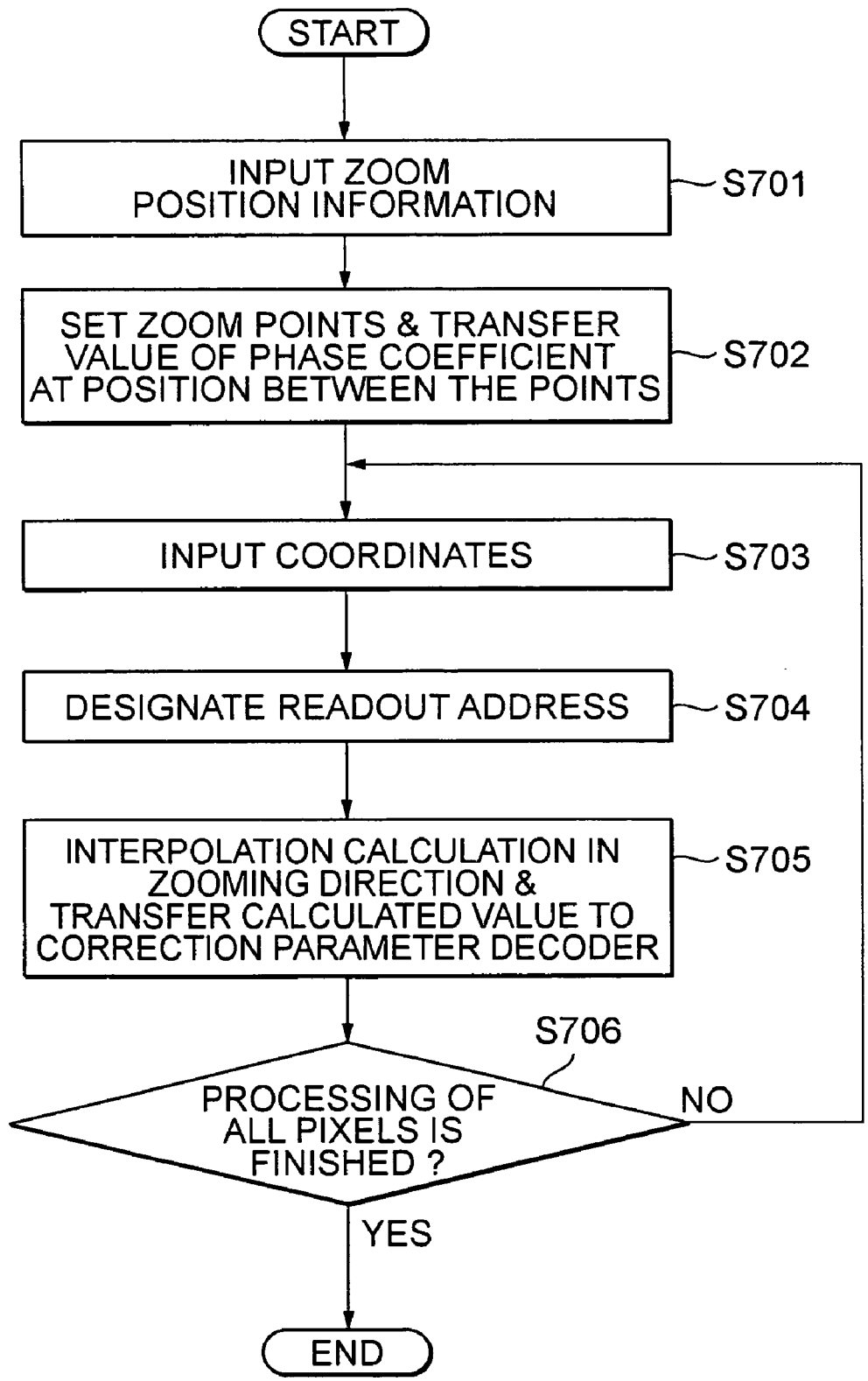
FIG. 7 is a flowchart showing the flow of a process performed in a distortion correction memory and a zoom interpolation processor in a first embodiment of the present invention.

FIG. 7 a flowchart showing the flow of a process performed in the distortion correction memory 113 and the zoom interpolation processor 114.

In step S701, the correction parameter decoder 112 inputs the zoom position information, which represents the zoom points selected according to the current zoom position in the optical zoom mechanism and also represents the phase coefficient thereof, to the distortion correction memory 113.

In step S702, the address generator 132 in the distortion correction memory 113 sets the utilized two zoom points according to the integral part of the inputted zoom position information. Further, the address generator 132 transfers the value of the phase coefficient, which corresponds to the zoom position located between the zoom points, to the zoom interpolation processor 114 according to the decimal part of the zoom position information.

In step S703, the correction parameter decoder 112 inputs the coordinates of the target pixel for the correction to the distortion correction memory 113.

In step S704, the address generator 132 generates a readout address according to the inputted coordinate values and the zoom points set in step S702, and informs the parameter storage 131 of the readout address as the designated address. Consequently, the distortion correction parameters corresponding to the zoom points and the coordinate values are transferred to the zoom interpolation processor 114.

In step 705, the zoom interpolation processor 114 performs an interpolation calculation in the zooming direction by using the distortion correction parameters, which are inputted from the parameter storage 131, and the phase coefficient inputted from the address generator 132. Then, the zoom interpolation processor 114 transfers the distortion correction parameters, which are calculated as data corresponding to the two-dimensional coordinates, to the correction parameter decoder 112.

In step S706, in a case where the interpolation calculation to be performed on the distortion correction parameters corresponding to all the pixels is not finished, the process returns to step S703, whereupon the distortion correction memory 113 receives new coordinate values from the correction parameter decoder 112. Thereafter, the interpolation calculation is similarly performed. Consequently, the distortion correction parameters corresponding to all the pixels are calculated.

The process described in this flowchart is performed every field of the captured image, or every frame thereof. In a case of imaging a motion picture by an interlace method, preferably, the process described in the flowchart is performed by receiving the zoom position information every field in step S701.

Further, in a case where the coordinate values designated by the correction parameter decoder 112 are present in the same lattice, there is no necessity for newly performing the interpolation calculation. Instead, it is sufficient to transfer the distortion correction parameters, which is calculated before then, to the correction parameter decoder 112 again. Alternatively, the process may be adapted so that lattice data including the coordinate values of the target pixel is calculated in the correction parameter decoder 112, and that the address generator 132 is informed of the calculated lattice positions.

The distortion correction parameters are interpolated according to the actual zoom position by performing the above-mentioned process. The distortion correction parameters corresponding to each of the zoom points for partitioning the zoom positions are generated in the correction parameter encoder 202 and stored in the distortion correction memory 113. Accordingly, the amounts of such data can considerably be reduced. Therefore, the capacity of the distortion correction memory 113 can be reduced. The manufacturing cost and the circuit scale thereof can be decreased. Moreover, the amount of calculation performed in the correction parameter encoder 202 can be reduced. Although the above-mentioned advantages are obtained, the distortion correction parameters suitable for the actual zoom position can be calculated by the interpolation calculation in the zooming direction. Accordingly, the distortion correction can be performed with good accuracy.

Figure 8:
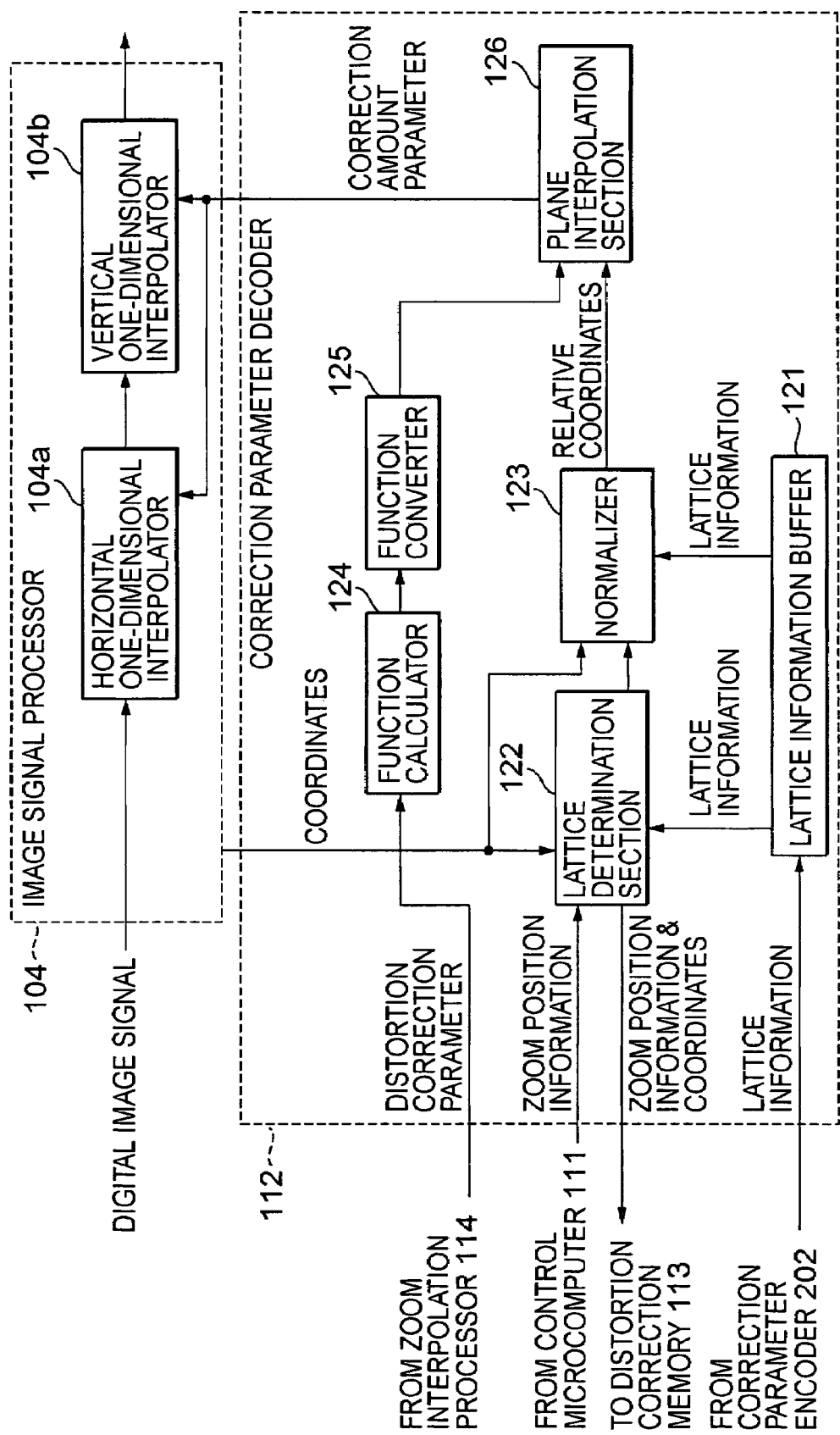
FIG. 8 is a block diagram showing an example of the internal configuration of each of a correction parameter decoder and an image signal processor in a first embodiment of the present invention.

Next, FIG. 8 is a block diagram showing an example of the internal configuration of each of the correction parameter decoder 112 and the image signal processor 104.

As shown in FIG. 8, the correction parameter decoder 112 has a lattice information buffer 121, a lattice determination section 122, a normalizer 123, a function converter 125, and a plane interpolation section 126. Further, the image signal processor 104 has the horizontal one-dimensional interpolator 104a and a vertical one-dimensional interpolator 104b.

In the correction parameter decoder 112, the lattice information buffer 121 holds the lattice information outputted from the correction parameter encoder 202.

The lattice determination section 122 informs the distortion correction memory 113 of the coordinates of the pixel designated by the image signal processor 104 as an object for the correction and the zoom position information from the control microcomputer 111, there by to make a request for readout of the associated distortion correction parameters. Further, the section 102 calculates information representing the lattice, which includes the designated coordinates, by being compared with the lattice position information held in the lattice information buffer 121. Alternatively, the distortion correction memory 113 may be informed of the information specifying the calculated lattice positions.

The normalizer 123 calculates relative coordinates, which are utilized for the four lattice segments surrounding the target pixel, from the lattice positions calculated by the lattice determination section 112 and the lattice information stored in the lattice information buffer 121.

The function converter 125 receives the distortion correction parameter from the zoom interpolation processor 114, and converts the coefficients of the function described therein in a function format utilized in a plane interpolation.

The plane interpolation section 126 creates a plane function by using the coefficients of the plane function obtained by the function converter 125, and acquires coordinates, which are substituted for this function, from the normalizer 123 to thereby calculate distortion correction coordinates. Then, the section 126 transfers the calculated distortion correction coordinates and the relative coordinates calculated by the normalizer 123 to the image signal processor 104 as correction amount parameters.

FIG. 9 is a flowchart showing the flow of a process performed in the correction parameter decoder 112.

In step S901, the decoder 112 reads the lattice information from the correction parameter encoder 202 as initialization. The read lattice information is stored in the lattice information buffer 121.

In step S902, the image signal processor 104 inputs the coordinates of the pixel, which is an object for the correction, thereto and makes a request for decoding the distortion correction parameters. Further, the control microcomputer 111 inputs the zoom position information associated with the zoom position in the optical zoom mechanism at that time.

In step S903, the lattice determination section 122 determines the lattice, which includes the designated pixel, according to the inputted coordinates. Further, the section 122 transfers the inputted coordinates and the zoom position information to the distortion correction memory 113, and makes a request for readout of necessary distortion correction parameters thereto. Consequently, as above-mentioned, the distortion correction memory 113 outputs the distortion correction parameters respectively corresponding to the two zoom points, which are located close to the zoom position, to the zoom interpolation processor 114. Then, the interpolation process in the zooming-direction is performed. The interpolated distortion correction parameters are supplied to the correction parameter decoder 112.

In step S904, the normalizer 123 calculates the relative coordinates utilized in an area surrounded by the lattice segments, which includes the target pixel.

In step S905, the function converter 125 selects one of the four lattice segments surrounding a partitioned region, and also selects the coefficient from the distortion correction parameters sent from the zoom interpolation processor 114.

Accordingly, the function converter 125 restores the piecewise polynomial of the degree n.

In step S906, it is judged whether or not the processing in step S905 has been done on all the four lattice segments. If not, the process returns to step S905. If so, the process advances to step S907.

In step S907, the plane interpolation section 126 derives a plane function from the generated four piecewise polynomials of the degree n.

In step S908, the distortion correction coordinates of the target pixel are derived by substituting the relative coordinates, which are calculated in the normalizer 123, for the derived plane function. Then, the derived distortion correction coordinates are outputted as the correction amount parameters to the image signal processor 104 together with the relative coordinates. For example, the distortion coordinates are set in the integral part of the correction amount parameter therein, while the relative coordinates are set in the decimal part of the correction amount parameter therein.

The distortion correction coordinates of one pixel, which is the target pixel for the correction, are decoded by the above process. Then, the correction amount parameters needed for distortion correction are outputted to the image signal processor 104. Then, in step S909, if a request for finishing the process is made, the process returns to step S902. Thereafter, the system waits for input of the coordinates of the next pixel.

Turning now to FIG. 8, the embodiment is further described. In image signal processor 104, the horizontal one-dimensional interpolation section 104a and the vertical one-dimensional interpolation section 104b perform a one-dimensional interpolation process in the x-direction (the horizontal direction) and a one-dimensional interpolation process in the y-direction (the vertical direction) on the inputted image signal, respectively, according to the correction amount parameters sent from the plane interpolation section 126 of the correction parameter decoder 112 thereby to correct the distortion in each of the directions. In the image signal processor 104, the digital image signal outputted from the image preprocessor 103 is once stored in the image memory 105. Then, first, the horizontal one-dimensional interpolator 104a performs the interpolation in the x-direction on each of pixel signals of this image. Subsequently, the vertical one-dimensional interpolator 104a performs the interpolation in the y-direction on the processed signal.

Accordingly, the interpolation in the x-direction and the interpolation in the y-direction are performed separately, so that each of these interpolation processes can be achieved by performing one-dimensional interpolation calculation, the processing load of which is small. Moreover, these interpolation processes are set to be one-dimensional ones. This enables the use of a four-tap filter for cubic interpolation, or of a filter having a higher number of taps. Accordingly, a higher-quality image can be obtained.

In the above-mentioned embodiment, the distortion correction parameters corresponding to each of the zoom points for partitioning the zoom positions are generated and stored in the distortion correction memory 113. Accordingly, the amount of these data is considerably reduced. The capacity of the distortion memory 113 is decreased to thereby reduce the manufacturing cost and the circuit scale thereof. Furthermore, the interpolation calculation in the zooming direction is performed in the zoom interpolation processor 114 to thereby calculate the distortion correction parameters corresponding to the actual zoom position. Consequently, high-precision distortion correction is enabled.

Low-cost and high-precision distortion correction is enabled by performing the digital signal processing. Accordingly, the flexibility in designing the lens is enhanced. The miniaturization and the cost-reduction of the lens can easily be achieved.

In the above-mentioned embodiment, the distortion correction parameters encoded in the preprocessor 2 are preliminarily stored in the distortion correction memory 113. However, the system may be adapted so that the preprocessor 2 encodes the distortion correction parameter in response to each request from the correction parameter decoder 112 and supplies the encoded parameter to the zoom interpolation processor 114 without being provided with the distortion correction memory 113. In such a case, the amount of necessary distortion correction parameters is suppressed. Accordingly, the processing load on the preprocessor 2 can considerably be reduced. Further, the distortion correction parameter can be read in real time in synchronization with the distortion correction process. Enhancement of real-time capability thereof enables low-cost and high-precision distortion correction of not only still images but motion pictures to thereby provide large merits.

Further, the system may be configured so that the encoded distortion correction parameters are received in real time from an external apparatus through the communication I/F and used for the distortion correction. Similarly, in this case, an amount of communicated data is decreased. Accordingly, a load on a communication line is reduced.

The above-mentioned embodiment is configured such that after the distortion correction parameters encoded in the x-direction and the y-direction are acquired and then decoded in the correction parameter decoder 112, the distortion correction is performed by supplying the decoded parameters to the image signal processor 104. Alternatively, the present invention may be applied to a configuration in which the distortion correction data decoded in the x-direction and the y-direction are received from an external device or held in a memory. In such an alternative example, as compared with the above-mentioned embodiment, an amount of data to prepare and a calculation amount may be larger, thereby requiring higher memory capacity and larger computing power.

Second Embodiment

Hereinafter, a second embodiment of the present invention is described in detail by referring to the accompanying drawings.

In the first embodiment of the present invention, if image signals representing a captured image are displayed and recorded, a digital correction process is performed on optical distortion caused in an original image in the image signal processor 104. This optical distortion results from the optical characteristics of the lenses in the optical block 101. To correct such optical distortion, a digital process is performed on the captured image by using distortion correction coordinates set at each of pixels of the image according to the characteristics of the lenses. Accordingly, the captured image is corrected by performing the digital process.

It is necessary to set the distortion correction coordinates corresponding to each of all the pixels of the image. This results in a huge amount of data. Accordingly, these distortion coordinates are utilized by being compressed in the x-direction and the y-direction of the image. This data compression is performed by partitioning the distortion-corrected image into regions in a lattice form, and by utilizing the lattice positions thereof.

Further, an optical distortion characteristic varies with the lens position condition in the optical zoom operation. Accordingly, it is necessary to utilize correction data provided according to the lens position condition. However, the correction data provided according to the lens position condition is nonlinear. Moreover, a change amount thereof varies with the points in the image. Accordingly, it is necessary for performing high-accuracy distortion correction to prepare distortion correction parameters respectively corresponding to all the lens positions. However, the data amount becomes huge.

Accordingly, the distortion correction coordinates are compressed in the zooming direction (the z-direction) in addition to the x-direction and the y-direction. To this end, the lens position conditions are partitioned into plural levels between a wide-end and a tele-end. Subsequently, the distortion correction coordinates are compressed in the z-direction by utilizing this partitioning. Incidentally, in the following description, the lens position conditions in the optical zoom mechanism are referred to as zoom positions. Further, partitioning points, at which the lens position conditions are partitioned, between the wide-end and the tele-end are referred to as zoom points.

In the imaging system shown in FIG. 1, the preprocessor 2 encodes the distortion correction coordinates of all the pixels in the z-direction, the y-direction, and the x-direction. The encoded coordinates are stored in the distortion correction memory 113 as distortion correction parameters. Then, the correction parameter decoder 112 having received the coordinates in the captured image from the control microcomputer 111 reads necessary distortion correction parameters from the distortion correction memory 113. Subsequently, the correction parameter decoder 112 performs interpolation calculation according to the zoom position at that time and to the coordinates of the pixel, which is the target pixel for the correction. Accordingly, the decoder 112 decodes the distortion correction coordinates set at this pixel and outputs the decoded coordinates to the image signal processor 104. Consequently, the image signal processor 104 is enabled to perform the distortion correction process by using the received distortion correction coordinates and the like.

The zoom position of the optical zoom mechanism is controlled by the control microcomputer 111 according to a control signal inputted thereto through the user I/F. In response to this control signal, the control microcomputer 111 outputs a control signal for controlling the zoom position to the optical block 101 and also outputs zoom position information to the correction parameter decoder 112. At that time, the control microcomputer 111 recognizes the zoom point that is present at the wide-end side of the designated zoom position. A value obtained by adding a numerical value, which identifies this zoom point at the wide-end side, to a phase coefficient at the zoom position in an interval between adjoining zoom points at the tele-end side of the zoom point to be identified is set to be zoom position information. Incidentally, the phase coefficient represents the distance from a reference point between the zoom points to the zoom position in a case where the distance between the zoom points is assumed to be 1. In the present embodiment, the reference point is assumed to be the zoom point at the side of the wide-end. In this case, an integral part of zoom position information indicates the wide-end side one of the selected zoom points, while a decimal part of the zoom position information indicates the phase coefficient expressed by employing this zoom point as a reference.

Case of Utilizing Linear Interpolation:

Next, the imaging system is described in detail by exemplifying a case of utilizing the linear interpolation in the interpolation calculations in the x-direction, the y-direction, the z-direction of the distortion correction data. First, an operation of calculating the distortion correction parameter is described.

FIG. 3 is a block diagram showing an example of the internal configuration of the correction parameter encoder 202 in the preprocessor 2.

As shown in FIG. 3, the correction parameter encoder 202 has a lattice division section 211 and a compressed data deriving section 212.

The lattice division section 211 determines a lattice division method, which is performed on the entire screen, according to lattice information representing the lattice division method, zoom point information representing the zoom point, information on a screen size and the like, which are inputted through the user I/F or from the imaging apparatus 1. Then, the lattice division section 211 outputs information representing the determined method as lattice information to the compressed data deriving section 212 and the correction parameter decoder 112. Further, the lattice division section 211 determines a zoom-point partitioning method of partitioning the zoom points and outputs information representing the determined zoom-point partitioning method as zoom point information to the compressed data deriving section 212 and the distortion correction memory 113.

The distortion data deriving section 212 receives the inputted distortion correction coordinates respectively corresponding to all the pixels and the zoom positions. Then, the distortion data deriving section 212 compresses the distortion correction coordinates in each of the x-direction, the y-direction, and the zooming direction (the z-direction) according to the lattice information and the zoom point information sent from the lattice division section 211, thereby to calculate the distortion correction parameter. Incidentally, in this case, the same interpolation calculation method is employed for operations of decoding in the x-direction, the y-direction, and the z-direction.

FIG. 10 is a diagram for explaining interpolation calculations, which respectively correspond to the x-direction, the y-direction and the z-direction and are performed on distortion correction data, by utilizing the linear interpolation.

Figure 10A:
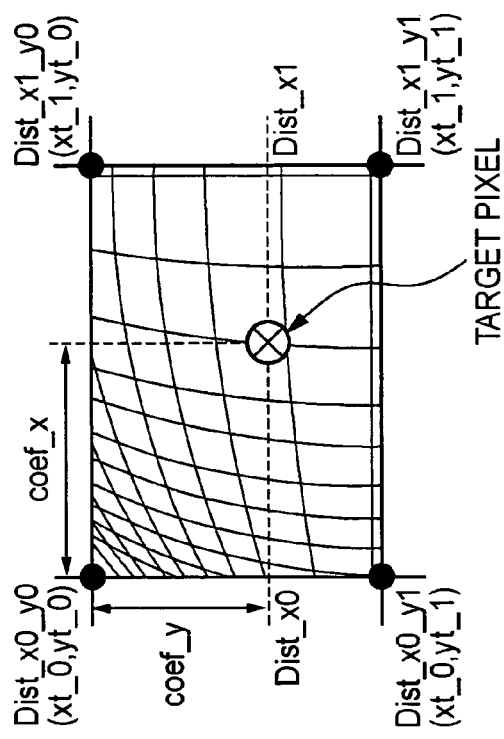
FIG. 10 is a diagram for explaining interpolation calculations, which respectively correspond to the x-direction, the y-direction and the z-direction and are performed on distortion correction data, by utilizing linear interpolation in a second embodiment of the present invention.

As above-mentioned, the compressed data deriving section 212 encodes the distortion correction coordinates, which correspond to all the pixels and all the zoom positions, according to information on the lattice divided in the x-direction and the y-direction and information on the zoom points divided in the z-direction. In the case of utilizing the linear interpolation, as shown in FIG. 10(A), the distortion correction coordinates respectively corresponding to the four lattice points of a single lattice region are set to be encoded distortion correction parameters. Further, adjacent lattice regions share the associated lattice points. Accordingly, one screen needs the distortion correction coordinates of the number of the lattice points. Moreover, the distortion correction coordinates are also encoded in the z-direction. Accordingly, the distortion correction coordinates of the number of the zoom points are needed.

In the imaging system, for instance, in the compressed data deriving section 212, the distortion correction parameters encoded corresponding to all the pixels and all the zoom points are preliminarily generated. These distortion correction parameters are stored in the distortion correction memory 113 in an initial operation, such as a power-on operation. Incidentally, at that time, the correction parameter decoder 112 is informed of the lattice information and the zoom point information. Then, the correction parameter decoder 112 reads and decodes necessary distortion correction parameters from the distortion correction memory 113.

In the case of using the linear interpolation, the distortion correction parameters that the correction parameter decoder 112 needs to acquire so as to perform distortion correction process on the image of one field (or one frame) are distortion correction coordinates extracted from the two zoom points located on both sides of the designated zoom position, as shown in FIG. 10(A). An amount of distortion correction coordinate data is reduced by the encoding. Accordingly, the capacity of the distortion correction memory 113 is decreased. The cost of components and the circuit scale are reduced.

In addition, for example, the system may be adapted as follows. The correction parameter decoder 112 makes a request to the correction parameter encoder 202 for data transfer, for example, during a decoding operation. In response to this, the correction parameter encoder 202 generates necessary distortion correction parameters. The generated parameters are stored in the distortion correction memory 113. In this case, the distortion correction parameters respectively corresponding to the two zoom points located on both sides of the designated zoom position are transferred to the distortion correction parameters. Therefore, it is sufficient for the distortion correction memory 113 to have two memory areas respectively associated with the zoom points.

Next, a decoding operation of the correction parameter decoder 112 is described.

When a distortion correction process to be performed on the image of one field is started, the correction parameter decoder 112 identifies two zoom positions, which are located on both sides of the zoom position based on the zoom position information received from the control microcomputer 111, according to zoom position information. Then, the correction parameter decoder 112 reads the associated distortion correction parameters from the distortion correction memory 113. Subsequently, as shown in FIG. 10(A), the correction parameter decoder 112 receives the distortion correction coordinates respectively corresponding to the four lattice points associated with one of lattice regions in a screen, which correspond to the zoom points.

Figure 10B:
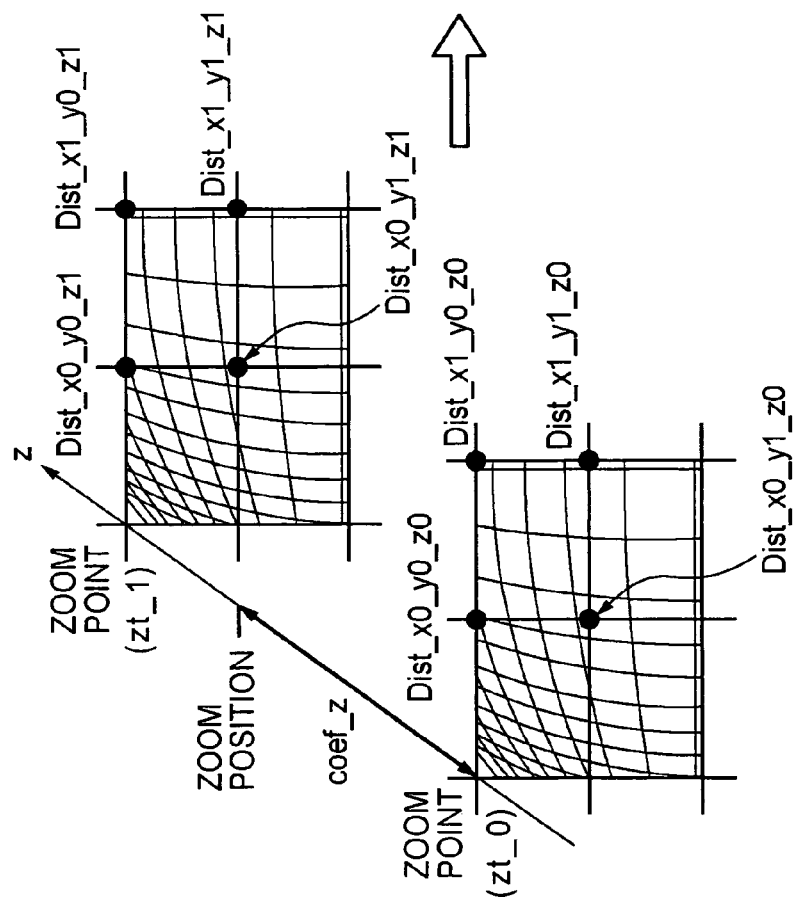

Further, the correction parameter decoder 112 decodes the distortion correction coordinates, which respectively correspond to the lattice points in the lattice, in the z-direction by performing the interpolation calculation between the zoom points. At that time, the correction parameter decoder 112 utilizes the phase coefficient coef_z for interpolation calculation, which corresponds to an interval between the zoom points located on both sides of the designated zoom position according to the zoom position information. Consequently, as shown in FIG. 10(B), the distortion correction coordinates at the lattice points of a lattice region corresponding to the designated zoom position are calculated.

Further, the correction parameter decoder 112 performs interpolation calculation on the distortion correction coordinates set on the lattice lines arranged in the y-direction of a pixel, which is the target pixel for the correction, by utilizing the relative coordinate (that is, the phase coefficient coef_y) corresponding to an interval partitioned by lattices lines arranged in the y-direction on either side of a lattice region including the pixel according to the y-coordinate of this pixel and the lattice information. Accordingly, the correction parameter decoder 112 decodes the distortion correction coordinate in the y-direction. Consequently, the distortion correction coordinate of the lattice points on the lattice line corresponding to the designated y-coordinate is calculated.

Further, similarly, the correction parameter decoder 112 performs interpolation calculation on the distortion correction coordinates set on the lattice lines arranged in the x-direction of a pixel, which is the target pixel for the correction, by utilizing the relative coordinate (that is, the phase coefficient coef_x) corresponding to an interval partitioned by lattices lines arranged in the x-direction on either side of a lattice region including the pixel according to the x-coordinate of this pixel and the lattice information. Accordingly, the correction parameter decoder 112 decodes the distortion correction coordinate in the x-direction. Consequently, the distortion correction coordinate corresponding to one pixel is calculated and supplied to the image signal processor 104.

Accordingly, it is necessary for decoding the distortion correction coordinates associated with one pixel to serially perform interpolation calculation processes respectively corresponding to the z-direction, the y-direction, and the x-direction. Meanwhile, the image signal processor 104 performs the distortion correction process on each of the pixels by sequentially scanning on pixels in the image in the horizontal direction.

Figure 11:
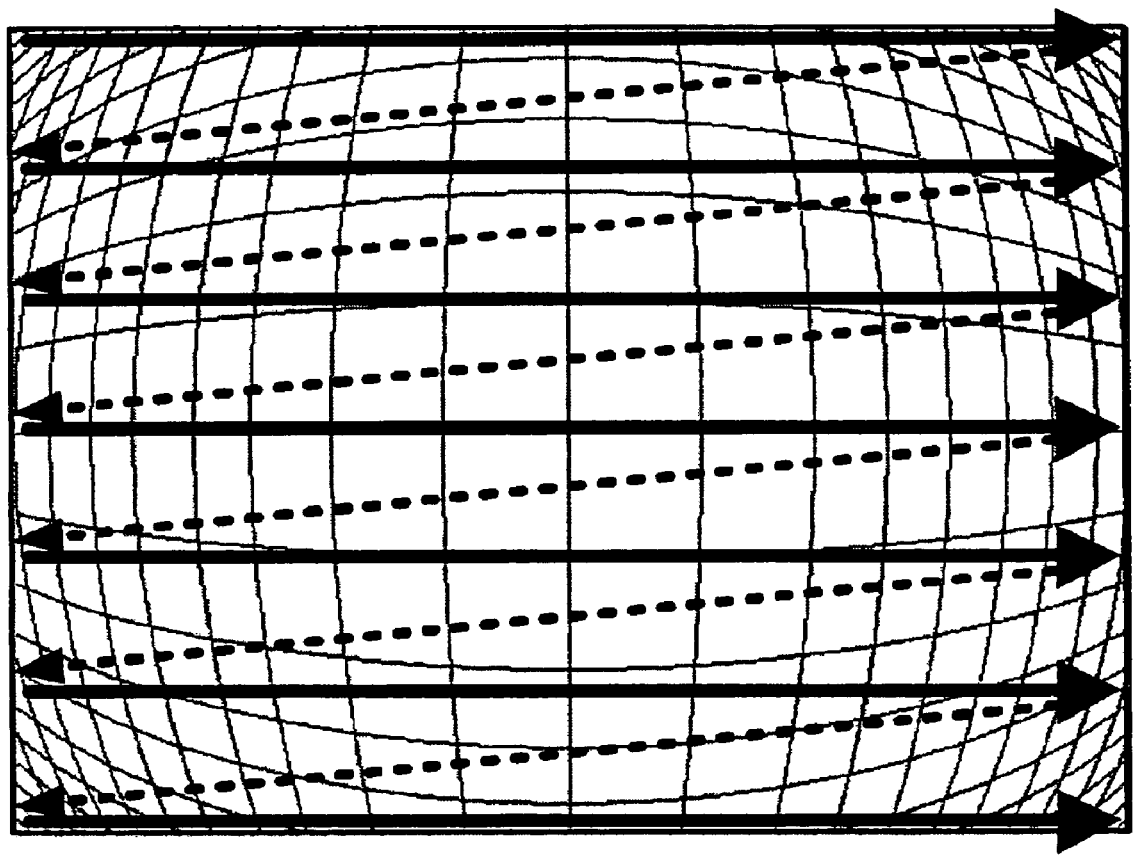
FIG. 11 is a diagram schematically explaining the scanning of pixels during a distortion correction process is performed.

FIG. 11 is a diagram schematically explaining the scanning of pixels during the distortion correction process is performed.

As illustrated in FIG. 11, the distortion correction process is performed by serially selecting pixels of a horizontal one line from a leftward top position and then sequentially and vertically selecting lines, as viewed in this figure. Therefore, as such scanning is performed, the coordinates are serially designated to the correction parameter decoder 112. The distortion correction coordinate corresponding to the designated pixel is decoded.

In a case where the distortion correction process of one line is performed, the y-coordinate designated to the correction parameter decoder 112 is invariable. Accordingly, during the decoding of one line, the distortion correction parameters obtained by decoding thereof in the z-direction and the y-direction can be used in common. Accordingly, the utilization of a horizontal retrace period just before the start of processing of one line enables the imaging apparatus 1 to preliminarily calculate a distortion correction parameter, which can be shared for this line, and to perform only decoding in the x-direction in an image effective period. Consequently, the diversification of load on the decoding process is enabled.

Figure 12:
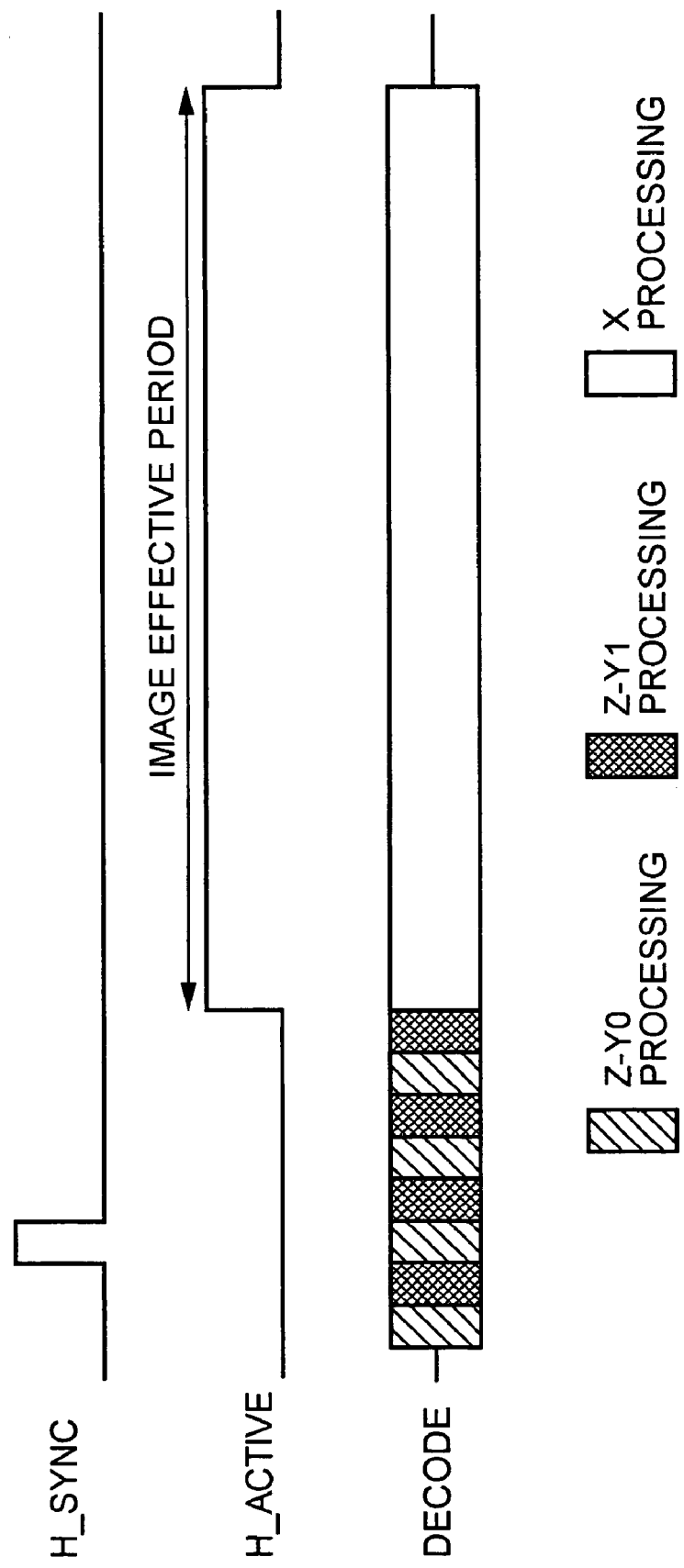
FIG. 12 is a chart showing the decoding timing with which distortion correction parameters of one line are decoded.

FIG. 12 is a chart showing the decoding timing with which distortion correction parameters of one line are decoded.

FIG. 12 shows decoding timing in a case where the lattice division number in the x-direction is 3. In FIG. 12, "H_ACTIVE" denotes an image effective period in one line and is generated in the imaging apparatus 1 according to a horizontal synchronization signal (H_SYNC) and a vertical synchronization signal. Further, "Z-Y0 PROCESS" designates a process of decoding the distortion correction parameter in the z-direction, which corresponds to an upper lattice point of a lattice region including an object line. Furthermore, "Z-Y1 PROCESS" designates a process of decoding the distortion correction parameter in the z-direction, which corresponds to a lower lattice point of the lattice region including an object line. Additionally, "X-PROCESS" designates a process of decoding the distortion correction parameter corresponding to each of pixels scanned in the x-direction by using those decoded in the z-direction and the y-direction.

In a case where the linear interpolation is used, the distortion correction parameters on one lattice line arranged in the y-direction are decoded by a combination of "Z-Y0 PROCESS" and "Z-Y1 PROCESS". Therefore, these processes are performed on each of the four lattice segments intersecting therewith in the x-direction (that is, the four lattice points), so that the distortion correction coordinates decoded in the z-direction and the y-direction (that is, the coordinates decoded in the x-direction) are generated. The apparatus is controlled so that the above-mentioned process is performed in an image ineffective period, and that only "X-PROCESS" is performed in the effective period.

The diversification of the load on the decoding process is achieved by such a control operation. Accordingly, even when a lower processing power decoding circuit is used, the decoding of the distortion correction parameter can easily be synchronized with the distortion correction process corresponding to each of the pixels.

Additionally, the decoding process in each direction is performed in a time sharing manner. Accordingly, in the case of using the same interpolation calculation method in the decoding processes in the respective directions, an interpolation calculation processing circuit can be shared therewith. Hereinafter, an example of the circuit configuration, in which an interpolation calculation processing circuit is shared, is described.

Figure 13:
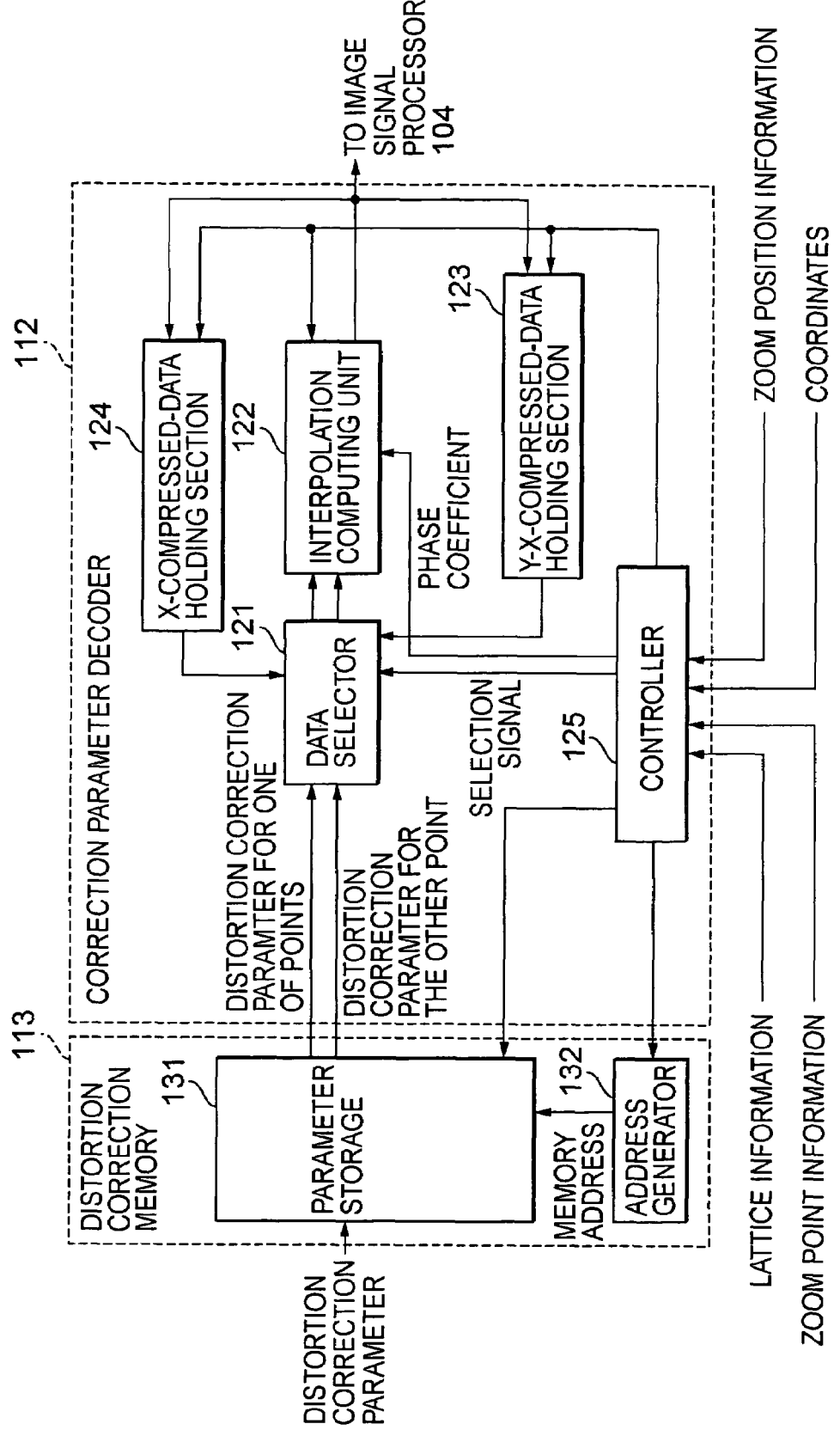
FIG. 13 is a block diagram showing an example of the internal configuration of each of a correction parameter decoder and a distortion correction memory in a second embodiment of the present invention.

FIG. 13 is a block diagram showing an example of the internal configuration of each of the correction parameter decoder 112 and the distortion correction memory 113.

The correction parameter decoder 112 shown in FIG. 13 has a data selector 121, an interpolation computing unit 122, a Y-X-compressed data holding section 123, and an X-compressed data holding section 124, and a controller 125. The distortion correction memory 113 has a parameter storage 131 and an address generator 132.

The data selector 121 selectively outputs distortion correction parameters, which are read from the parameter storage 131 in the distortion correction memory 113, the Y-X-compressed data holding section 123, the X-compressed data holding section 124, to the interpolation computing unit 122.

The interpolation computing unit 122 is a computing circuit shared by the decoding processes respectively corresponding to the X-direction, the y-direction, and the z-direction. The unit 122 performs interpolation calculation by using the distortion correction parameter supplied from the data selector 121 and the phase coefficient corresponding to an associated direction, which is supplied from the controller 125. Further, the unit 122 outputs a result of the calculation to one of the Y-X-compressed data holding section 123, the X-compressed data holding section 124, and the image signal processor 104.

The Y-X-compressed data holding section 123 tentatively holds the distortion correction parameter, which is decoded in the z-direction (that is, encoded in the y-direction and the x-direction) by the interpolation computing unit 122, and outputs these data to the data selector 121.

The X-compressed data holding section 124 temporarily holds the distortion correction parameter, which is decoded in the z-direction and the y-direction (that is, encoded in the x-direction) by the interpolation computing unit 122, and outputs these data to the data selector 121.

The controller 125 outputs a selection signal to the data selector 121 according to the coordinates of the pixel, which is the object for the distortion correction, from the image signal processor 104 and the zoom position information from the control microcomputer 111. Accordingly, the controller 125 controls a selecting operation of the data selector 121. Further, the controller 125 calculates the phase coefficient corresponding to the associated direction according to the coordinates, and the zoom position information, and the lattice information and the zoom point information informed from the correction parameter encoder 202. Then, the controller 125 supplies the calculated phase coefficient to the interpolation computing unit 122. Further, the controller 125 informs the address generator 132 of the associated zoom point and the coordinates thereof to thereby make a request to the parameter storage 131 for reading the distortion correction parameter.

On the other hand, the distortion correction parameter transferred from the correction parameter encoder 202 is stored in the parameter storage 131. Further, the controller 125 transfers the stored distortion correction parameter to the data selector 121 in response to the address assignment from the address generator 132.

The address generator 132 receives the designation of the coordinates of the zoom point and the pixel from the controller 125 of the correction parameter decoder 112, and converts the received coordinates to a memory address, at which the distortion correction parameter necessary for the calculation is stored, and designates the memory address to the parameter storage 131 as a readout address.

According to the zoom position (that is, a current zoom position during the imaging) specified by the zoom position information received from the correction parameter decoder 112, the address generator 132 designates the distortion correction parameter encoded between the two zoom points located on both sides of this zoom position as a value utilized for the interpolation. In the case of employing the linear interpolation, for the decoding in the direction z-direction, the distortion correction coordinates respectively corresponding to the two zoom points, which are objects therefor, are utilized. Accordingly, when serially receiving the designated coordinates from the controller 125 after the reception of the specified zoom position, the address generator 132 alternately (or simultaneously) reads the distortion correction parameters respectively corresponding to the zoom points and supplies the read parameters to the data selector 121.

Figure 14:
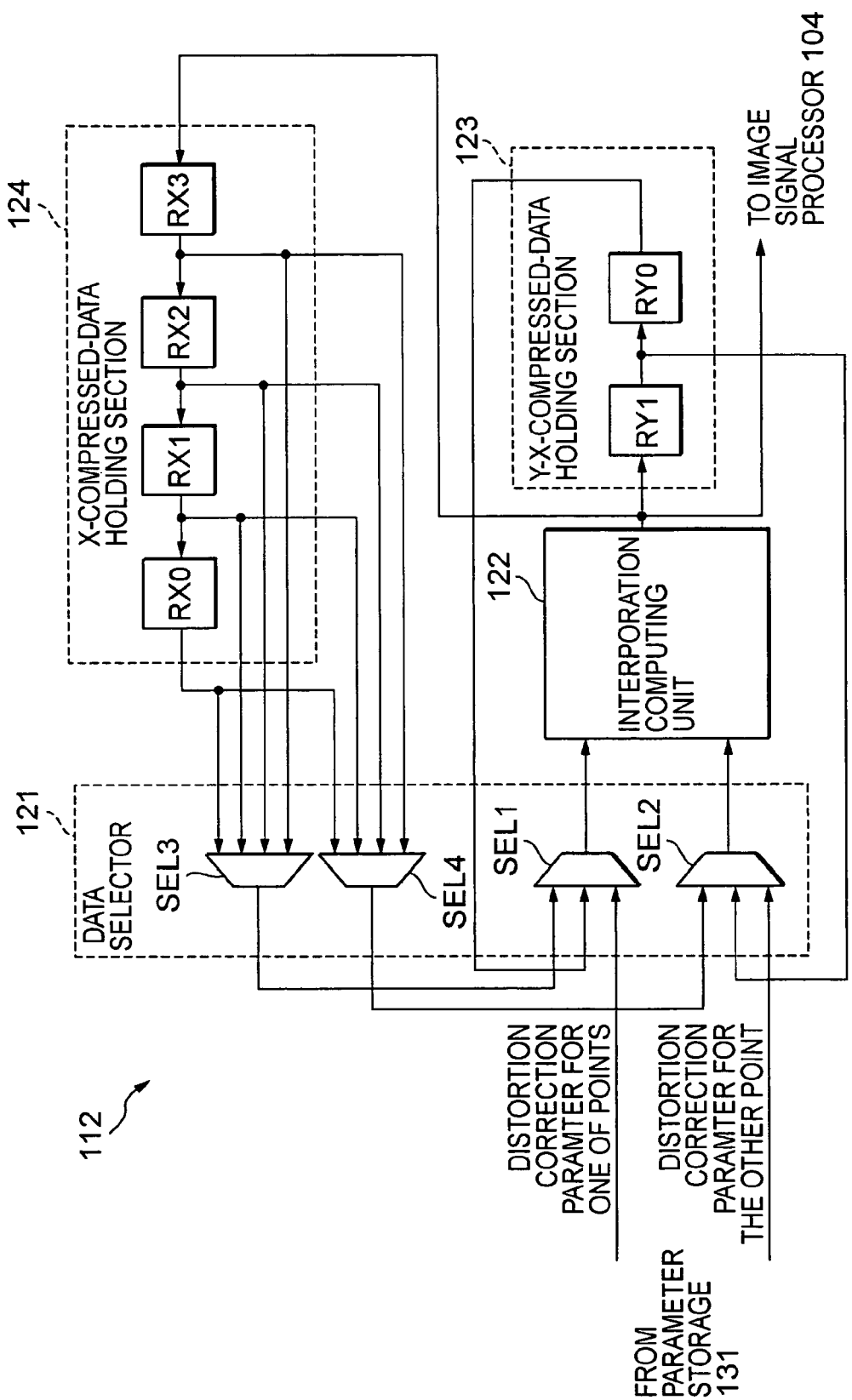
FIG. 14 is a diagram showing an example of the more detailed circuit configuration of a correction parameter decoder in a case where the number of lattice divisions in the x-direction is three.

FIG. 14 is a diagram showing an example of the more detailed circuit configuration of the correction parameter decoder 112 in a case where a lattice division number in the x-direction is 3.

The data selector 121 is provided with selectors SEL1 and SEL2 for selecting two distortion correction parameters to be inputted to the interpolation computing unit 122 and with selectors SEL3 and SEL4 for selectively inputting outputs of storage areas to the selectors SEL1 and SEL2.

The Y-X compression data holding section 123 is provided with storage areas of the number of the distortion correction parameters between the two zoom positions, which are necessary for decoding one distortion correction parameter corresponding to the y-direction. In the case of using the linear interpolation, the distortion correction coordinates respectively corresponding to the zoom positions are necessary for decoding the parameters corresponding to one lattice segment in the y-direction. Accordingly, as shown in FIG. 7, two registers RY0 and RY1 for storing these coordinates are provided therein. An output of the register RY1 is connected to the input terminals of the register RY0 and the selector SEL2, while an output of the register RY1 is connected to the input terminal of the selector SEL1.

Further, the X-compressed data holding section 124 is provided with storage areas of the number of the distortion correction parameters decoded in the z-direction and the y-direction, which are needed for decoding those of one line in the x-direction. In the case of performing the linear interpolation in the case that the lattice division number is 3, the distortion correction coordinates respectively corresponding to four lattice points being present in the x-direction are needed. Accordingly, as shown in FIG. 14, four registers RX0, RX1, RX2, and RX3 are provided therein.

An output of the register RX3 is connected to the input terminals of the register RX2, and the selectors SEL3 and SEL4. Similarly, an output of the register RX2 is connected to the input terminals of the register RX1, and the selectors SEL3 and SEL4, an output of the register RX1 is connected to the input terminals of the register RX0 and the selectors SEL3 and SEL4, an output of the register RX0 is connected to the input terminals of the selectors SEL3 and SEL4.

Further, the outputs of the selectors SEL3 and SEL4 are respectively connected to the inputs of SEL1 and SEL2. The selector SEL1 selectively inputs the distortion correction parameter, which corresponds to one of the zoom points and is received from the parameter storage 131, the distortion parameter received from the register RY1, and the distortion correction parameter received from the selector SEL3 to one of the input terminals of the interpolation computing unit 122. Similarly, the selector SEL2 selectively inputs the distortion correction parameter, which corresponds to the other zoom point and is received from the parameter storage 131, the distortion parameter received from the register RY0, and the distortion correction parameter received from the selector SEL4 to the other input terminal of the interpolation computing unit 122.

Figure 15:
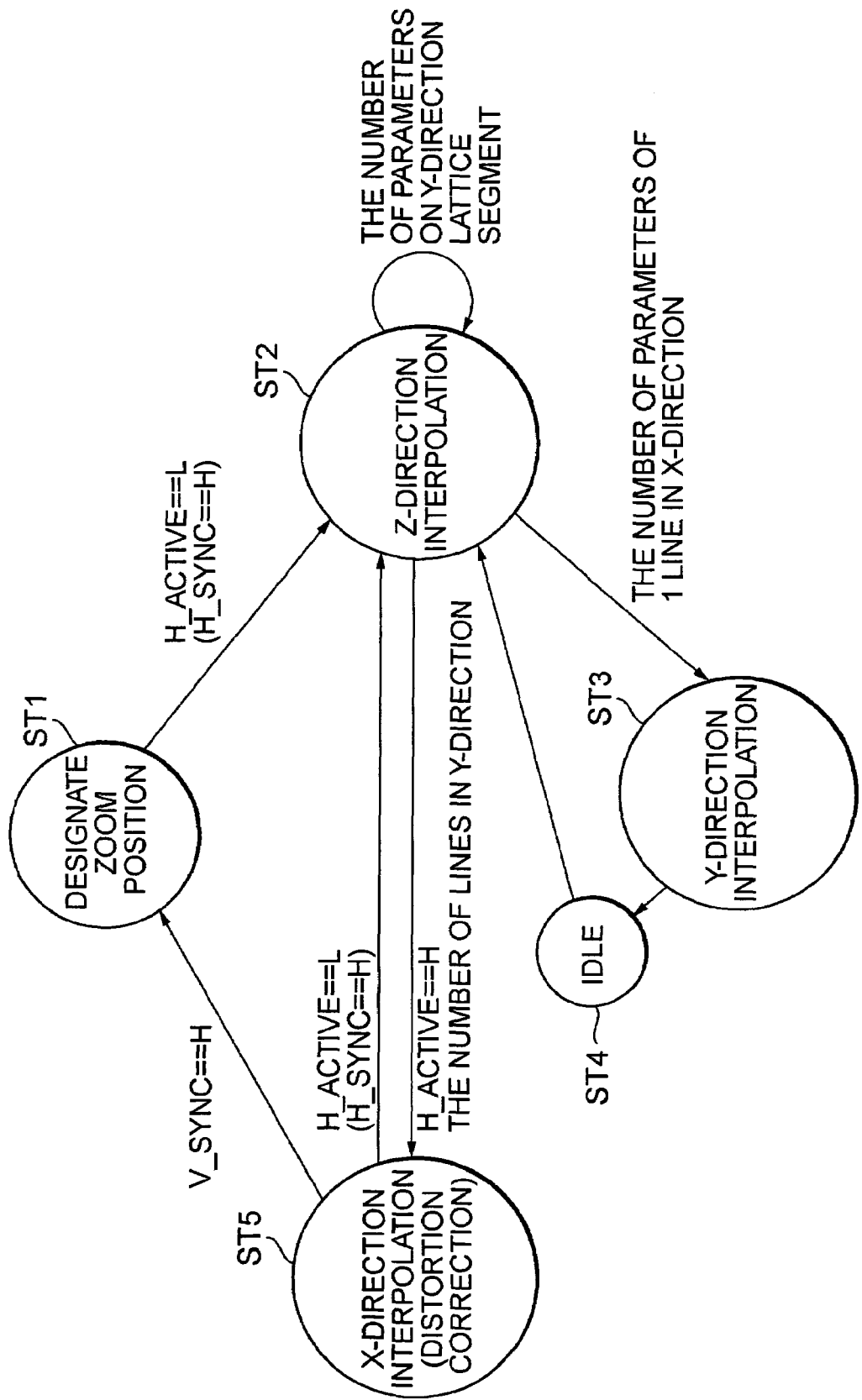
FIG. 15 is a diagram showing a control sequence of a correction parameter decoder.

FIG. 15 is a diagram showing a control sequence of the correction parameter decoder 112.

The correction parameter decoder 112 is controlled by the controller 125 so that the state thereof changes as shown in FIG. 15. First, the level of a vertical synchronization signal V_SYNC becomes a H-level, so that the period of one field begins. Then, the decoder 112 is put into a state ST1. In the state ST1, the controller 125 informs the address generator 132 of the distortion correction memory 113 of the zoom position specified by the integral part of the zoom position information received from the control microcomputer 111. Consequently, thereafter, when the coordinates are designated by the controller 125, the address generator 132 designates the readout addresses of the distortion correction parameters corresponding to two zoom points associated therewith and then reads each of the parameters from the parameter storage 131 and causes the read parameters to output the parameters to the data selector 121.

In a case where the necessary distortion correction parameters are received from the distortion correction parameter encoder 202 and stored in the distortion correction memory 113, in this state ST1, the correction parameter encoder 202 is informed of two zoom points located on both sides of the designated zoom position. Consequently, only the distortion correction parameters respectively corresponding to the two zoom points are stored in the distortion correction memory 113 from the correction parameter encoder 202.

Upon completion of the process in the state ST1, the state changes to a state ST2 during the image ineffective period (H_ACTIVE=H). The state ST1 may be changed to this state ST2 in response to the input of a horizontal synchronization signal H_SYNC. In the state ST2, the distortion correction parameters respectively corresponding to the two zoom points located on both sides of the designated zoom position are supplied from the parameter storage 131 to the interpolation computing unit 122 through the selectors SEL1 and SEL2. In the unit 122, interpolation calculation in the z-direction is performed. The process in the state ST2 is performed times of the number of the distortion correction parameters to be decoded on one lattice line arranged in the y-direction. In the present embodiment, the distortion correction parameters respectively corresponding to the zoom points are decoded. Accordingly, the process in the state ST2 is repeatedly performed twice. Consequently, the distortion correction parameters decoded in the z-direction are respectively stored in the registers RY0 and RY1 in the Y-X compression data holding section 123.

In a state ST3, the selectors SEL1 and SEL2 are switched, and the distortion correction parameters stored in the Y-X compression data holding section 123 are supplied to the interpolation computing unit 122. The interpolation calculation corresponding to the y-direction is performed therein. A result of the calculation is stored in the register RX3 of the X-compressed data holding section 125. Consequently, one distortion correction parameter is decoded in the y-direction. Thereafter, the state of the system returns to the state ST2 through a state ST4.

The transition among the states ST2 (twice), ST3 and ST4 is performed times of the number of the distortion correction parameters to be decoded corresponding to one line arranged in the x-direction. In the present embodiment, this transition is performed times of the number of lattice points being present on this line. Consequently, the distortion correction parameters corresponding to the lattice points are stored in the registers RX0 to RX3.

The state of the system is changed to a state ST5 when the image effective period begins (H_ACTIVE=H) upon completion of the above-mentioned transition. In the state ST5, outputs of the selectors SEL3 and SEL4 are selected as inputs to the selectors SEL1 and SEL2. Then, in response to the designation of the coordinates of the pixels arranged in the x-direction, the combinations of the distortion correction parameters outputted from the registers RX0 to RX3 are selected by the selectors SEL3 and SEL4. These selected parameters are decoded in the x-direction. Consequently, the distortion correction coordinates of one line are sequentially decoded and then supplied to the signal processor 104.

When the image effective period is terminated (H_ACTIV=L) upon completion of the processing of the coordinates of one line, the state of the system changes to the state ST2 in a case where the processing of all lines is not finished. Accordingly, the processing performed in the above states ST2 to ST5 is repeated and performed on all the lines. Then, upon completion of the processing of all the lines, when the vertical synchronization signal V_SYNC is inputted thereto, the state of the system changes to the state ST1, in which the processing of the next field is performed.

Figure 16:
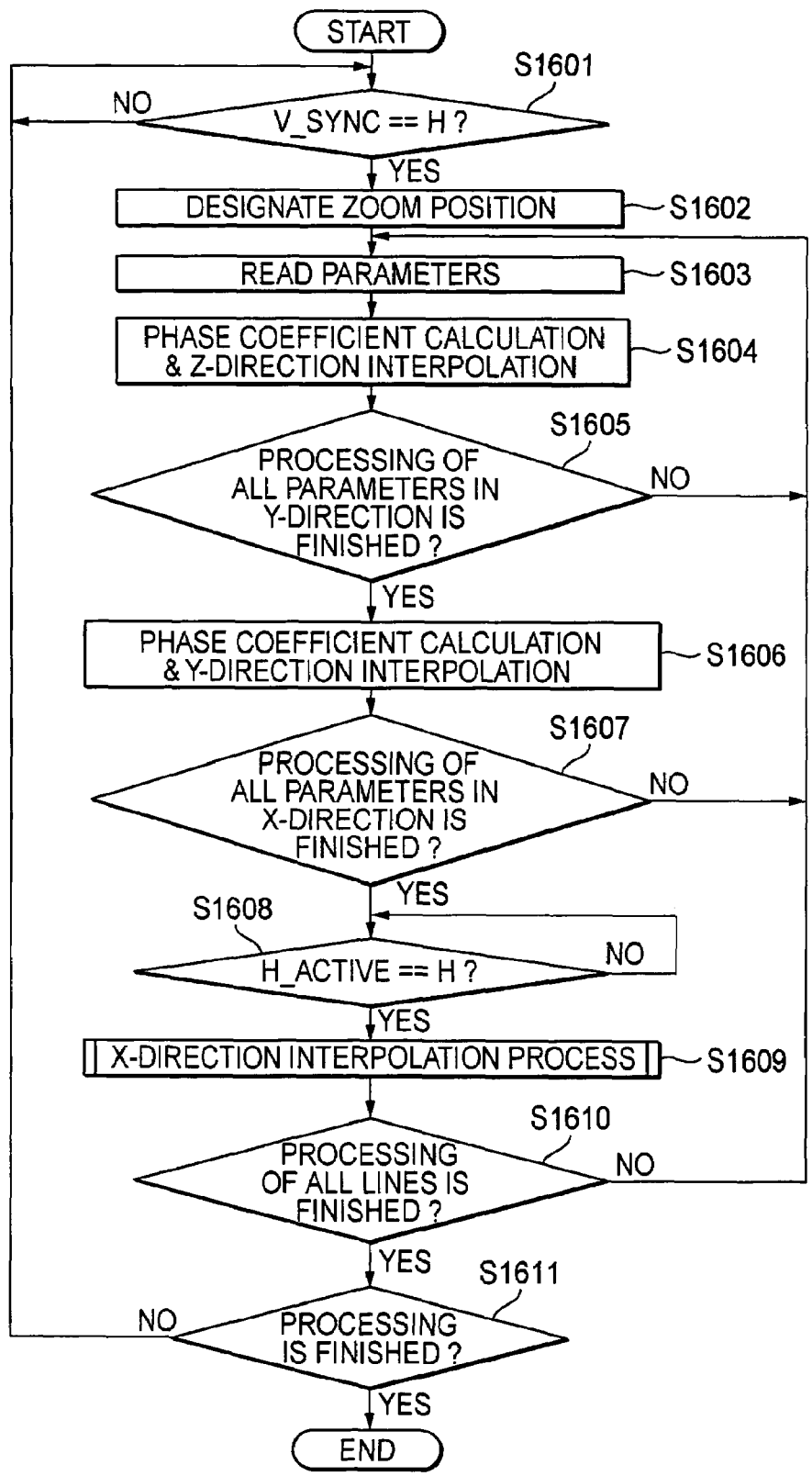
FIG. 16 is a flowchart showing the flow of a process performed in the correction parameter decoder in a second embodiment of the present invention.

FIG. 16 is a flowchart showing the flow of a process performed in the correction parameter decoder 112. Hereinafter, the flow of control of operations of the correction parameter decoder 112 and the distortion correction memory 113, which is performed by the controller 25, is concretely described.

In step 1601, the system waits for input of the vertical synchronization signal V_SYNC. When this signal is inputted thereto, the system advances to step S1602.

Step S1602 corresponds to the state ST1. In step S1602, the controller 125 informs the address generator 132 of the distortion correction memory 113 of the zoom position designated by the integral part of the zoom position information received from the control microcomputer 111.

Steps S1603 to 1605 corresponds to the state ST2. In step S1603, the controller 125 identifies the line position of an object to be processed and then notifies the address generator 132 of the line position. Then, the controller 125 makes a request for readout of the distortion correction parameters of the lattice segments intersecting with this line. Additionally, the controller 125 causes the selectors SEL1 and SEL2 to select outputs of the parameter storage 131 as inputs thereto. Consequently, the distortion correction parameters respectively corresponding to the two zoom points located on both sides of the designated zoom position are read and supplied to the interpolation computing unit 122.

In step S1604, the phase coefficient coef_z of the zoom position between the zoom points is calculated. The calculated coefficient is supplied to the interpolation computing unit 122. Then, the interpolation in the z-direction is performed on the distortion correction parameters corresponding to one lattice segment arranged in the y-direction.

It is judged in step S1605 whether or not all the distortion correction parameters corresponding to one of the lattice segments arranged in the y-direction, which intersect with the object line, are decoded. If not, the system returns to step S1603. Consequently, the state ST2 is repeated until all the distortion correction parameters corresponding to the lattice segment are decoded. Thereafter, the system proceeds to step S1606.

More specifically, first, a lattice segment arranged in the y-direction intersecting with a first lattice point in the x-direction is selected. The distortion correction parameters Dist_x0_y0_z0 and Dist_x0_y0_z1 corresponding to one of the lattice points of this lattice segment are read from the parameter storage 131 (step S1603). Then, the interpolation calculation in the z-direction according to the following expression (6) is performed by the interpolation computing unit 122 to thereby decode the distortion correction parameter Dist_x0_y0 (step S1604). At that time, the controller 125 extracts the phase coefficient coef_z in the zooming direction and informs the interpolation computing unit 122 of this phase coefficient.

$$\text{Dist\_}x0\_y0 = \text{Dist\_}x0\_y0\_z0 * (1-\text{coef\_}z) + \text{Dist\_}x0\_y0\_z1 * \text{coef\_}z \quad (6)$$

After a result of this calculation is stored in the register RY1, the distortion correction parameters Dist_x0_y1_z0 and Dist_x0_y1_z1 corresponding to the other lattice point of this lattice segment are read again (step S1603) as the processing in the state ST2. Then, the distortion correction parameter Dist_x0_y1 corresponding to the other lattice point of the lattice segment is decoded according to the following expression (7) (step 1604):

$$\text{Dist\_}x0\_y1 = \text{Dist\_}x0\_y1\_z0 * (1-\text{coef\_}z) + \text{Dist\_}x0\_y1\_z1 * \text{coef\_}z \quad (7)$$

Here, the controller 125 saves the data, which is stored in the register RY1, in the register RY0. Thereafter, the result of the calculation of the expression (7) is stored in the register RY1. Upon completion of the above process, the system proceeds to step S1606 (the state ST3).

In step S1606, the interpolation process is performed on the data corresponding to one lattice segment in the y-direction by using the data stored in the Y-X compressed data holding section 123. The controller 125 selects inputs from the registers RY0 and RY1 as inputs to the selectors SEL1 and SEL2, and calculates the phase coefficient coef_y corresponding to the lattice segment (that is, the y-coordinates thereof) of the designated line, and supplies the calculated coefficient to the interpolation computing unit 122. Further, the controller 125 causes the computing unit 122 to perform the interpolation calculation in the y-direction according to the following expression (8) to thereby decode the distortion correction parameter Dist_x0.

$$\text{Dist\_}x0 = \text{Dist\_}x0\_y0 * (1-\text{coef\_}y) + \text{Dist\_}x0\_y1 * \text{coef\_}y \quad (8)$$

A result of the calculation of the expression (8) is stored in the register RX3. Thereafter, the system is put into the state ST4, which is a control idling state. Then, in step S1607, it is judged whether or not all the distortion correction parameters corresponding to one line in the x-direction are decoded. If not, the system advances to step S1603. That is, the state of the system returns to the state ST2 again. Then, the interpolation calculation is performed on the next lattice segment corresponding to the y-direction. Therefore, the processing performed in steps S1603 to S1606 is repeatedly performed. That is, the transition among the states ST2 (twice), ST3, and ST4 is repeated times of the number of the distortion correction parameters (that is, the number of the lattice points) being present on the lattice segment in the x-direction. Consequently, the decoding of the parameters in the x-direction and the y-direction is finished. Then, the system advances to step S1608.

Hereunder, the transition performed in the steps S1603 to S1605 is more concretely described. In a second transition (steps S1603 to S1605), the lattice segment in the y-direction intersecting with the second lattice point in the x-direction is selected. Necessary distortion correction parameters Dist_x1_y0_z0 and Dist_x1_y0_z1 are read from the parameter storage 131. Then, the interpolation calculation in the z-direction according to the following expression (9) is performed by the interpolation computing unit 122 to thereby decode the distortion correction parameter Dist_x1_y0.

$$\text{Dist\_}x1\_y0 = \text{Dist\_}x1\_y0\_z0 * (1-\text{coef\_}z) + \text{Dist\_}x1\_y0\_z1 * \text{coef\_}z \quad (9)$$

A result of this calculation is stored in the register RY1. Furthermore, the decoding of the other distortion correction parameter Dist_x1_y1 corresponding to the same lattice segment is performed according to the expression (10).

$$\text{Dist\_}x1\_y1 = \text{Dist\_}x1\_y1\_z0 * (1-\text{coef\_}z) + \text{Dist\_}x1\_y1\_z1 * \text{coef\_}z \quad (10)$$

At that time, the data stored in the register RY1 is saved in the register RY0. Subsequently, the result of the calculation is stored in the register RY1. Then, the system is brought into the state ST3. The selectors SEL1 and SEL2 are switched. Subsequently, the decoding of the parameters in the y-direction corresponding to the same lattice segment is performed according to the following expression (11). Accordingly, the distortion correction parameter Dist_x1 is calculated.

$$\text{Dist\_}x1 = \text{Dist\_}x1\_y0 * (1-\text{coef\_}y) + \text{Dist\_}x1\_y1 * \text{coef\_}y \quad (11)$$

The data stored in the register RX3 is saved in the register RX2. Thereafter, the result of the calculation is stored in the register RX3.

Subsequently, the system returns to the state ST2 through the state ST4. Accordingly, the system is put into a third transition. In this transition, similarly, according to the following expressions (12) and (13), the distortion correction parameters Dist_x2_y0 and Dist_x2_y1 are serially decoded.

$$\text{Dist\_}x2\_y0 = \text{Dist\_}x2\_y0\_z0 * (1-\text{coef\_}z) + \text{Dist\_}x2\_y0\_z1 * \text{coef\_}z \quad (12)$$

$$\text{Dist\_}x2\_y1 = \text{Dist\_}x2\_y1\_z0 * (1-\text{coef\_}z) + \text{Dist\_}x2\_y1\_z1 * \text{coef\_}z \quad (13)$$

Similarly to the above-mentioned transition, a result of the calculation of the expression (12) is stored in the register RY1. Thereafter, the data stored in the register RY1 is saved in the register RY0. A result of the calculation of the expression (13) is stored in the register RY1. Then, the system is brought into the state ST3. Then, the decoding of the parameters in the y-direction is performed according to the following expression (14). Accordingly, the distortion parameter Dist_x2 is calculated.

$$\text{Dist\_}x2 = \text{Dist\_}x2\_y0 * (1-\text{coef\_}y) + \text{Dist\_}x2\_y1 * \text{coef\_}y \quad (14)$$

Data stored in the registers RX3 and RX2 are saved in the registers RX2 and RX1, respectively. Subsequently, a result of this calculation is stored in the register RX3.

Next, the system returns to the state ST2 through the state ST4. Then, the system is put into a fourth transition. In this transition, similarly, according to the following expressions (15) and (16), the distortion correction parameters Dist_x3_y0 and Dist_x3_y1 are serially decoded.

$$\text{Dist\_}x3\_y0=\text{Dist\_}x3\_y0\_z0*(1-\text{coef\_}z)+\text{Dist\_}x3\_y0\_z1*\text{coef\_}z \quad (15)$$

$$\text{Dist\_}x3\_y1=\text{Dist\_}x3\_y1\_z0*(1-\text{coef\_}z)+\text{Dist\_}x3\_y1\_z1*\text{coef\_}z \quad (16)$$

Similarly to the above-mentioned transition, a result of the calculation of the expression (15) is stored in the register RY1. Then, the data stored in the register RY1 is saved in the register RY0. Subsequently, a result of the calculation of the expression (16) is stored in the register RY1. Then, the system is put into the state ST3. Subsequently, the decoding of the parameters in the y-direction is performed by using the following expression (17). Accordingly, the distortion correction parameter Dist_x3 is calculated.

$$\text{Dist\_}x3=\text{Dist\_}x3\_y0*(1-\text{coef\_}y)+\text{Dist\_}x3\_y1*\text{coef\_}y \quad (17)$$

Data stored in the registers RX3, RX2, and RX1 are saved in the registers RX2, RX1, and RX0, respectively. Subsequently, a result of this calculation is stored in the register RX3. In the image ineffective period, the distortion correction parameters corresponding to the lattice points in the x-direction are decoded by the above-mentioned processes. The decoded parameters are stored in the registers RX0, RX1, RX2, and RX3. Accordingly, the distortion correction parameters in the z-direction and the y-direction, which are needed for the decoding of the parameters of one line, are prepared.

Let zt_0 and zt_1 designate two zoom points located on both sides of the designated zoom position. Further, let yt_0 and yt_1 denote the y-coordinates of lattice lines arranged in the y-direction intervened by an object lattice line. Further, let m designates the number of lattice segments extending in the y-direction across the x-direction (that is, the number of lattice points). Accordingly, the readout address designated to the parameter storage 131 in the state ST2 during the processing of one line becomes as follows:

First Time
  Add [0] [yt 0] [zt 0], add [0] [yt 0] [zt 1]

Second Time
  Add [0] [yt 1] [zt 0], add [0] [yt 1] [zt 1]

Third Time
  Add [1] [yt 0] [zt 0], add [0] [yt 0] [zt 1]

Fourth Time
  Add [1] [yt 1] [zt 0], add [0] [yt 1] [zt 1]

Fifth Time
  Add [2] [yt 0] [zt 0], add [0] [yt 0] [zt 1]

Sixth Time
  Add [2] [yt 1] [zt 0], add [0] [yt 1] [zt 1]. . . . . .

(2m−1)th Time
  Add [m] [yt 0] [zt 0], add [0] [yt 0] [zt 1]

2mth Time
  Add [m] [yt 1] [zt 0], add [0] [yt 1] [zt 1]

Next, in step S1608, the system waits for the beginning of the image effective period (H_ACTIVE=H). After the image effective period begins, the system proceeds to step S1609. Step S1609 corresponds to the state ST5. Then, the interpolation calculation in the x-direction is performed by using data stored in the X-compressed data holding section 124. Accordingly, the distortion correction coordinates of one line are decoded. This process is described by referring to the next figure, FIG. 17.

In step S1610, it is judged whether or not the decoding of data of all the lines in one field is finished. If not, the system advances to step S1603 and is brought into the step ST2 again. Then, the processing of the next line is performed. Conversely, if finished, the system proceeds to step S1611, whereupon it is decided whether or not the processing is finished. If not, the system returns to step S1601. Then, the processing of the next field is performed.

Figure 17:
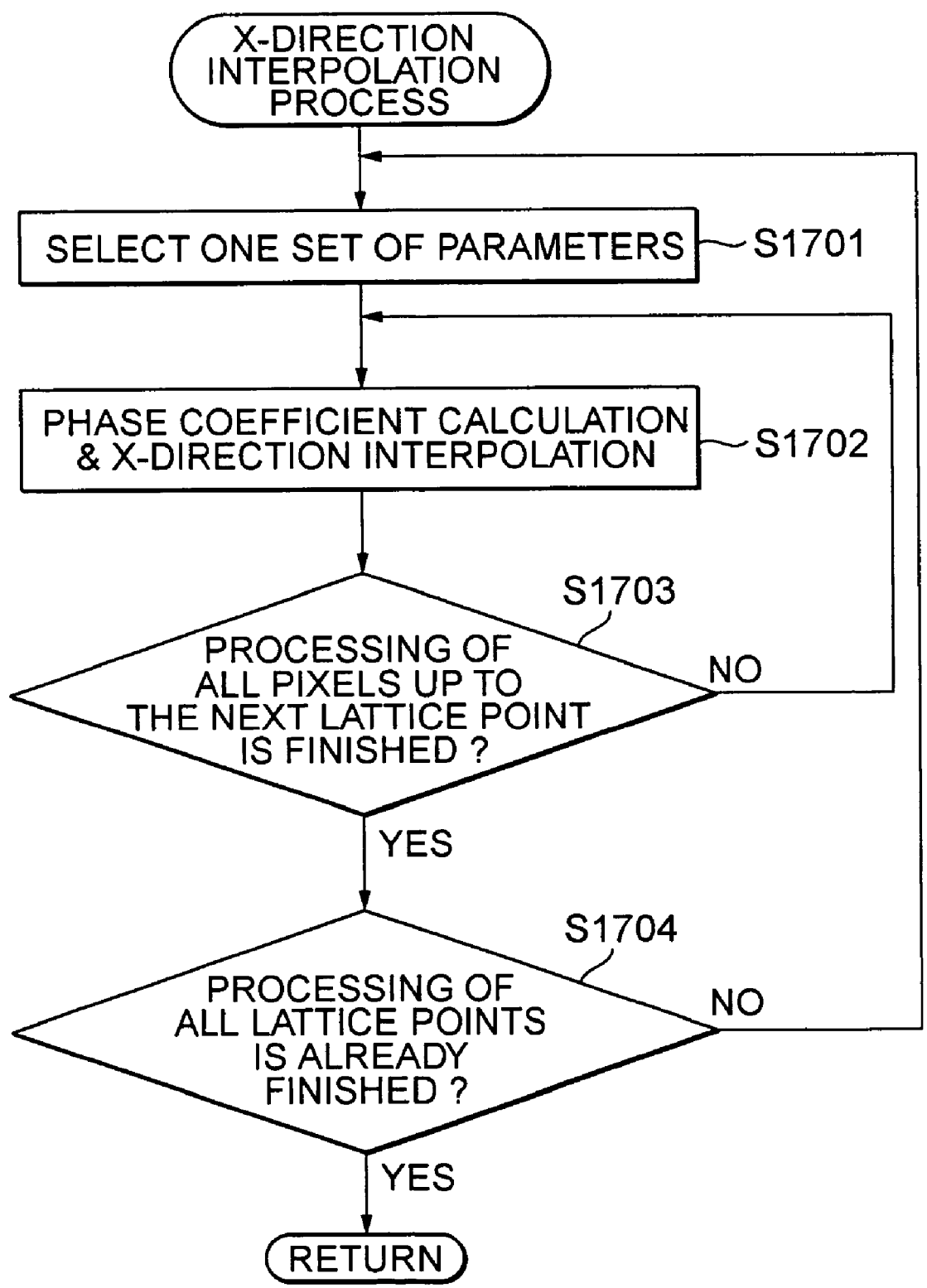
FIG. 17 is a flowchart showing the flow of an interpolation process corresponding to the x-direction.

FIG. 17 is a flowchart showing the flow of the interpolation process corresponding to the x-direction, which has been described in step S1609.

The process shown in FIG. 17 corresponds to the state ST5. In the state ST5, the decoding of data of one line is performed by using the distortion correction parameters stored in the X-compressed-data holding section 124. In this state, first, the outputs of the selectors SEL3 and SEL4 are selected as the inputs to the selectors SEL1 and SEL2.

In step S1701, distortion correction parameters corresponding to the lattice points on both sides of a lattice region including the designated x-coordinate are selected by the selectors SEL3 and SEL4, which are caused to supply the selected parameters to the interpolation computing unit 122.

In step S1702, the phase coefficient coef_x corresponding to the x-coordinate is calculated, and the calculated coefficient is supplied to the interpolation computing unit 122. Then, the unit 122 is caused to perform the interpolation calculation on the distortion correction coordinates on one lattice line in the x-direction.

For example, in the case of a first lattice line, input data from the registers RX0 and RX2 are selected by the selectors SEL3 and S#L4 (step S1701). Then, distortion correction coordinate Dist_target corresponding to the designated coordinate is calculated by using the following expression (18) (step S1702):

$$\text{Dist\_target}=\text{Dist\_}x0*(1-\text{coef\_}x)+\text{Dist\_}x1*\text{coef\_}x \quad (18)$$

Then, in step S1703, it is decided whether or not the decoding of all the pixels included in a range between the designated x-coordinate and the next lattice point is finished. If not, the system proceeds to step S1704, whereupon the phase coefficient coef_x corresponding to the next pixel is newly calculated, and the decoding thereof is performed.

Further, if it is decided as a result of the decision in step S1703 that a current target pixel for the decoding passes the next lattice point, it is then judged in step S1704 whether or not the decoding of the data corresponding to all the lattice points in the x-direction is finished. If not, the system returns to step S1701.

Returning to step S1701, the data stored in the registers RX1 and RX2 are selected as the inputs to the selectors SEL3 and SEL4. Further, the interpolation calculating using the following expression (19):

$$\text{Dist\_target}=\text{Dist\_}x1*(1-\text{coef\_}x)+\text{Dist\_}x2*\text{coef\_}x \quad (19)$$

Similarly, when the current target pixel passes the next lattice point, the data stored in the registers RX2 and RX3 are selected as inputs to the selectors SEL3 and SEL4, respectively. Then, the interpolation calculation is performed by using the following expression (20):

$$\text{Dist\_target}=\text{Dist\_}x2*(1-\text{coef\_}x)+\text{Dist\_}x3*\text{coef\_}x \quad (20)$$

By the processing in the state ST5, the distortion correction coordinates corresponding to the pixels of one line are decoded. The decoded coordinates are supplied to the signal processor 104. Then, in synchronization with the supply of the distortion correction coordinates of each of the pixels, the distortion correction process is performed on the coordinates of the associated pixel. Thereafter, according to the judgment in step S1704, the interpolation of one line in the x-direction is finished. Subsequently, the system advances to step S1610.

By the above-mentioned processing, the interpolation in the z-direction, the y-direction, and the x-direction can be performed by sharing the single interpolation computing unit 122. An example of the circuit configuration of a correction parameter decoder of related art is illustrated in FIG. 18, as an comparative example.

Figure 18:
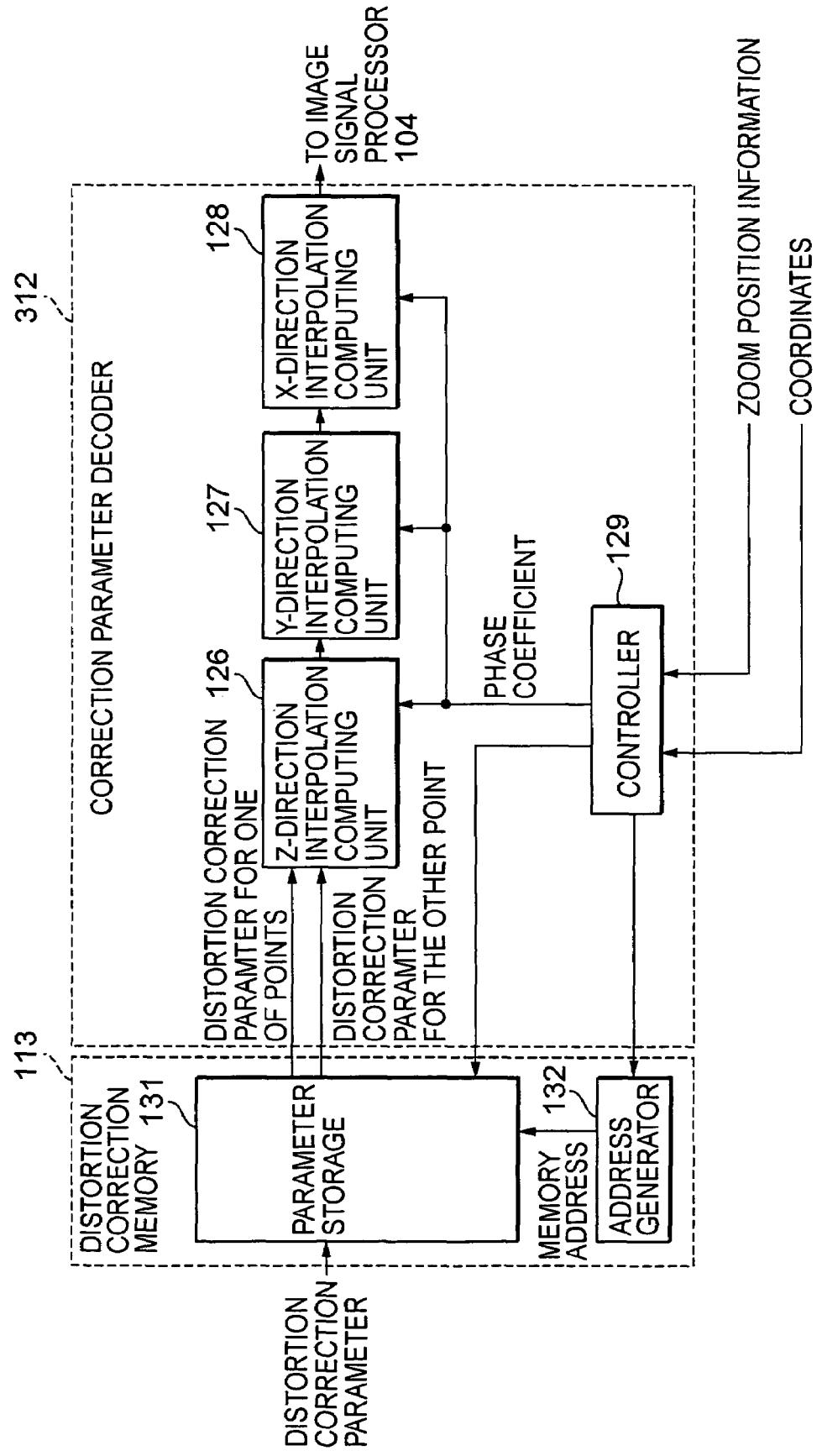
FIG. 18 is a block diagram showing an example of a circuit configuration of a correction parameter decoder of related art.

As shown in FIG. 18, the correction parameter decoder 312 are provided with individual computing units (a x-direction computing unit 126, a y-direction computing unit 127, and an x-direction computing unit 128) respectively corresponding to the z-direction, the y-direction, and the x-direction, respectively, in series. Accordingly, the area needed for installing the computing units cannot be reduced to a small value. Incidentally, a controller 129 supplies the phase coefficients, which correspond to the x-direction, the y-direction, and the z-direction, to the associated computing units, respectively, according to the zoom position information and the coordinates inputted thereto.

In contrast with such a circuit, the correction parameter decoder 112 according to the present embodiment is provided only with a single interpolation computing unit 122. The circuit size can be reduced. Further, because the decoder 112 can be implemented by such a simple circuit configuration, the manufacturing cost there of can be reduced. Moreover, because of the provision of only one interpolation computing unit therein, an amount of supplied clock signals is decreased. The power consumption thereof can be reduced. Accordingly, although the circuit size, the manufacturing cost, and the power consumption thereof are reduced, a high-precision distortion correction process using the interpolation corresponding to each of the x-direction, the y-direction, and the z-direction can be achieved.

Case of Utilizing Nth Degree Piecewise Polynomial:

Next, a circuit configuration and operation of the system using approximation by an nth degree piecewise polynomial are described hereinbelow.

Figure 19:
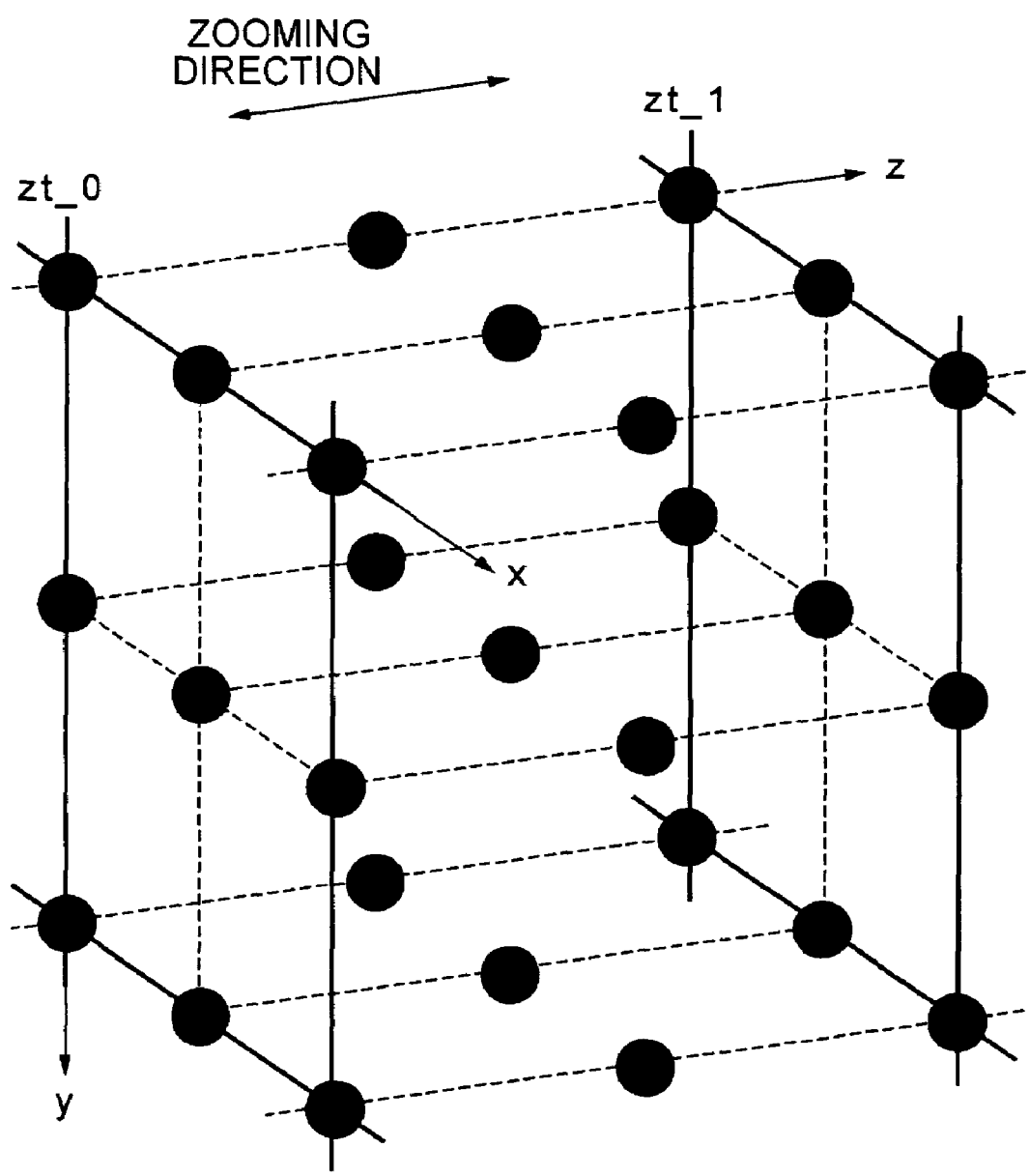
FIG. 19 is a diagram for explaining distortion correction parameters in a case where a polynomial of the degree n is used in interpolation calculations respectively corresponding to the x-direction, the y-direction, and the z-direction.

FIG. 19 is a diagram for explaining distortion correction parameters in the case where a polynomial of the degree n is used in interpolation calculations respectively corresponding to the x-direction, the y-direction, and the z-direction.

In the case of using an nth degree piecewise polynomial in the interpolation calculation in the x-direction and the y-direction, the distortion correction coordinates corresponding to the coordinates on the lattice segments extending respectively in the x-direction and the y-direction are first approximated with the nth degree piecewise polynomial. Then, each of the lattice segment is divided into n sub-segments. Subsequently, the distortion correction coordinates corresponding to internal division points are calculated by the obtained nth degree polynomial.

The nth degree polynomial is represented by the following expression (21). An nth degree piecewise polynomial is an nth degree polynomial presented like the expression (21) for approximating a function only in an interval partitioned as an effective range, where n is a natural number:

$$F(x)=a(n)*xn+a(n-1)*x(n-1)+a(n-2)*x(n-2)+\ldots +a(0) \quad (21)$$

Such an nth degree polynomial expression is calculated, for instance, in the following manner. Hereunder, the calculation of a second degree polynomial is described by way of example. First, one lattice segment is selected. Incidentally, for example, it is assumed that x1=x0+1, and that an nth degree piecewise polynomial passing through the following three points, that is, (x0, h(x0)), (x1, h(x1)), and (x2, h(x2)). The calculation thereof is performed between both ends x0 and x2 in the x-direction of the selected lattice segment from x0 to (x2−1) by decrementing the value of x1 by 1 from x0 toward x2. Accordingly, among all the second degree piecewise polynomials, the polynomial having the least error with respect to an original function is obtained.

Subsequently, the lattice segment selected as an object for the processing is divided into n sub-segments. Distortion correction parameters corresponding to the internal division points are derived from the obtained nth degree piecewise polynomial. In the case of using the second degree piecewise polynomial, the midpoint of the lattice segment and the lattice points at both ends thereof are determined as the division points. The distortion correction coordinates corresponding to these three points are set to be the distortion correction parameters. Therefore, the distortion correction parameters needed for one lattice point are the distortion correction coordinates of four lattice points and four midpoints of four lattice segments, that is, a total of eight points. Accordingly, the data amount can be reduced.

Furthermore, such a method is extended to the distortion correction in the z-direction. In this case, similar data compression in the z-direction is further performed for all of the lattice points and the internal division points, which are extraction points for the distortion correction parameters by using data compression in the x-direction and the y-direction. That is, the correction parameter encoder 202 approximates a function, which represents change in the distortion correction coordinates, with the nth degree piecewise polynomial between adjacent ones of all the lattice points, which are extracted between two zoom points located on both sides of the zoom position, and the internal division points. Each of the interval between the lattice points and that between the internal division points is divided into n sub-intervals. Then, distortion correction coordinates corresponding to the internal division points on the divided interval are set to be distortion correction parameters.

FIG. 19 shows extraction points for distortion correction coordinates in the case where the function is approximated with the nth degree piecewise polynomial. In a range of rectangular parallelepiped surrounded by lattice segments corresponding to the two zoom points placed on both sides of the zoom position, distortion correction coordinates corresponding to 24 points, which include lattice points and internal division points, are outputted as distortion correction parameters. These distortion correction parameters are stored in the distortion correction memory 113 by the correction parameter encoder 202. Therefore, in the case where the interpolation calculation is performed on one lattice segment and on an interval between paired zoom points, the correction parameter decoder 112 needs to utilize three distortion correction parameters.

Figure 20:
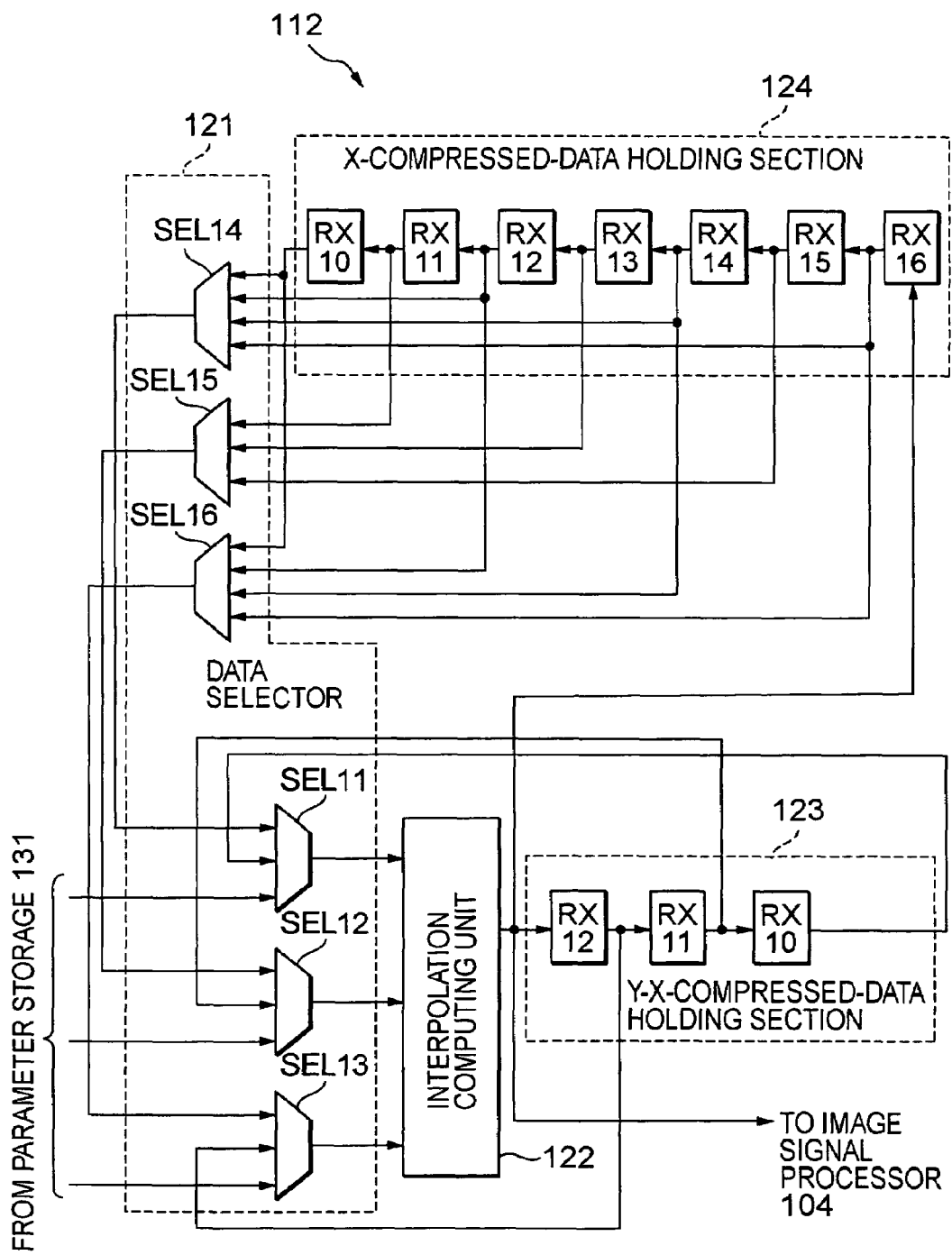
FIG. 20 is a diagram showing an example of the internal configuration of a correction parameter decoder in a case where a second-degree piecewise polynomial is used.

FIG. 20 is a diagram showing an example of the internal configuration of the correction parameter decoder in a case where a second-degree piecewise polynomial.

The three distortion correction coordinates corresponding to the two zoom points located on both sides of the designated zoom position and to the middle point therebetween are read from the parameter storage 131 by the address assignment from the address generator 132 and supplied to the data selector 121. Then, according to these three distortion correction coordinates, the second degree piecewise polynomial is restored in the interpolation computing unit 122. Further, the interpolation calculation in the z-direction is performed therein by applying the phase coefficient coef_z thereto. Therefore, three selectors SEL11 to SEL13 are provided for selecting inputs to the interpolation computing unit 122.

Further, similarly, there are three distortion correction parameters on one lattice segment in the y-direction. Accordingly, in the Y-X compressed data holding section 123, three registers RY10 to RY12 for storing these parameters are provided. That is, the interpolation computing unit 122 and the registers RY12, RY11, and RY10 are series-connected, and outputs of the registers RY12, RY11, and RY10 are connected to the input terminals of the selectors SEL11 to SEL13. Then, the second degree piecewise polynomial is restored in the interpolation computing unit 122 by using the distortion correction coordinates stored in the registers RY10 to RY12. Further, the interpolation calculation in the y-direction is performed by applying the phase coefficient coef_y thereto.

Furthermore, similarly, there are three distortion correction parameters on one lattice segment in the x-direction. Accordingly, in the case where the lattice division number is 3, seven registers RX10 to RX16 are provided in the X compressed data holding section 124. That is, the interpolation computing unit 122 and the registers RX16, RX15, RX14, RX13, RX12, RX11, and RX10 are series-connected. Further, outputs of the registers RX10, RX12, RX14, and RX16, in which the distortion correction parameters corresponding to the lattice points are stored upon completion of the y-direction decoding, are selectively connected to the input terminals of the selectors SEL11 to SEL13 by the selectors SEL14 and SEL16. Furthermore, outputs of the registers RX11, RX13, and RX15, in which the distortion correction parameters corresponding to the internal division points are stored, are selectively connected to the input terminal of the selector SEL12 by the selector SEL15.

Accordingly, in the image effective period, the second degree piecewise polynomial is restored in the interpolation computing unit 122 by selecting the three distortion correction coordinates from each of the registers RX10 to RX16. Moreover, the interpolation calculation in the y-direction is performed by applying the phase coefficient coef_x thereto.

In the case of using the nth piecewise polynomial, (n+1) of the distortion correction coordinates corresponding to one lattice segment and to the interval between the zoom points are used as the distortion correction parameters. Therefore, it is sufficient that (n+1) of selectors for selecting an input to the interpolation computing unit 122 are provided, and that (n+1) of registers are provided in the Y-X compressed data holding section 123. Additionally, in a case where the lattice division number in the x-direction is assumed to be (m−1) (that is, the number of lattice portioning points in the x-direction is assumed to be m), it is sufficient that (n*(m−1)+1) of registers is provided in the X-compressed data holding section 124. With such a configuration, as illustrated in FIG. 8, in an image ineffective period, the z-direction decoding and the y-direction decoding of the distortion correction parameters needed for the distortion correction processing of data of one line are serially performed. Then, data is stores in all the registers of the X-compressed data holding section 124. In an image effective period beginning thereafter, the x-direction decoding is performed by using these data. Accordingly, the decoding of the distortion correction parameters by sharing the interpolation computing unit 122 can be achieved.

Third Embodiment

In the imaging systems according to the first and second embodiments, the distortion correction parameters are prepared corresponding to each of the zoom points of the optical zoom lens mechanism, and stored in the distortion correction memory 113. Accordingly, as compared with the system of prior art, an amount of data to be prepared is considerably reduced, and the capacity of the memory can be reduced. However, it is preferable to ensure a certain amount of memory capacity. Further, in a case where the imaging system is configured so that these distortion correction parameters are supplied from outside, a certain amount of communication capacity and computing power for calculating these values are needed. Accordingly, there is some demands for further reducing necessary memory capacity, communication capacity, computing power, and the cost thereof, and for ensuring the real-time capability thereof.

Meanwhile, in the first embodiment, the interpolation process is performed by using the distortion correction parameters corresponding to the two zoom points, which are close to the zoom position, so that the distortion correction parameters corresponding to the zoom position are calculated. Accordingly, it can be considered that only the distortion correction parameters corresponding to the two zoom points, which is necessary for the interpolation calculation, is stored in the correction memory 113, and the necessary distortion correction parameters are received by communication means and the data stored in the memory 113 is updated every one field or 1 frame of the captured image, thereby to reduce the capacity of the distortion correction memory 113.

Hereinafter, an imaging system, which reduces the capacity of the memory mounted in the imaging apparatus and the data amount of the received distortion correction parameters by employing such a configuration, is described as a third embodiment. In the following description, it is assumed that the linear interpolation is used for the z-direction interpolation, similarly to the first embodiment. However, the third embodiment can be applied to the case of using other interpolation method, such as the nth degree piecewise polynomial. Additionally, in the following description, the distortion correction process is performed on each image data of one field on the screen by way of example.

Figure 21:
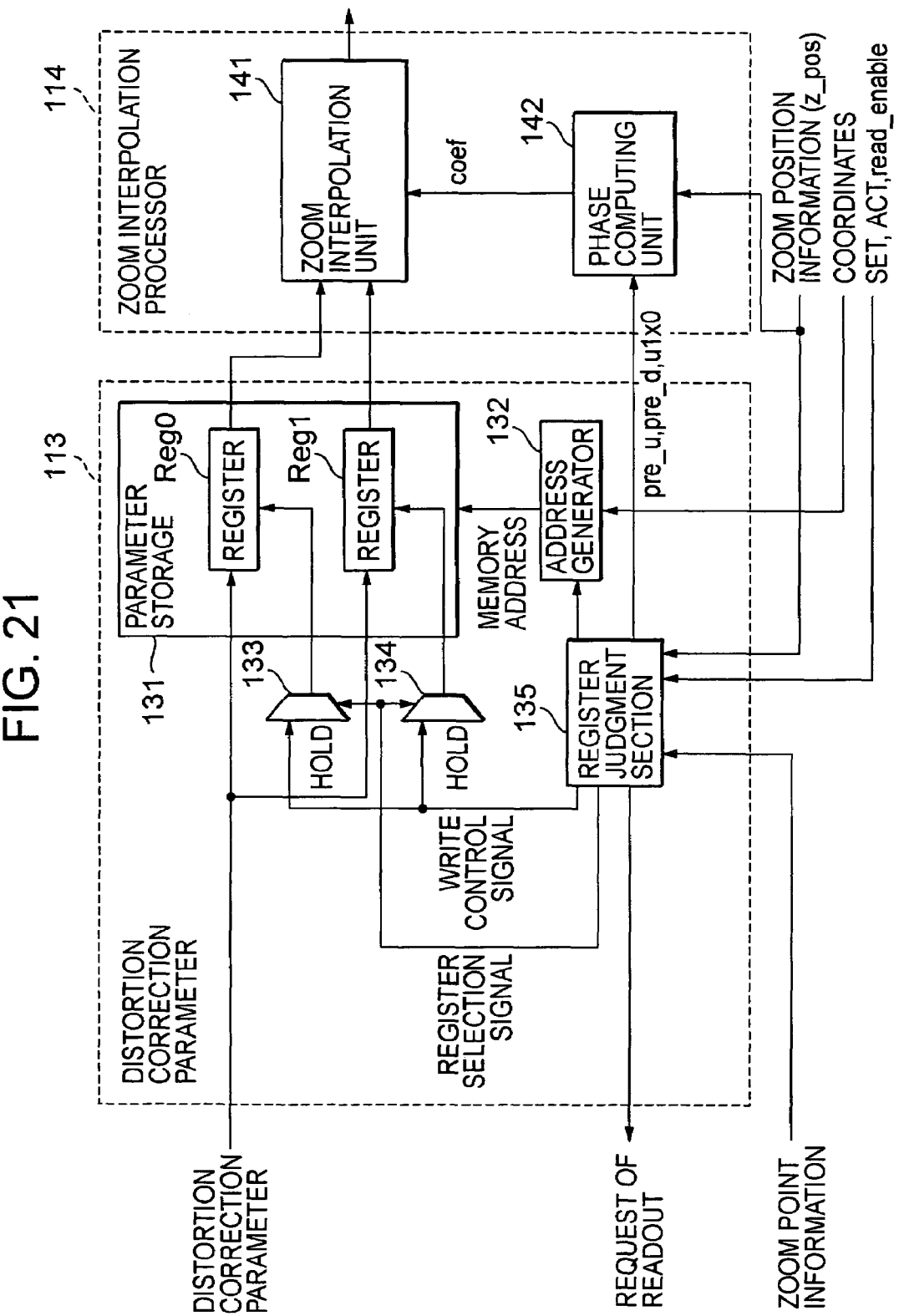
FIG. 21 is a block diagram showing an example of the internal configuration of each of a distortion correction memory and a zoom interpolation processor provided in an imaging system according to a third embodiment of the present invention.

FIG. 21 is a block diagram showing an example of the internal configuration of each of a distortion correction memory 113 and a zoom interpolation processor 114 provided in the imaging system according to the third embodiment of the present invention.

The basic configuration of the imaging system according to the present embodiment is similar to that of the system shown in FIG. 1. The internal configuration of each of the distortion correction memory 113 and the zoom interpolation processor 114 differs from that of the system of FIG. 1. Further, the correction parameter encoder 202 supplies only necessary distortion correction parameters to the distortion correction memory 113 in response to a request therefrom.

As shown in FIG. 21, the distortion correction memory 113 has a parameter storage 131, an address generator 132, selectors 133 and 134, and a register judgment section 135. Further, the zoom interpolation processor 114 has a phase computing unit 142.

In the distortion correction memory 113, the parameter storage 131 has two registers Reg0 and Reg1. In each of the registers Reg0 and Reg1, the distortion correction parameter respectively corresponding to the associated and selected zoom points is stored. Each of the registers Reg0 and Reg1 has capacity in which (m+1)*(n+1) of data can be stored in a case where m and n denote the lattice division numbers corresponding to the x-direction and the y-direction of the image for the distortion correction, respectively.

The address generator 132 converts the coordinates of a target pixel for the correction, which are supplied from the correction parameter decoder 112, to a memory address, at which the distortion correction parameters being necessary for the calculation are stored, and designates a readout address to the parameter storage 131.

The selectors 133 and 134 receive an inputted register selection signal and an inputted write control signal from the register judgment section 135, and designates one of the registers Reg0 and Reg1 as a storage location for the distortion correction parameter, which is transferred from the correction parameter encoder 202, according to these signals.

The register judgment section 135 receives inputted zoom position information (z_pos), an inputted signal (SET) for instructing the change of set values, and another inputted signal (ACT) representing an effective period of data from the correction parameter decoder 112. The register judgment section 135 receives inputted zoom point information from the correction parameter encoder 202, and compares with the zoom point, which is represented by this information, with a zoom point selected corresponding to the immediately precedent field, and selects the zoom point associated with the current zoom position. Then, the register judgment section 135 outputs a request for readout of the distortion correction parameter corresponding to the zoom point to the correction parameter encoder 202. Further, the register judgment section 135 outputs a register selection signal and a write control signal according to the selected zoom point and to the states of the registers Reg0 and Reg1. Furthermore, he register judgment section 135 receives a signal (read_enable), which requests the readout of a distortion correction parameter, from the correction parameter decoder 112, and makes a request to the address generator 132 for address assignment, in response to this signal. Additionally, the register judgment section 135 outputs to the phase computing unit 142 both information (pre_u. pre_d), which indicates the selected zoom point, and information (u1x0) that indicates which of the registers Reg0 and Reg1 stores the parameter.

With such a configuration, the correction parameter encoder 202 transfers the distortion parameter corresponding to a predetermined zoom point in response to the readout request from the register judgment section 135. Further, according to the register selection signal and the write control signal from the register judgment section 135, operations of the selectors 133 and 134 are controlled. The distortion correction parameters are stored in the register Reg0 or Reg1, which is selected as a write location.

Moreover, the address generator 132 designates an address in each of the registers Reg0 and Reg1, which corresponds to the inputted coordinate, to the parameter storage 131 in response to an address assignment request from the register judgment section 135. Consequently, the distortion correction parameters corresponding to the coordinates are serially read from the registers Reg0 and Reg1 and supplied to the zoom interpolation computing unit 141.

In the zoom interpolation processor 114, the zoom interpolation computing unit 141 performs interpolation by using the distortion correction parameters, which are read from the registers Reg0 and Reg1, and the phase coefficient calculated by the phase computing unit 142, and outputs the distortion correction parameters, which are decoded into two-dimensional values, to the correction parameter decoder 112.

The phase computing unit 142 calculates the phase coefficient, which represents the zoom position between the selected zoom points, according to the information inputted from the register judgment section 135 and the zoom position information received from the correction parameter decoder 112, and outputs the calculated coefficient to the zoom interpolation computing unit 141.

The functions of the register judgment section 135 may be provided in a sender device (for example, the preprocessor 2) for sending the distortion correction parameters. Further, although the distortion correction parameters are acquired from the correction parameter encoder 202 in the present embodiment, the system may be adapted so that the distortion correction parameters corresponding to all the zoom points are preliminarily generated and held in an external memory, and that the imaging apparatus 1 accesses this memory to thereby acquire the distortion correction parameters.

In the present embodiment, only the distortion correction parameters corresponding to the two zoom points are held in the distortion correction memory 113. Further, even in a case where the zoom position is changed by operating the optical zoom mechanism, an amount of data transferred from the preprocessor 4 is suppressed by avoiding the rereading and rewriting of the held distortion correction parameters as much as possible. Concretely, in the case that the zoom position is changed, only one of the registers Reg0 and Reg1 is rewritten.

By such an operation, only one of the zoom points is changed at all times when the zoom position is changed. Accordingly, zoom points, which do not adjoin, may be selected. Incidentally, the zoom position information supplied from the control microcomputer 111 through the correction parameter decoder 112 has an integral part, which designates a zoom point located on the reference-point-side (the wide-end-side in the present embodiment) of the zoom position, and a decimal part that indicates the phase coefficient between the associated zoom point and an adjacent zoom point (a zoom point adjoining on the tele-end-side in the present embodiment). Therefore, in the case that the zoom points actually selected by the register judgment section 135 are not adjacent to each other, it is necessary to convert the phase coefficient indicated by the zoom position information by using that between the actually selected zoom points as a reference, and to supply the converted coefficient to the zoom interpolation computing unit 141. Such conversion is performed in the phase computing unit 142.

Hereinafter, an outline of an operation of rewriting the distortion correction parameters, which is performed due to the change of the zoom position, is described by using FIG. 22. FIG. 22 is a diagram explaining a method of selecting zoom points according to the change of the zoom position.

Figure 22A:
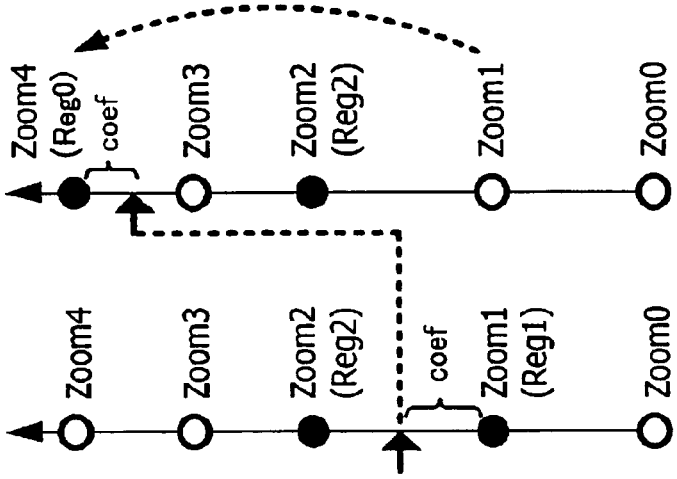
FIG. 22 is a diagram explaining a method of selecting zoom points according to the change of the zoom position.
Figure 22B:
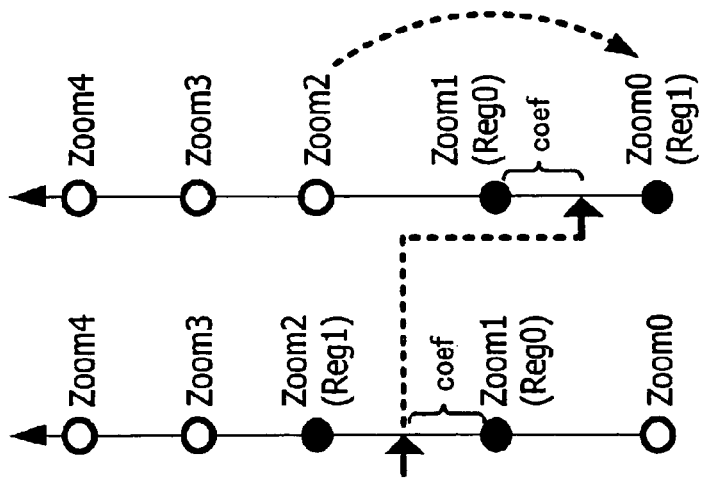
Figure 22C:
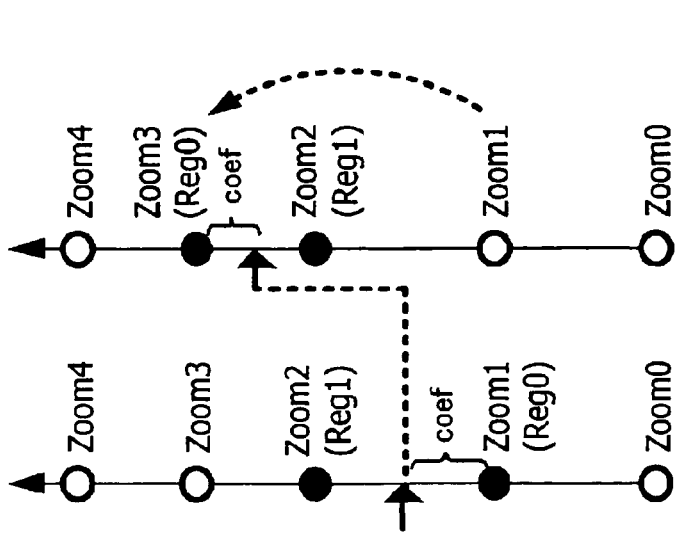

Different methods for selecting the zoom points according to the change of the zoom position are respectively employed corresponding to three patterns of the change of the zoom position, which are illustrated mainly in FIGS. 22(A) to 22(C). In FIG. 22, the zoom points arranged from the wide-end side to the tele-end side are respectively designated by "Zoom0" to "Zoom4". Further, memory areas, in which the distortion correction parameters corresponding to the zoom points, in the distortion correction memory 313 are designated by "Reg0" and "Reg1".

FIG. 22(A) shows a pattern in a case where the zoom position is changed from a position between the zoom points "Zoom1" and "Zoom2" to a position between the zoom points "Zoom2" and "Zoom3". That is, the interval of the combination of the designated zoom points, between which the zoom position is located after the change thereof, is shifted by one interval toward the tele-end side from that of the combination of the designated zoom points, between which the zoom position is located before the change thereof.

If it is assumed that before the change of the zoom position, the distortion correction parameters corresponding to the zoom points "Zoom1" and "Zoom2" are stored in the registers Reg0 and Reg1, respectively, the distortion correction parameter stored in the register Reg1 can be used without change even after the change of the zoom position. Therefore, it is sufficient to update only the distortion correction parameter, which is stored in the register Reg0, with the distortion correction parameter corresponding to the zoom point "Zoom3".

However, the arrangement of the zoom points corresponding to the registers Reg0 and Reg1 (that is, the arrangement of the zoom points corresponding to the distortion correction parameters that the zoom interpolation computing unit 141) after the change of the zoom position is reverse to that of the zoom points corresponding to the registers Reg0 and Reg1 before the change of the zoom position. Accordingly, the phase coefficient supplied to the zoom interpolation computing unit 114 should be calculated in such away as to indicate the position condition toward the wide-end side by employing the point "Zoom3" as a reference.

Further, FIG. 22(B) shows a pattern in a case where the zoom position is changed from a position between the zoom points "Zoom1" and "Zoom2" to a position between the zoom points "Zoom0" and "Zoom1". That is, the interval of the combination of the designated zoom points, between which the zoom position is located after the change thereof, is shifted by one interval toward the wide-end side from that of the combination of the designated zoom points, between which the zoom position is located before the change thereof.

If it is assumed that before the change of the zoom position, the distortion correction parameters corresponding to the zoom points "Zoom1" and "Zoom2" are stored in the registers Reg0 and Reg1, respectively, the distortion correction parameter stored in the register Reg0 can be used without change even after the change of the zoom position. Therefore, it is sufficient to update only the distortion correction parameter, which is stored in the register Reg1, with the distortion correction parameter corresponding to the zoom point "Zoom0". Incidentally, even in this case, the arrangement of the zoom points corresponding to the registers Reg0 and Reg1 after the change of the zoom position is reverse to that of the zoom points corresponding to the registers Reg0 and Reg1 before the change of the zoom position. Accordingly, it is necessary to convert the phase coefficient coef by employing the point "Zoom1" on the tele-end side as a reference.

In the case where the combination of the zoom points after the change of the zoom position is shifted from that of the zoom points before the change of the zoom position by one interval like these patterns, the system can deal with the reversal of the arrangement of the zoom points by newly receiving the distortion correction parameters stored in one of the registers. Therefore, an amount of communication data can be decreased. Furthermore, the time required to perform the writing of data to and the reading of data from the distortion correction memory 113 is reduced by performing the updating of data in the other memory area during a period in which data is read from the non-updated memory area after the change of the zoom position. Accordingly, the maintaining of the real-time capability is facilitated.

FIG. 22(C) shows a pattern in a case where the zoom position is changed from a position between the zoom points "Zoom1" and "Zoom2" to a position between the zoom points "Zoom3" and "Zoom4". That is, the interval of the combination of the designated zoom points, between which the zoom position is located after the change thereof, is shifted two intervals or more toward the wide-end side from that of the combination of the designated zoom points, between which the zoom position is located before the change thereof.

The amount of communication data is reduced by updating only one of the memory areas, similarly to the above-mentioned patterns. For this purpose, the zoom point ("Zoom2" in this case) located closer to the side (the tele-end side in the case shown in FIG. 22(C)), to which the zoom position moved, before the change of the zoom position is utilized without change as the zoom point to be used after the change of the zoom position. Further, only the data stored in the register corresponding to the other zoom point is updated. In the case illustrated in FIG. 22(c), the updating of the register Reg1, in which the distortion correction parameters corresponding to the point "Zoom2" are stored, is not performed. This data is utilized without change even after the change of the zoom position. The distortion correction parameters held in the register Reg0 are updated with the distortion correction parameters corresponding to the point "Zoom4".

Consequently, the zoom interpolation processor 314 performs the interpolation calculation by using the distortion correction parameters respectively corresponding to the points "Zoom2" and "Zoom4" after the change of the zoom position. At that time, it is necessary to convert the phase coefficient coef corresponding to the zoom position between the zoom points along with the reversal of the arrangement of the zoom points by employing the point "Zoom4" on the tele-end side so that the phase coefficient indicates the rate of the distance thereof from the point "Zoom2" to the distance thereof from the point "Zoom4". Further, it is also necessary to supply the converted phase coefficient to the zoom interpolation processor 314.

Referring next to FIG. 23, this figure is a flowchart showing the flow of the distortion correction process performed in the present embodiment.

In step S2301, the initialization of the distortion correction memory 113 is performed. Incidentally, "pre_u" and "pre_d" are variables respectively indicating a far one and a closer one of the selected two zoom points from the reference point for the zoom position. These variables are held by the register judgment section 135. In this case, it is assumed that the reference point is the zoom point "Zoom0", which is closest to the wide-end, that the zoom point on the wide-end side is the point "pre_u", that the zoom point on the tele-end side is the point "pre_d", and that the zoom points "Zoom1" and "Zoom0" are selected to be initial zoom points.

Additionally, "u1x0" is a variable indicating the register, in which the variable "pre_u" is stored, and has a value of 0, which indicates the register Reg0, and also has a value of 1 that indicates the register Reg1. In this case, the register Reg1 is an initially set register. The register, in which the variable "pre_d" is stored, is indicated by a variable "~u1x0".

Further, a request for reading the distortion correction parameters respectively corresponding to the selected zoom points "Zoom0" and "Zoom1" is sent to the correction parameter encoder 202. Thereafter, these parameters are received therefrom and stored in the parameter storage 131. Incidentally, "allset (#)" is a variable representing a process of making a request for reading the necessary distortion correction parameter from the correction parameter encoder 202 and storing the read parameter in the distortion correction memory 113. The argument thereof has values of 0 and 1, which designate the register Reg0 and Reg1 as the write locations. At the initialization, the distortion correction parameters respectively corresponding to the zoom points "Zoom0" and "Zoom1" are stored in the registers Reg0 and Reg1, respectively.

At that time, the lattice information and the zoom point information are transferred from the correction parameter encoder 202, and stored in the correction parameter decoder 112 and the distortion correction memory 113, respectively.

In a case where the zoom position in the optical zoom mechanism is changed, the level of a signal "SET" indicating the change of the zoom position, which is sent from the correction parameter decoder 112, is set at 1. In step S2302, in a case where the level of the signal "SET" is 1, the system advances to step S2302, whereupon a process of setting the zoom points again according to the changed zoom position. Upon completion of this setting, the system makes judgment to be performed in step S2302.

If the level of the signal "SET" is 0, the system advances to step S2304. Then, if the level of the signal "ACT" is 1, the system proceeds to step S2305. Conversely, if the level of the signal "ACT" is 0, the system returns to step S2302. Incidentally, usually, in response to the change of the zoom position, the processing in step S2302 is performed. Upon completion of the setting, the level of the signal "SET" is set to be 0. Then, the interpolation of the distortion correction parameters and the distortion correction process, which are performed in step S2304 and the following steps, are repeatedly performed until the level of the signal "SET" becomes 1.

Figure 24:
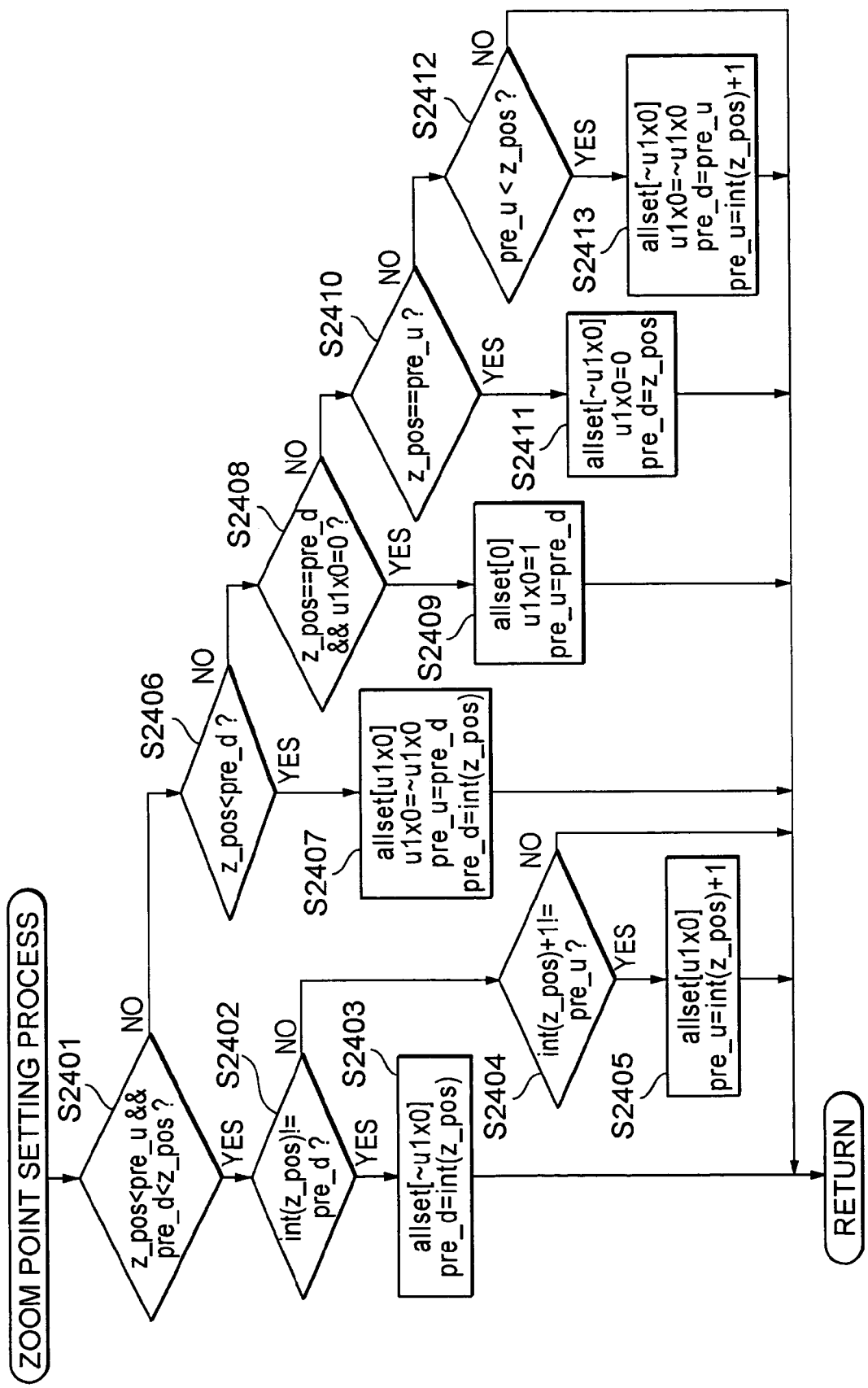
FIG. 24 is a flowchart showing the flow of a zoom point setting process in a third embodiment of the present invention.

Further, FIG. 24 is a flowchart showing the flow of a zoom point setting process in step S2303.

At the beginning of the process illustrated in the flowchart of FIG. 24, new zoom position information "z_pos" is inputted to the distortion correction memory 113 and the zoom interpolation processor 114 through the correction parameter decoder 112. As above-mentioned, the integral part of the information "z_pos" specifies the zoom point located close to the wide-end side of the designated zoom position. The decimal part thereof designates the phase coefficient corresponding to the zoom position between this zoom point and the adjacent zoom point located on the tele-end side thereof.

The processing in each of the following steps is performed by the register judgment section 135, unless otherwise described.

In step S2401, if the value of "z_pos" is less than the that of "pre_u" and larger than that of "pre_d", that is, if the zoom point designated by "z_pos" is present between the two zoom points selected in the immediately precedent field by the register judgment section 135, the system proceeds to step S2402. Otherwise, the system advances to step S2406.

In step S2402, the integral part of "z_pos" is not matched with the value of "pre_d" (designating the zoom point located on the wide-end side between the selected zoom points), the system proceeds to step S2403. If matched, the system advances to step S2404.

In step S2403, the judgment section 135 makes a request to the correction parameter encoder 202 for reading the distortion correction parameter corresponding to the zoom point designated by "z_pos". Then, the transferred data is stored in the register, in which "pre_d" has been stored. Subsequently, the value of "pre_d" is made to be matched with the integral part of "z_pos". That is, the selected zoom point on the wide-end side is changed to the zoom point designated by the zoom position information. The, the setting process is finished. Meanwhile, if a value obtained by adding 1 to the value of "z_pos" (the obtained value corresponds to the zoom point adjoining the zoom point designated "z_pos" on the tele-end side thereof) is not matched with the value of "pre_u", the system proceeds to step S2405. If matched, the zoom position is set again between the zoom points that have been selected in the immediately precedent field. Accordingly, there is no need for changing the selected zoom points. Consequently, the setting process is finished.

In step S2405, the judgment section 135 makes a request to the correction parameter encoder 202 for reading the distortion correction parameter corresponding to the zoom point designated by "z_pos". The transferred data is stored in the register, in which "pre_u" has been stored. Then, the value of "pre_u" is set on the tele-end side of the zoom point designated by "z_pos". Further, the zoom point on the tele-end side is changed. Accordingly, the process is finished.

The process in each of the steps S2403 and S2405 is to be performed in a case where the zoom points selected in the just precedent field are not adjacent to each other and where the new zoom position is not located in a region between the zoom points. Incidentally, an additional step may be provided between steps S2404 and S2405, and it may be judged in this additional step which of the point corresponding to "pre_u" and that corresponding to "pre_d" the position corresponding to "z_pos" is closer to. If closer to the point corresponding to "pre_u", the system may perform the process to be conducted in step S2403. In this case, the precision, with which the distortion correction is performed, can be more enhanced.

Further, the process to be performed in step S2406 and the following steps is performed in a case where the position corresponding to the "z_pos" is present outside the region between the precedent zoom points or where the position corresponding to the "z_pos" completely coincides with that of one of the precedent zoom points. If it is judged in step S2406 that the value corresponding to "z_pos" is less than that corresponding to "pre_d" (that is, the position located further closer to the wide-end than the precedent wide-end-side zoom points is designated), the system advances to step S2407. Otherwise, the system proceeds to step S2408.

In step S2407, the judgment section 135 makes a request for reading the distortion correction parameters, which correspond to the zoom point designated by "z_pos", to the correction parameter encoder 20. The transferred data is stored in the register, in which "pre_u" has been stored. Then, the register, in which "pre_u" has been stored, is changed and set to the register corresponding to the zoom point located on the wide-end side. Further, the value of "pre_u" is replaced with that of "pre_d". That is, the zoom point located on the wide-end side, which has precedently been selected, is replaced with the zoom point located on the tele-end side. Moreover, this zoom point is replaced with the zoom point designated by the integral part of "z_pos". Then, the setting process is finished. Consequently, the register, which has been precedently set to correspond to the tele-end side, is changed and newly set to correspond to the wide-end-side. The associated distortion correction parameters are stored in this register.

In step S2408, if "z_pos" is completely matched with "pre_d" and moreover, "pre_u" is stored in the register Reg0, the system proceeds to step S2409. Further, otherwise, the system proceeds to step S2410. If "z_pos" is completely matched with "pre_d" and moreover, "pre_u" is stored in the register Reg1, there is no need for changing the setting, so that the process is finished.

In step S2409, the phase coefficient coef is zeroed by storing the same value of "pre_d" (=the value of "z_pos") in each of the registers Reg0 and Reg1. That is, the judgment section 135 makes a request for reading of the distortion correction parameters, which correspond to the zoom point designated by "z_pos", to the correction parameter encoder 202. The data transferred thereto is stored in the register Reg0. In addition, the register Reg1 is set to be a register, in which the data corresponding to the zoom point on the tele-end side is stored. Then, the value of "pre_u" is set to be matched with that of "pre_d". Subsequently, the process is finished.

Further, in step S2410, if the value of "z_pos" is completely matched with that of "pre_u", the system proceeds to step S2411. Otherwise, the system proceeds to step S2412.

In step S2411, the zoom point designated by "z_pos" coincides with the zoom point precedently selected on the tele-end side. In this case, an operation of zeroing the phase coefficient is performed by storing the same value of "pre_d" (=the value of "z_pos") in each of the registers RG0 and Rg1. That is, the judgment section 135 makes a request for reading of the distortion correction parameters, which correspond to the zoom point designated by "z_pos", to the correction parameter encoder 202. The data transferred thereto is stored in the register, in which the data corresponding to "pre_d" has been stored. Additionally, the register, in which the data corresponding to "pre_u" has been stored, is set to be a register, in which the data corresponding to the zoom point on the wide-end side is stored. Then, the value of "pre_d" is set to be matched with that of "z_pos". Subsequently, the process is finished.

Further, in step S2412, if the value of "z_pos" is larger than that of "pre_u" (that is, a position being more closer to the tele-end side than the precedent zoom point located on the tele-end side is designated), the system proceeds to step S2413. Otherwise, the setting process is finished.

In step S2413, the system is in a state in which the zoom position being more closer to the tele-end side than the precedent zoom point located on the tele-end side is designated. In this step, first, the register set to correspond to the tele-end side is designated as a storage location, at which new distortion correction parameter is stored. Further, the registers respectively corresponding to the wide-end side and the tele-end side are replaced with each other. Then, the value of "pre_d" is replaced with that of "pre_u". Thereafter, the value of "pre_u" is replaced with that of a value obtained by adding 1 to the value of the integral part of "z_pos". Consequently, the zoom point located on the tele-end side of the zoom point designated by "z_pos" is set to be the zoom point designated by "pre_u". The section 135 makes a request to the correction parameter encoder 202 for reading the distortion correction parameter corresponding to this zoom point. Then, the setting process is finished. The data transferred from the correction parameter encoder 202 is stored in the register newly designated corresponding to the tele-end side.

The values of the variables "pre_u", "pre_d", and "u1x0" are outputted to the phase computing unit 142. Then, the system returns to the process (in step S2302) described in the flowchart of FIG. 23.

FIGS. 25 and 26 are diagrams showing concrete examples of the zoom point setting process.

Figure 25A:
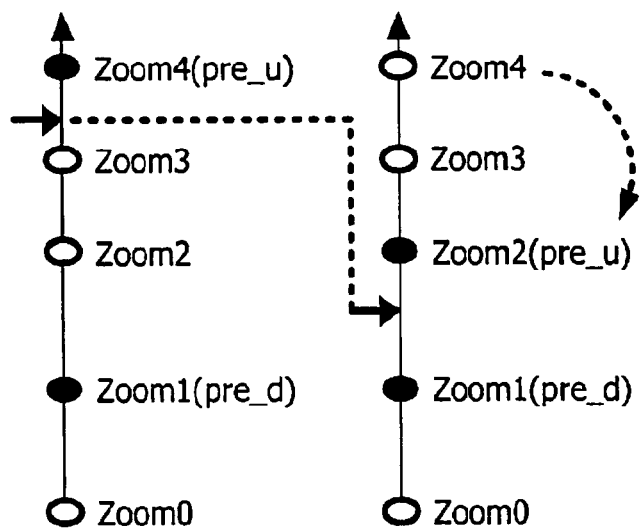
FIG. 25 is a first diagram showing a concrete example of the zoom point setting process.
Figure 25B:
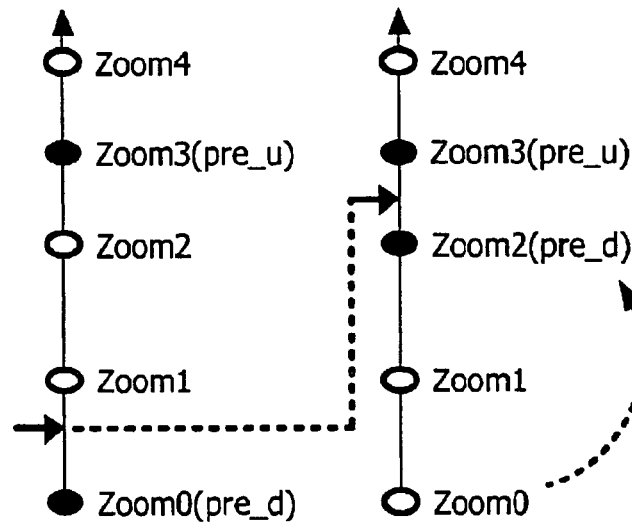

FIGS. 25(A) and 25(B) show examples corresponding to the processing in steps S2403 and S2405. The system changes from a state, in which the zoom points located in such a way as not to be adjacent to each other are selected, to a state, in which a new zoom position is set between these zoom points. In the case shown in FIG. 25(A), only the zoom point located on the tele-end side is changed. In the case shown in FIG. 25(B), only the zoom point located on the wide-end side is changed.

Figure 25C:
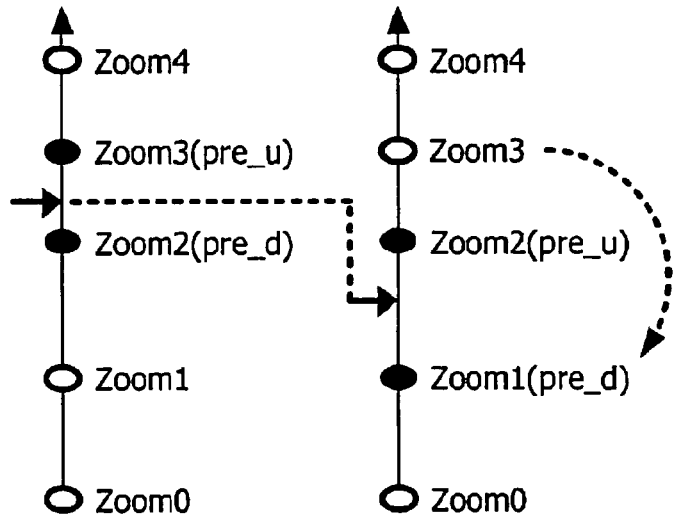

Further, FIG. 25(C) shows an example corresponding to step S2407. A new zoom position is set on the wide-end side of a region between the precedently selected zoom points. In this case, the zoom point having been set on the wide-end side is changed in such a way as to be set on the tele-end side. Further, a zoom point located closer to the wide-end than the zoom point designated by "z_pos" is newly set.

Figure 26A:
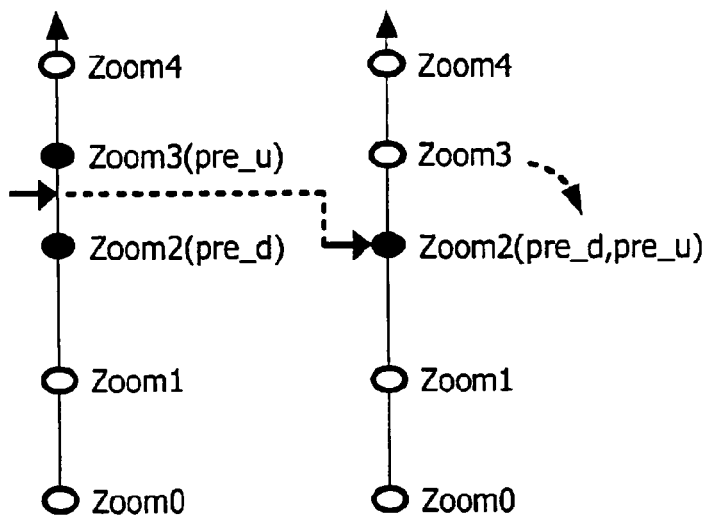
FIG. 26 is a second diagram showing a concrete example of a zoom point setting process.
Figure 26B:
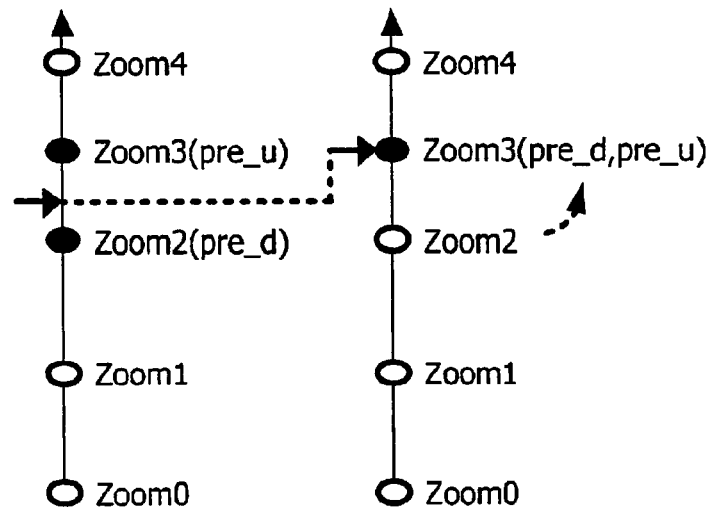

Furthermore, FIGS. 26(A) and 26(B) show examples respectively corresponding to steps S2409 and S2411. Each of new zoom positions coincides with the position of the zoom point precedently selected on the wide-end side or the tele-end side. In these cases, the values of the phase coefficients coef can be zeroed by setting the zoom positions designated by "z_pos" as zoom points located on both the wide-end side and the tele-end side.

Figure 26C:
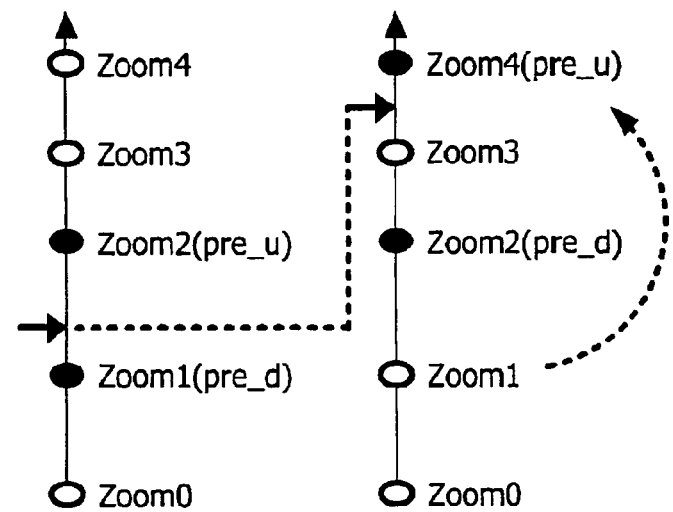
Figure 27:
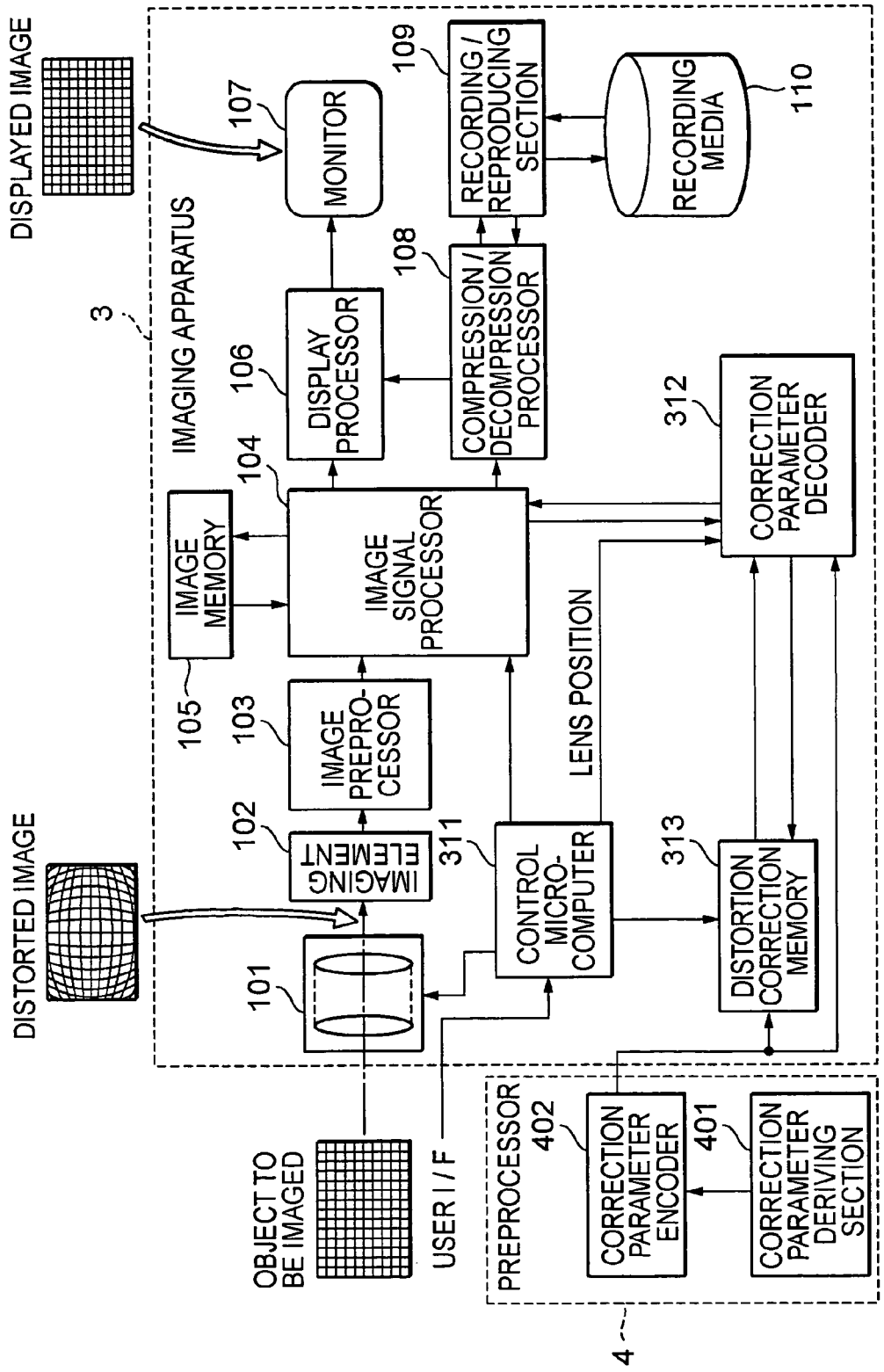
FIG. 27 is a block diagram showing an example of the configuration of an image processing system of related art having the function of correcting optical distortion by signal processing.
Figure 28:
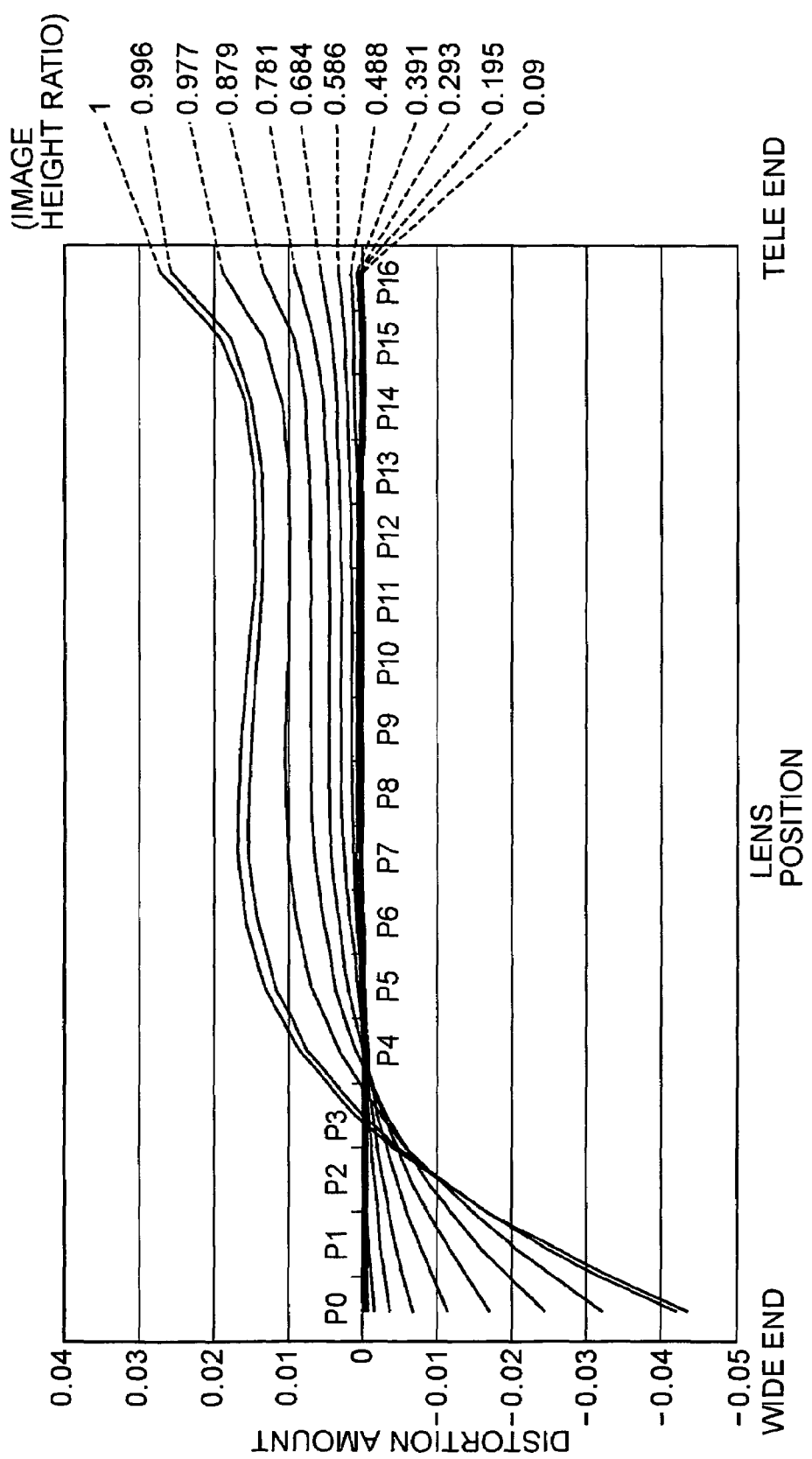
FIG. 28 is an example of a graph showing the relation between lens positions and distortion amounts during a zoom operation is performed.

Further, FIG. 26(C) shows an example corresponding to step S2413. A new zoom position is set on the tele-end side of a region between the precedently selected zoom points. In this case, the zoom point having been set on the tele-end side is changed in such a way as to be set on the wide-end side. Further, a zoom point located closer to the tele-end than the zoom point designated by "z_pos" is newly set.

Hereinafter, the processes to be performed thereon is described by referring to FIG. 23 again.

In a case where both the levels of the signal "SET" and "ACT" are 1, the distortion correction process is performed. In step S2305, the phase computing unit 142 calculates the phase coefficient coef corresponding to the interval between the actually selected zoom points by using the variables supplied from the register judgment section 135. The phase computing unit 142 normalizes the phase coefficient designated by the zoom position information so that: pre_u−pre_d=1. Here, the value representing the zoom point is assumed to be an integer.

If u1x0=1, the phase coefficient coef is obtained by the following expression (22):

$$\text{coef} = (z\_pos - pre\_d)/(pre\_u - pre\_d) \tag{22}$$

Further, if u1x0=0, the phase coefficient coef is obtained by the following expression (23):

$$\text{coef} = (pre\_u - z\_pos)/(pre\_u - pre\_d) \tag{23}$$

If pre_u=pre_d, the value of the phase coefficient coef is set at 0.

In the case that the registers Reg0 and Reg1 hold data corresponding to the wide-end-side zoom point and data corresponding to the tele-end-side zoom point, respectively, the phase coefficient coef is calculated by such processing and employing the wide-end-side zoom point as a reference. Further, in the case to the contrary, the phase coefficient coef is calculated by such processing and employing the tele-end-side zoom point as a reference. That is, in the present embodiment, the phase coefficient coef corresponding to the zoom point associated with the register Reg0 is always calculated by employing the zoom point associated with the register Reg0 as a starting point.

In step S2306, if the level of "read_enable" requesting readout of the distortion correction parameters is 1, the system proceeds to step S2307. Further, if the level of "read_enable" is 0, the system proceeds to step S2309.

In step S2307, the address generator 132 acquires the coordinates from the correction parameter decoder 112 in response to the request from the register judgment section 135. Then, the address generator 132 searches the positions in the screen and calculates four lattice points surrounding a target pixel. Then, the address generator 132 generates addresses, at which the distortion correction parameters of these lattice points are stored, and serially designates the addresses to the registers Reg0 and Reg1. Subsequently, the distortion correction parameters corresponding to two zoom points are read.

In step S2308, the zoom interpolation computing unit 141 performs interpolation calculation on the distortion correction parameters, which are read from the registers Reg0 and Reg1, by using the phase coefficient coef received from the phase computing unit 142. At that time, as described in the description of step S2305, the phase coefficient coef is normalized in a reference direction of the phase according to the association between the registers Reg0 and Reg1 and the zoom points. Accordingly, in the zoom interpolation computing unit 141, normal interpolation calculation is performed, independent of the association between the zoom points and the registers Reg0 and Reg1.

The distortion correction parameters interpolated by the zoom interpolation computing unit 141 in the zooming direction are outputted to the correction parameter decoder 112. The correction parameter decoder 112 decodes the received distortion correction parameters and supplies the decoded parameters to the image signal processor 104. Accordingly, the distortion correction calculation at the target pixel is performed.

In step S2309, it is judged whether or not the processing in steps S2307 and S2308 is performed on all the pixels. If not, the system returns to step S2306. Incidentally, during the level of "read_enable" is 0, the system is in a standby state until the level thereof becomes 1.

Further, if the distortion correction to be performed on all the pixels of one field is finished, the system proceeds to step S2310, whereupon it is judged whether or not the process is finished. If not, the system returns to step S2302. The system waits for a request for performing the distortion correction process on the next field, or a request for changing the setting of the zoom points, which is associated with the movement of the zoom position.

In the actual processing, when the zoom point setting process is finished, and the distortion correction parameters are transferred from the distortion correction parameter encoder 202 to the registers Reg0 and Reg1, preferably, the reading of data from the registers Reg0 and Reg1, the interpolation calculation in the zooming direction, and the distortion correction processing are performed in parallel with one another.

In the third embodiment, only the distortion correction parameters on the two zoom points to be utilized for the distortion correction process is stored in the distortion correction memory 113. Accordingly, the memory capacity of the distortion correction memory 113 can be reduced. Accordingly, the manufacturing cost and the installation area can be reduced. In addition, in the case where the change in the zoom position occurs, the selection of only one of the zoom points is changed. At that time, only the distortion correction parameters are transferred from the encoder 202. Accordingly, the amount of communication data per field can be reduced. Even in the case of low-cost devices as the communication I/F and the distortion correction memory 113 are used, real-time data transfer, which is synchronized with the distortion correction process, is enabled.

Moreover, with the configuration, even when the intervals of the zoom points is reduced, and larger amount of the distortion correction parameters can be generated in the correction-parameter encoder 202, the amount of data per field to be transferred and the necessary memory capacity is unchanged. Accordingly, in response to the movement of the lens in the zooming direction, higher precision distortion correction is enabled. Furthermore, even when the zoom position changes, in a case where the selected zoom points are not changed, there is no need for acquiring new distortion correction parameters. Consequently, the power consumption due to the data transfer and the updating of the memory can be suppressed.

In the above-mentioned embodiments, a digital video camera is assumed to be an imaging apparatus. In addition to this, the present invention can be applied to information processing devices, such as digital still cameras, portable telephones each having an imaging function, PDAs (Personal Digital Assistants). Further, the present invention can be applied to a case where a distortion correction process is performed according to zoom position information, which is obtained on taking an image, in a device, which has no imaging function, by reading image data, which represents an already captured image, from a recording media or receiving the image data by communication means.

The present invention may be applied to, for example, the correction of mis-convergence in a display apparatus, in addition to the above-mentioned correction of distortion of a captured image. In this case, the functions of the image processing apparatus of the present invention are provided, for instance, in the display apparatus. Further, a distortion correction process is performed on RGB signals generated from an input image signal by using different correction data respectively corresponding to colors. Accordingly, a color shift occurring on a display screen can be eliminated. Meanwhile, in the embodiment, a control signal designating a color shift adjusting amount, which corresponds to each color, is inputted by a user's input operation as a signal corresponding to a zoom position of the optical zoom mechanism. Then, an available range of the adjusting amount is partitioned. Further, distortion correction data corresponding to each of partitioning points (associated with the zoom points) is prepared. Accordingly, interpolation calculation is performed by using the distortion correction data corresponding to the partitioning point, which is close to the inputted adjusting amount. Consequently, high-precision color-shift correction can be achieved according to the adjusting amount by reducing an amount of necessary distortion correction data.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus for correcting distortion in an image, comprising:
   a converging lens group having an optical zoom mechanism;
   an imaging element for receiving an input image taken by using the converging lens group having an optical zoom mechanism;
   a zoom position acquiring device configured to acquire a zoom position representing a lens position condition of the optical zoom mechanism on taking an input image;
   a coordinate designating device configured to designate coordinates of a pixel, which is an object for distortion correction;
   a parameter decoding device configured to calculate correction parameters corresponding to the coordinates designated by the coordinate designating device and to the zoom position acquired by the zoom position acquiring device according to the correction parameters for distortion correction, compressed in a zooming direction, in which the lens position condition changes in the optical zoom mechanism, and in a horizontal direction and a vertical direction of the image whose distortion has been corrected, by interpolation calculation; and an image correction device configured to correct distortion of the input image according to the correction parameters calculated by the parameter decoding device;

wherein, when a correction process in the horizontal direction is performed on data of one line, the parameter decoding device performs interpolation calculation on the correction parameters, which are needed for performing the process on the data of one line and correspond to the zooming direction and the vertical direction, according to the zoom position and vertical coordinates corresponding to the one line in a horizontal retrace period, and further performs, in an image effective period after the termination of this horizontal retrace period, interpolation calculation on each of pixels arranged in a horizontal direction by using the correction parameters calculated and compressed in the horizontal direction, wherein the parameter decoding device comprises:

an interpolation calculation device configured to calculate interpolation calculation according to a phase coefficient by using the inputted and compressed correction parameters;

an Y-X-compressed data holding device configured to temporarily hold the correction parameters, which are interpolated in a zooming direction by the interpolation calculation device and needed for distortion correction of data of one line;

an X-compressed data holding device configured to temporarily hold the correction parameters, which are interpolated in a vertical direction by the interpolation calculation device and needed for distortion correction of data of one line;

an input selection device configured to selectively input to the interpolation calculation device the correction parameters that are compressed in the horizontal direction, the vertical direction and the zooming direction and correspond to the zoom position, the correction parameters read from the Y-X-compressed data holding device, and the correction parameters read from the X-compressed data holding device; and a control device configured to control a selecting operation in the input selection device according to the coordinates designated by the coordinate designating device, and to the zoom position acquired by the zoom position acquiring device, for calculating a phase coefficient, and for supplying the calculated phase coefficient to the interpolation calculation device.

2. The image processing apparatus according to claim 1, wherein:

the control device controls the input selecting device such that the input selecting device selects the correction parameters read from the Y-X-compressed data holding device after selecting the correction parameters, which correspond to the zoom position and are compressed in the horizontal direction, the vertical direction, and the zooming direction, in the horizontal retrace period, and that the input selecting device selects the correction parameters read from the X-compressed data holding device in an image effective period after termination of the horizontal retrace period.

3. The image processing apparatus according to claim 2, wherein:

if the control device causes the input selecting device to select the correction parameters compressed in the horizontal direction, the vertical direction and the zooming direction, the control device calculates the phase coefficient corresponding to the zooming direction;

if the control device causes the input selecting device to select the correction parameters read from the Y-X-compressed data holding device, the control device calculates the phase coefficient corresponding to the vertical direction; and if the control device causes the input selecting device to select the correction parameters read from the X-compressed data holding device, the control device calculates the phase coefficient corresponding to the horizontal direction.

4. An image processing apparatus for correcting distortion in an image, comprising:

a converging lens group having an optical zoom mechanism;

an imaging element for receiving an input image taken by using the converging lens group having an optical zoom mechanism;

a zoom position acquiring device configured to acquire a zoom position representing a lens position condition of the optical zoom mechanism on taking an input image;

a coordinate designating device configured to designate coordinates of a pixel, which is an object for distortion correction;

a parameter decoding device configured to calculate correction parameters corresponding to the coordinates designated by the coordinate designating device and to the zoom position acquired by the zoom position acquiring device according to the correction parameters for distortion correction, compressed in a zooming direction, in which the lens position condition changes in the optical zoom mechanism, and in a horizontal direction and a vertical direction of the image whose distortion has been corrected, by interpolation calculation; and an image correction device configured to correct distortion of the input image according to the correction parameters calculated by the parameter decoding device, wherein the correction parameters supplied to the parameter decoding device are generated by partitioning the image, whose distortion has been corrected, in a lattice form, and compressing the correction parameters corresponding to a lattice segment in the lateral direction and the longitudinal direction through utilization of a position of each lattice point, and by thereafter further compressing the correction parameters, which are compressed in the lateral direction and the longitudinal direction and correspond to each of the lens position conditions, in the zooming direction through utilization of zoom partitioning points, at which the lens position conditions in the optical zoom mechanism are serially partitioned between a wide-end and a tele-end into plural levels including both the ends, wherein, when a correction process in the horizontal direction is performed on data of one line, the parameter decoding device performs interpolation calculation on the correction parameters, which are needed for performing the process on the data of one line and correspond to the zooming direction and the vertical direction, according to the zoom position and vertical coordinates corresponding to the one line in a horizontal retrace period, and further performs, in an image effective period after the termination of this horizontal retrace period, interpolation calculation on each of pixels arranged in a horizontal direction by using the correction parameters calculated and compressed in the horizontal direction, and wherein the parameter decoding device performs interpolation calculation by linear interpolation according to the correction parameters and a phase coefficient, the correction parameters corresponding to a plurality of the zoom partitioning points selected in accordance with the zoom position and the lattice points in the lattice selected in accordance with the coordinates designated by the coordinate designating device, the phase coefficient representing relative-coordinates of the zoom position and the coordinates between the zoom partitioning points and within the lattice.

5. An image processing apparatus for correcting distortion in an image, comprising:

a converging lens group having an optical zoom mechanism;

an imaging element for receiving an input image taken by using the converging lens group having an optical zoom mechanism;

a zoom position acquiring device configured to acquire a zoom position representing a lens position condition of the optical zoom mechanism on taking an input image;

a coordinate designating device configured to designate coordinates of a pixel, which is an object for distortion correction;

a parameter decoding device configured to calculate correction parameters corresponding to the coordinates designated by the coordinate designating device and to the zoom position acquired by the zoom position acquiring device according to the correction parameters for distortion correction, compressed in a zooming direction, in which the lens position condition changes in the optical zoom mechanism, and in a horizontal direction and a vertical direction of the image whose distortion has been corrected, by interpolation calculation; and an image correction device configured to correct distortion of the input image according to the correction parameters calculated by the parameter decoding device;

wherein, when a correction process in the horizontal direction is performed on data of one line, the parameter decoding device performs interpolation calculation on the correction parameters, which are needed for performing the process on the data of one line and correspond to the zooming direction and the vertical direction, according to the zoom position and vertical coordinates corresponding to the one line in a horizontal retrace period, and further performs, in an image effective period after the termination of this horizontal retrace period, interpolation calculation on each of pixels arranged in a horizontal direction by using the correction parameters calculated and compressed in the horizontal direction, wherein the correction parameters supplied to the parameter decoding device are generated by partitioning the image, whose distortion has been corrected, in a lattice form, and compressing the correction parameters corresponding to a lattice segment in the lateral direction and the longitudinal direction through utilization of a position of each lattice point, and by thereafter further compressing the correction parameters, which are compressed in the lateral direction and the longitudinal direction and correspond to each of the lens position conditions, in the zooming direction through utilization of zoom partitioning points, at which the lens position conditions in the optical zoom mechanism are serially partitioned between a wide-end and a tele-end into plural levels including both the ends, and wherein based on the correction parameters corresponding to two of the zoom partitioning points selected according to the zoom position and further corresponding to the lattice points selected in the lattice according to the coordinates designated by the coordinate designating device, and further corresponding to internal division points obtained by dividing each of an interval between the selected zoom partitioning points and the lattice segment in the lattice into n parts (where n is a natural number), the parameter decoding device performs interpolation calculation by restoring an nth degree polynomial, with which change of each of the correction parameters corresponding to each of the interval between the selected zoom partitioning points and the lattice segment in the lattice is approximated, and by applying a phase coefficient, which represents a relative coordinate of the zoom position and the coordinate in the interval of the zoom partitioning points and in the lattice, to the nth degree polynomial.

6. An image processing system for correcting distortion of an image, comprising:

a converging lens having an optical zoom, mechanism;

an imaging element receiving an input image taken by using the converging lens group having an optical zoom mechanism;

a zoom position acquiring device configured to acquire a zoom position representing a lens position condition of the optical zoom mechanism on taking an input image;

a coordinate designating device for designating coordinates of a pixel, which is an object for distortion correction;

a parameter decoding device configured to calculate correction parameters corresponding to the coordinates designated by the coordinate designating device and to the zoom position acquired by the zoom position acquiring device according to correction parameters for distortion correction, compressed in a zooming direction, in which the lens position condition changes in the optical zoom mechanism, and in a horizontal direction and a vertical direction of the image whose distortion has been corrected, by interpolation calculation; and an image correction device configured to correct distortion of the input image according to the correction parameters calculated by the parameter decoding device;

wherein, when a correction process in the horizontal direction is performed on data of one line, the parameter decoding device performs interpolation calculation on the correction parameters, which are needed for performing the process on the data of one line and correspond to the zooming direction and the vertical direction, according to the zoom position and vertical coordinates corresponding to the one line in a horizontal retrace period, and performs, in an image effective period after the termination of this horizontal retrace period, interpolation calculation on each of pixels arranged in a horizontal direction by using the correction parameters calculated and compressed in the horizontal direction, wherein the parameter decoding device comprises:

an interpolation calculation device for calculating interpolation calculation according to a phase coefficient by using the inputted and compressed correction parameters;

an Y-X-compressed data holding device configured to temporarily hold the correction parameters, which are interpolated in a zooming direction by the interpolation calculation device and needed for distortion correction of data of one line;

an X-compressed data holding device for temporarily holding the correction parameters, which are interpolated in a vertical direction by the interpolation calculation device and needed for distortion correction of data of one line;

an input selection device for selectively inputting to the interpolation calculation device the correction parameters that are compressed in the horizontal direction, the vertical direction and the zooming direction and correspond to the zoom position, the correction parameters read from the Y-X-compressed data holding device, and the correction parameters read from the X-compressed data holding device; and a control device configured to control a selecting operation in the input selection device according to the coordinates designated by the coordinate designating device, and to the zoom position acquired by the zoom position acquiring device, for calculating a phase coefficient, and for supplying the calculated phase coefficient to the interpolation calculation device.

7. An imaging apparatus for correcting distortion of an image, comprising:

a converging lens group having an optical zoom mechanism;

an imaging element for imaging an image by using the converging lens group having an optical zoom mechanism;

a zoom position detecting device configured to detect a zoom position indicating a lens position condition of the optical zoom mechanism on taking an input image;

a coordinate designating device configured to designate coordinates of a pixel, which is an object for distortion correction;

a parameter decoding device configured to calculate correction parameters corresponding to the coordinates designated by the coordinate designating device and to the zoom position acquired by the zoom position acquiring device according to correction parameters for distortion correction, compressed in a zooming direction, in which the lens position condition changes in the optical zoom mechanism, and in a horizontal direction and a vertical direction of the image whose distortion has been corrected, by interpolation calculation; and an image correction device configured to correct distortion of the input image according to the correction parameters calculated by the parameter decoding device;

wherein, when a correction process in the horizontal direction is performed on data of one line, the parameter decoding device performs interpolation calculation on the correction parameters, which are needed for performing the process on the data of one line and correspond to the zooming direction and the vertical direction, according to the zoom position and vertical coordinates corresponding to the one line in a horizontal retrace period, and performs, in an image effective period after the termination of this horizontal retrace period, interpolation calculation on each of pixels arranged in a horizontal direction by using the correction parameters calculated and compressed in the horizontal direction, and wherein the parameter decoding device comprises:

an interpolation calculation device configured to calculate interpolation calculation according to a phase coefficient by using the inputted and compressed correction parameters;

an Y-X-compressed data holding device configured to temporarily hold the correction parameters, which are interpolated in a zooming direction by the interpolation calculation device and needed for distortion correction of data of one line;

an X-compressed data holding device configured to temporarily hold the correction parameters, which are interpolated in a vertical direction by the interpolation calculation device and needed for distortion correction of data of one line;

an input selection device configured to selectively input to the interpolation calculation device the correction parameters that are compressed in the horizontal direction, the vertical direction and the zooming direction and correspond to the zoom position, the correction parameters read from the Y-X-compressed data holding device, and the correction parameters read from the X-compressed data holding device; and a control device configured to control a selecting operation in the input selection device according to the coordinates designated by the coordinate designating device, and to the zoom position detected by the zoom position detecting device, for calculating a phase coefficient, and for supplying the calculated phase coefficient to the interpolation calculation device.

8. An image processing method for correcting distortion of an image, comprising:

a first step of receiving an input image taken by using a converging lens group having an optical zoom mechanism;

a second step of acquiring a zoom position representing a lens position condition of the optical zoom mechanism on taking an input image;

a third step of calculating the correction parameters corresponding to coordinates designating a pixel, which is an object for distortion correction, and to the acquired zoom position by interpolation calculation according to correction parameters for distortion correction, compressed in a zooming direction, in which the lens position condition changes in the optical zoom mechanism, and in a horizontal direction and a vertical direction of the image whose distortion has been corrected; and a fourth step of correcting distortion of the input image according to the calculated correction parameters;

wherein in the third step, if a correction process in the horizontal direction is performed on data of one line, the interpolation calculation is performed on the correction parameters, which are needed for performing the process on the data of one line and correspond to the zooming direction and the vertical direction, according to the zoom position and vertical coordinates corresponding to the one line in a horizontal retrace period, and that in an image effective period after the termination of this horizontal retrace period, interpolation calculation is performed on each of pixels arranged in a horizontal direction by using the correction parameters calculated and compressed in the horizontal direction, and wherein in the third step, in the horizontal retrace period, interpolation calculation corresponding to the zooming direction is performed by using the correction parameter, which is compressed in the horizontal direction, the vertical direction, the zooming direction, and a phase coefficient corresponding to the zoom position, and the calculated correction parameters are temporarily stored in a first storage area;

subsequently, interpolation calculation corresponding to the vertical direction is performed by using the correction parameter read from the first storage area, and the phase coefficient obtained by the vertical coordinate corresponding to the one line, and the calculated correction parameter is temporarily stored in a second storage area; and in the image effective period after termination of the horizontal retrace period, interpolation calculation corresponding to the horizontal direction is performed by using the correction parameter read from the third storage area, and further using the phase coefficient obtained from each of the coordinates in the horizontal direction.

* * * * *